(12) United States Patent
Brown

(10) Patent No.: US 9,259,984 B2
(45) Date of Patent: Feb. 16, 2016

(54) COMBINED AIR, WATER AND ROAD VEHICLE

(75) Inventor: John Brown, Cromer Heights (AU)

(73) Assignee: Fleck Future Concepts GmbH, Munich (DE)

( * ) Notice: Subject to any disclaimer, the term of this patent is extended or adjusted under 35 U.S.C. 154(b) by 1350 days.

(21) Appl. No.: 13/138,649

(22) PCT Filed: Jul. 28, 2008

(86) PCT No.: PCT/EP2008/006190
§ 371 (c)(1),
(2), (4) Date: Dec. 2, 2012

(87) PCT Pub. No.: WO2010/012285
PCT Pub. Date: Feb. 4, 2010

(65) Prior Publication Data
US 2013/0126666 A1    May 23, 2013

(51) Int. Cl.
*B64C 39/04*    (2006.01)
*B60F 5/02*    (2006.01)
*B64C 37/00*    (2006.01)

(52) U.S. Cl.
CPC . *B60F 5/02* (2013.01); *B64C 37/00* (2013.01); *B64C 39/04* (2013.01)

(58) Field of Classification Search
CPC ............ B64C 3/56; B64C 5/12; B64C 19/02; B64C 35/00; B64C 37/00; B64C 39/00; B64C 39/04
USPC ................................ 244/2, 60, 119
See application file for complete search history.

(56) References Cited

U.S. PATENT DOCUMENTS

| 682,970 A | 9/1901 | Brodbeck |
| 932,601 A | 8/1909 | Corbett |

(Continued)

FOREIGN PATENT DOCUMENTS

| AT | 166746 | 8/1875 |
| AT | 115441 | 10/1927 |

(Continued)

OTHER PUBLICATIONS

"Roadable Aircraft"; Gunston, Bill. (2004). Cambridge Aerospace Dictionary. Cambridge University Press. Online version available at: http://app.knovel.com/hotlink/toc/id:kpCAD00005/cambridge-aerospace-dictionary/cambridge-aerospace-dictionary.*

(Continued)

*Primary Examiner* — Tien Dinh
*Assistant Examiner* — Michael A Fabula
(74) *Attorney, Agent, or Firm* — Fish & Richardson P.C.

(57) ABSTRACT

Flying Car, roadable aircraft, amphibian, multimode, multifunctional, composite versatile personal transport vehicle with twin, parallel fuselages, hulls, each with inflatable pontoons and/or wheels below and a cabin. Combined, aircraft, airplane, aeroplane, flying, air, aerial, airborne vehicle with variable, folding wings which is convertible via automatic transformation to a land vehicle and to a sea vessel. Two wings are stored between the fuselages. They extend on a system of rails, pivots and counter-rotating, fuselage-mounted arms which then sink flush into the wings' undersides and lock for flight. Upon wing extension and retraction, controls for road transport and flight controls alternately emerge or are stowed inoperably, as needed. Engine power alternately drives a propeller for flight, wheels for road travel and a separate, submersible, marine propeller for water transport.

22 Claims, 21 Drawing Sheets

(56) References Cited

U.S. PATENT DOCUMENTS

| | | | |
|---|---|---|---|
| 998,553 A | 7/1911 | Schleicher | |
| 1,033,646 A | 7/1912 | Wilson | |
| 1,151,297 A | 8/1915 | Schroder | |
| 1,247,960 A | 11/1917 | Jelalian | |
| 1,286,679 A | 12/1918 | Longobardi | |
| 1,405,407 A | 2/1922 | Gill | |
| 1,445,953 A | 2/1923 | Illgen | |
| 1,458,787 A | 6/1923 | Walden | |
| 1,485,704 A | 3/1924 | Pescara | |
| 1,545,553 A | 7/1925 | Dillingham | |
| 1,568,095 A | 1/1926 | Silver | |
| 1,884,847 A | 9/1927 | Pitcairn | |
| 1,674,338 A | 6/1928 | Moore | |
| 1,730,627 A | 10/1929 | Rogers | |
| 1,731,757 A | 10/1929 | Tubbe | |
| 1,756,463 A | 4/1930 | Jezek | |
| 1,771,724 A * | 7/1930 | Perez | 244/50 |
| 1,778,906 A | 10/1930 | Monjouste | |
| 1,780,298 A | 11/1930 | Icre | |
| 1,789,623 A | 1/1931 | Franz | |
| 1,816,653 A | 7/1931 | Nelsch | |
| 1,916,092 A * | 6/1933 | Bleriot | 244/13 |
| 1,929,255 A | 10/1933 | Northrop | |
| 1,998,148 A | 4/1935 | Vieriu | |
| 2,096,599 A | 10/1937 | Thomas | |
| 2,103,881 A | 12/1937 | Wagner | |
| 2,128,060 A | 8/1938 | Spratt | |
| 2,135,073 A * | 11/1938 | Gerhardt et al. | 244/2 |
| 2,135,699 A * | 11/1938 | Campbell | 244/2 |
| 2,140,783 A * | 12/1938 | Bellanca | 244/13 |
| 2,156,288 A | 5/1939 | Holliday | |
| 2,215,003 A | 9/1940 | Johnson | |
| 2,241,577 A | 5/1941 | Beals, Jr. | |
| D138,102 S | 1/1944 | Kelly | |
| 2,350,608 A | 6/1944 | Griffith | |
| 2,368,288 A | 1/1945 | Couse | |
| 2,373,467 A | 4/1945 | Frakes | |
| D144,936 S * | 6/1946 | Schmued | D12/335 |
| D144,937 S * | 6/1946 | Schmued | D12/335 |
| 2,402,468 A | 6/1946 | Thompson | |
| 2,410,234 A | 10/1946 | Read et al. | |
| 2,430,869 A | 11/1947 | Fulton, Jr. | |
| 2,434,068 A | 1/1948 | Geisse | |
| D149,404 S | 4/1948 | Burns | |
| 2,464,462 A | 3/1949 | Ricardo | |
| D155,569 S | 10/1949 | Bailey | |
| 2,494,547 A | 1/1950 | Fish, Jr. | |
| 2,532,159 A | 11/1950 | Fulton, Jr. | |
| 2,539,489 A | 1/1951 | Smith | |
| 2,553,952 A | 5/1951 | Turner | |
| 2,554,938 A * | 5/1951 | Catalano | 244/102 R |
| 2,557,894 A | 6/1951 | Siesel | |
| 2,562,490 A | 7/1951 | Hall | |
| 2,562,491 A | 7/1951 | Hall | |
| 2,562,492 A | 7/1951 | Hall et al. | |
| 2,563,731 A * | 8/1951 | Masterson | 244/2 |
| 2,573,271 A | 10/1951 | Perl | |
| 2,593,785 A | 4/1952 | Nye et al. | |
| 2,609,167 A | 9/1952 | Gero, Jr. | |
| 2,619,301 A | 11/1952 | Hall | |
| 2,623,712 A | 12/1952 | Spratt | |
| 2,624,530 A | 1/1953 | Hanssen | |
| 2,628,792 A | 2/1953 | Griffith | |
| 2,656,136 A | 10/1953 | Martin | |
| 2,674,422 A | 4/1954 | Pellarini | |
| 2,675,976 A | 4/1954 | Gerardine | |
| 2,681,773 A | 6/1954 | Rethorst | |
| 2,692,095 A | 10/1954 | Carpenter | |
| 2,699,299 A | 1/1955 | Herrick | |
| 2,707,084 A | 4/1955 | Mills | |
| 2,713,465 A | 7/1955 | Novinger | |
| 2,734,701 A | 2/1956 | Horton | |
| 2,762,584 A | 9/1956 | Price | |
| 2,767,939 A | 10/1956 | Taylor | |
| 2,770,427 A | 11/1956 | Schreffler | |
| 2,811,323 A | 10/1957 | Rethorst | |
| 2,812,911 A | 11/1957 | De Jean | |
| D182,071 S | 2/1958 | Henderson | |
| 2,879,013 A | 3/1959 | Herrick | |
| 2,893,661 A | 7/1959 | Aylor | |
| 2,923,494 A | 2/1960 | Strong | |
| 2,938,681 A | 5/1960 | Palermo | |
| 2,940,688 A | 6/1960 | Bland | |
| D188,359 S | 7/1960 | La Bel | |
| 2,989,269 A | 6/1961 | La Be | |
| 3,012,737 A | 12/1961 | Dodd | |
| 3,017,137 A | 1/1962 | Helmke et al. | |
| D192,337 S | 3/1962 | Skaggs | |
| 3,026,066 A | 3/1962 | Coates | |
| 3,029,042 A | 4/1962 | Martin | |
| 3,056,564 A | 10/1962 | Zuck | |
| 3,065,927 A | 11/1962 | Mills | |
| 3,065,938 A | 11/1962 | Calkins | |
| RE25,368 E | 4/1963 | Rethorst | |
| 3,083,936 A | 4/1963 | Rethorst | |
| 3,090,581 A | 5/1963 | Einarsson | |
| 3,092,060 A * | 6/1963 | Reid | 114/313 |
| 3,116,896 A * | 1/1964 | Sigler et al. | 244/2 |
| 3,134,560 A | 5/1964 | Haismer | |
| 3,152,776 A * | 10/1964 | Tresilian et al. | 244/23 R |
| 3,221,831 A * | 12/1965 | Weiland | 180/117 |
| D205,328 S | 7/1966 | Henry et al. | |
| 3,261,572 A * | 7/1966 | Gorton | 244/2 |
| 3,292,721 A | 12/1966 | Dobson | |
| 3,317,161 A | 5/1967 | Sawyer | |
| D207,929 S | 6/1967 | Miller | |
| 3,348,513 A * | 10/1967 | Dishart | 114/61.1 |
| 3,371,866 A | 3/1968 | Sonneville | |
| 3,371,886 A * | 3/1968 | Schertz | 244/2 |
| 3,379,395 A | 4/1968 | Smith | |
| 3,439,890 A | 4/1969 | Stits | |
| 3,451,645 A | 6/1969 | Wolcott | |
| 3,481,559 A * | 12/1969 | Apostolescu | 244/2 |
| 3,494,575 A * | 2/1970 | Budworth | 244/2 |
| D217,402 S | 4/1970 | Miller | |
| 3,610,660 A | 10/1971 | Price | |
| 3,612,440 A | 10/1971 | Strong | |
| 3,614,032 A | 10/1971 | Purcell | |
| 3,645,474 A | 2/1972 | Arbuse | |
| 3,684,216 A | 8/1972 | Morgan | |
| 3,737,121 A * | 6/1973 | Jones | 244/13 |
| 3,931,942 A | 1/1976 | Alpert | |
| 4,022,403 A | 5/1977 | Chiquet | |
| 4,068,810 A | 1/1978 | Malewicki | |
| 4,165,846 A | 8/1979 | Groeger | |
| 4,171,784 A * | 10/1979 | Eickmann | 244/2 |
| D257,629 S | 12/1980 | Miller | |
| 4,269,374 A | 5/1981 | Miller | |
| 4,358,072 A | 11/1982 | Williamson | |
| 4,375,280 A | 3/1983 | Nicolaides | |
| 4,537,373 A | 8/1985 | Butts | |
| 4,579,297 A | 4/1986 | Ayoola | |
| 4,627,585 A | 12/1986 | Einstein | |
| 4,657,207 A | 4/1987 | Poling | |
| 4,865,275 A * | 9/1989 | Thompson | 244/219 |
| 4,881,700 A | 11/1989 | Sarh | |
| 4,881,701 A | 11/1989 | Bullard | |
| 4,899,954 A | 2/1990 | Pruszenski, Jr. | |
| 4,913,375 A | 4/1990 | Fitzpatrick | |
| 4,986,493 A | 1/1991 | Sarh | |
| 5,050,817 A | 9/1991 | Miller | |
| 5,078,335 A | 1/1992 | David | |
| 5,115,996 A | 5/1992 | Moller | |
| D331,893 S | 12/1992 | Szakcs | |
| 5,201,478 A | 4/1993 | Wooley | |
| 5,242,132 A | 9/1993 | Wukowitz | |
| 5,415,365 A | 5/1995 | Ratliff | |
| 5,417,386 A | 5/1995 | Wernicke | |
| 5,435,502 A | 7/1995 | Wernicke | |
| D370,435 S | 6/1996 | Wernicke | |
| 5,836,541 A | 11/1998 | Pham | |
| 5,915,649 A | 6/1999 | Head | |
| 5,984,228 A | 11/1999 | Pham | |
| 6,073,882 A | 6/2000 | Zieger | |

(56) References Cited

U.S. PATENT DOCUMENTS

| | | | |
|---|---|---|---|
| 6,082,665 A | 7/2000 | Spitzer | |
| 6,086,014 A * | 7/2000 | Bragg, Jr. | 244/2 |
| 6,129,306 A | 10/2000 | Pham | |
| 6,131,848 A | 10/2000 | Crow | |
| 6,138,943 A | 10/2000 | Huang | |
| 6,224,012 B1 | 5/2001 | Wooley | |
| 6,457,670 B1 | 10/2002 | Geranio et al. | |
| 6,592,073 B1 | 7/2003 | Meekins | |
| 6,619,584 B1 | 9/2003 | Haynes | |
| 6,786,450 B1 * | 9/2004 | Einstein | 244/2 |
| 6,877,690 B1 | 4/2005 | Bragg | |
| 6,978,969 B1 * | 12/2005 | Neal | 244/23 B |
| 7,063,291 B2 | 6/2006 | Rado | |
| 7,066,426 B2 | 6/2006 | Preston | |
| D549,925 S | 8/2007 | Gossett | |
| 7,275,712 B2 | 10/2007 | Yoeli | |
| 7,300,019 B2 | 11/2007 | Preston | |
| 7,515,999 B2 | 4/2009 | Wolff | |
| 7,985,048 B2 | 7/2011 | Jones | |
| 2003/0094536 A1 | 5/2003 | LaBiche | |
| 2005/0247819 A1 | 11/2005 | Caruso | |
| 2006/0145000 A1 * | 7/2006 | Hensley | 244/106 |
| 2006/0196992 A1 * | 9/2006 | Boschma et al. | 244/10 |
| 2006/0284010 A1 * | 12/2006 | Meekins | 244/105 |
| 2007/0023566 A1 | 2/2007 | Howard | |
| 2008/0011897 A1 * | 1/2008 | Xu | 244/2 |
| 2008/0067284 A1 | 3/2008 | Bakker | |
| 2008/0251308 A1 * | 10/2008 | Molnar et al. | 180/209 |
| 2009/0072077 A1 * | 3/2009 | Chiu | 244/15 |
| 2010/0230532 A1 * | 9/2010 | Dietrich et al. | 244/49 |
| 2010/0294877 A1 * | 11/2010 | Jianu | 244/2 |

FOREIGN PATENT DOCUMENTS

| | | |
|---|---|---|
| AT | 367306 | 8/2007 |
| BE | 352605 | 8/1928 |
| BG | 98694 | 1/1870 |
| BG | 60960 | 7/1996 |
| CA | 492189 | 4/1953 |
| CA | 566301 | 11/1958 |
| CA | 648182 | 9/1962 |
| CA | 795663 | 10/1968 |
| CA | 2051379 | 8/1991 |
| CA | 2338852 | 9/2002 |
| CA | 2572448 | 6/2008 |
| CH | 106915 | 9/1924 |
| CH | 692977 | 1/2003 |
| CN | 85202242 | 11/1986 |
| CN | 1067622 | 1/1993 |
| CN | 1137982 | 12/1996 |
| CN | 1256227 | 6/2000 |
| CN | 2413938 | 1/2001 |
| CN | 1377790 | 11/2002 |
| CN | 2617682 | 5/2004 |
| CN | 2640919 | 9/2004 |
| CN | 2646049 | 10/2004 |
| CN | 2659719 | 12/2004 |
| CN | 2692028 | 4/2005 |
| CN | 1660669 | 8/2005 |
| CN | 1672994 | 9/2005 |
| CN | 1693102 | 11/2005 |
| CN | 1887609 | 1/2007 |
| CN | 1948034 | 4/2007 |
| CN | 1948035 | 4/2007 |
| CN | 1955022 | 5/2007 |
| DE | 361942 | 4/1887 |
| DE | 760791 | 5/1904 |
| DE | 452791 | 11/1927 |
| DE | 1925520 | 9/1933 |
| DE | 892868 | 2/1954 |
| DE | 1016567 | 9/1957 |
| DE | 1016568 | 9/1957 |
| DE | 1260987 | 2/1968 |
| DE | 2438526 | 2/1973 |
| DE | 2439009 | 4/1975 |
| DE | 2357628 | 5/1975 |
| DE | 2547435 | 4/1977 |
| DE | 3247168 | 9/1984 |
| DE | 3430412 | 2/1986 |
| DE | 9208000 | 9/1993 |
| DE | 29506498 | 8/1995 |
| DE | 19512828 | 10/1996 |
| DE | 29720537 | 4/1998 |
| DE | 19737616 | 3/1999 |
| DE | 29816078 U | 5/1999 |
| DE | 19808862 | 9/1999 |
| DE | 19907791 | 10/1999 |
| DE | 19840847 | 3/2000 |
| DE | 19951850 | 1/2001 |
| DE | 20109872 U | 6/2002 |
| DE | 10159082 | 6/2003 |
| DE | 10215176 | 10/2003 |
| DE | 10221304 | 11/2003 |
| DE | 10346189 | 5/2005 |
| DE | 20 2006 017 959 U1 | 4/2007 |
| EP | 0 839 712 A2 | 5/1998 |
| EP | 1541465 | 6/2005 |
| FR | 380815 | 12/1907 |
| FR | 394779 | 2/1909 |
| FR | 411086 | 6/1910 |
| FR | 412339 | 7/1910 |
| FR | 444116 | 10/1912 |
| FR | 447110 | 12/1912 |
| FR | 512703 | 1/1921 |
| FR | 569104 | 4/1924 |
| FR | 570924 | 5/1924 |
| FR | 587913 | 4/1925 |
| FR | 594602 | 9/1925 |
| FR | 639833 | 6/1928 |
| FR | 657742 | 5/1929 |
| FR | 683229 | 10/1929 |
| FR | 694848 | 12/1930 |
| FR | 708075 | 7/1937 |
| FR | 820336 | 11/1937 |
| FR | 904021 | 10/1945 |
| FR | 912297 | 8/1946 |
| FR | 921308 | 5/1947 |
| FR | 939720 | 11/1948 |
| FR | 964155 | 8/1950 |
| FR | 977644 | 4/1951 |
| FR | 983334 | 6/1951 |
| FR | 986352 | 7/1951 |
| FR | 988619 | 8/1951 |
| FR | 994341 | 11/1951 |
| FR | 1039983 | 10/1953 |
| FR | 60005 E | 9/1954 |
| FR | 1328507 | 4/1962 |
| FR | 1485308 | 6/1967 |
| FR | 1503815 | 10/1967 |
| FR | 2155811 | 10/1971 |
| FR | 2426584 | 12/1979 |
| FR | 2577198 | 8/1986 |
| FR | 2582284 | 11/1986 |
| FR | 2591559 | 6/1987 |
| FR | 2603232 | 3/1988 |
| FR | 2622846 | 5/1989 |
| FR | 2687616 | 8/1993 |
| FR | 2692204 | 12/1993 |
| FR | 2774355 | 8/1999 |
| FR | 2806351 | 9/2001 |
| FR | 2848147 | 6/2004 |
| FR | 2868991 | 10/2005 |
| FR | 2885322 | 11/2006 |
| FR | 2896728 | 8/2007 |
| GB | 190916367 | 0/1910 |
| GB | 191009485 | 0/1911 |
| GB | 191125040 | 0/1912 |
| GB | 191127811 | 0/1912 |
| GB | 191220093 | 0/1913 |
| GB | 191412043 | 0/1914 |
| GB | 121393 | 12/1918 |
| GB | 125695 | 4/1919 |
| GB | 143591 | 5/1920 |

(56) References Cited

FOREIGN PATENT DOCUMENTS

| | | |
|---|---|---|
| GB | 151635 | 9/1920 |
| GB | 159309 | 2/1921 |
| GB | 422188 | 1/1935 |
| GB | 559819 | 3/1944 |
| GB | 578043 | 6/1946 |
| GB | 605755 | 7/1948 |
| GB | 958427 | 5/1964 |
| GB | 1312296 | 4/1973 |
| GB | 2134865 | 8/1984 |
| GB | 2236642 | 10/1991 |
| GB | 2239642 | 10/1991 |
| GB | 2259286 | 10/1993 |
| GB | 2306426 | 7/1997 |
| GB | 2364982 | 2/2002 |
| JP | S6164505 | 4/1986 |
| JP | 63130413 | 8/1988 |
| JP | H0450098 | 2/1992 |
| JP | H11198621 | 7/1999 |
| JP | 2003/327198 | 11/2003 |
| JP | 2004/014435 | 1/2004 |
| JP | 2004/026034 | 1/2004 |
| JP | 2004/082992 | 3/2004 |
| JP | 2004/122945 | 4/2004 |
| JP | 2005/125976 | 5/2005 |
| JP | 2006/213225 | 8/2006 |
| JP | 4050098 | 12/2007 |
| KR | 10-0222085 | 10/1999 |
| KR | 2002/0076972 | 10/2002 |
| KR | 2003/0083449 | 10/2003 |
| NL | 256074 | 4/1982 |
| NL | 8402565 | 3/1986 |
| RU | 2046063 | 10/1995 |
| RU | 2228283 | 5/2004 |
| RU | 2231477 | 6/2004 |
| WO | WO 9304919 | 3/1993 |
| WO | WO 9961267 | 12/1999 |
| WO | WO 01/30596 | 3/2001 |
| WO | WO 01/23197 | 4/2001 |
| WO | WO 2004/074063 A1 | 9/2004 |
| WO | WO 2007/114877 A2 | 10/2007 |
| WO | WO 2008/063707 | 5/2008 |

OTHER PUBLICATIONS

"Roadable Aircraft"; Gunston, Bill. (2009). Cambridge Aerospace Dictionary (2nd Edition). Cambridge University Press. Online version available at: http://app.knovel.com/hotlink/toc/id:kpCADE0003/cambridge-aerospace-dictionary/cambridge-aerospace-dictionary.*

"Alfa Spix—Fliegendes Concept-Car" Schreibloga.de, http://schreiblogade.de/2006/07/alfa-spix-fliegendes-concept-car, Jul. 19, 2006 (1 page).

"Flying Cars" http://www.roadabletimes.com/, Nov. 12, 2002 (2 pages).

Mooneyham, A.J., "Project Fledgling: A Possibly Low Cost, Safe, and Practical Flying Car", http://www.jmooneyham.com/pfldg.html, Jun. 16, 2006 (1 page).

Al Geraci and William Simonini "The Jeep-o-Plane", http://www.roadabletimes.com/roadables-integ_jeepoplane.html, 1950 (3 pages).

Al Geraci and William Simonini, "The Jeep-O-Plane", http://www.etsy.com/listing/83172794/1963-space-age-model-kit-build-a-jeep-o, 1963 (1 page).

Snead, Bill, Design #6, http://www.roadabletimes.com/roadables-integ_sneadmodel/html, Apr. 23, 2004 (4 pages).

Boeing PAV, http://en.wikipedia.org/wiki/Personal_air_vehicle, 2004 (1 page).

Hallock, Bruce King, "Roadwing", http://www.roadabletimes.com/roadables-integ_watr_halok.html, 1946-1957 (1 page).

Charles Weymann/Capt. Georges LePere, "Aeromobile", http://en.wikipedia.org/wiki/Charles_Terres_Weynann, 1930 (1 page).

Chrysler VZ-6 CH, "Flying Jeep", http://en.wikipedia.org/wiki/Chrvsler_VZ-6, 1959 (1 page).

Curtiss www.aerofiles.com/curt-auto02.jpg, Feb. 26, 1911 (1 page).

Atchison, David, "Skyrider X2R" Macro Industries, http://www.macroindustries.com/website/files/skvrider/_1024/index_main.htm, 2000 (1 page).

Bryan, Dewey, Autoplane, http://www.roadabletimes.com/roadables-integ_bryan.html, 1953, 1970, 1974 (2 pages).

Jackson, Dr. Lewis, J10, http://www.roadabletimes.com/roadables-integ_jacksonJ10.html, 1956 (3 pages).

Dr. Vernon Porter and Clarence Kissel, "The Porter/Kissel Flying Car", http://web.archive.org/web/20070821185648/http://www.freeenergy.ca/news/118/ARTICLE/1334/2007-04-09.html, 2007 (1 page).

Stockwell, Erwin, "Corvair Car", http://www.roadabletimes.com/roadables-modular_coRvair.html, 1971 (1 page).

Longobardi, Felix, http://www.roadabletimes.com/roadables-integ_longobardi.html, 1918 (3 pages).

Vranek, Georg, The Porsche Skymaster, http://www.roadabletimes.com/roadables-modular_porchsky.html, Oct. 27, 2005 (2 pages).

Gregory, George, "Solstice", http://www.roadabletimes.com/roadables-integ_gregory06.html, 2001 (3 pages).

Curtiss, Glenn H., "Autoplane", http://en.wikipedia.org/wiki/Curtiss_Autoplane, 1917 (1 page).

Trautman, Herbert, "Road Air", http://www.fantasyofflight.com/aircraft/korean-war-post-wwii/trautmann-roadair.aspx, 1959 (2 pages).

Hybrid Aircraft—Heinkel He.111Z, www.unrealaircraft.com/hybrid/He111Z.php, 1941-1942 (1 page).

Christie, J. Walter, "Christie Flying Tank", http://en.wikipedia.org/wiki/Winged_tank, 1932 (1 page).

Carter, Jay W., "Carter Copter", http://en.wikipedia.org/wiki/Carter_Copter, Sep. 24, 1998 (1 page).

Brown, John, "All the World's Flying Cars . . . & a Complete History of Roadable Aircraft" 2012 (229 pages).

Gwinn Jr., Joseph M., "Air Car", https://en.wikipedia.org/wiki/Gwinn_Aircar, 1937 (1 page).

Gwinn, Jr., Joseph M., "Consolidated Vultee 111", http://www.unrealaircraft.com/roadable/cv_111.php, 1945 (1 page).

Moore, Mark, Andrew Hahn (NASA), "PAV" 2004 (1 page).

Fletcher, Matt, Roadable Aircraft The "Cane", http://www.roadabletimes.com/roadables-integ_fletcher's.html, Dec. 2003 (3 pages).

Werner, Michael, "Flyke", http://www.fresh-breeze.de/en/products/trikes/xcitor.html, 1994 and "Flug-Auto" 2008 (1 page).

Official Action in corresponding Chinese Application No. 200880130928.4 dated Oct. 31, 2012; 23 pages.

OFloyd, Ol, "Para-Cycle", http://www.para-cycle.com/, Dec. 24, 1997 (1 page).

Antonov, Oleg K., "KT A-40 Flying Tank" http://www.unrealaircraft.com/roadable/antonov_kt.php, 1942 (1 page)

Yearic, Pat, "The Cycleplane" http://www.roadabletimes.com/roadables-integ_cycleplane.html, 2004 (1 page).

Marchman, Prof. James, "Pegasus", www.aoe.vt.eduidesignJpegasus, 1999 (1 page).

Koppen, Prof. Otto /Henry Ford, "Sky Flivver", http://en.wikipedia.org/wiki/Flying_car_(aircraft), 1926 (1 page).

Stiles, Prof. Palmer, "CarNard",http://papers.sae.org/932601/, Sep. 1, 1993 (1 page).

Fuller, Prof. R. Buckminster (Bucky) , "Dymaxion Car", http://en.wikipedia.org/wiki/Dymaxion_car, 1933 (1 page).

Richard A. Strong, "Strongmobile", www.roadabletimes.com, 1971 (1 page).

Nichols, Steve, The "Fusion", http://www.roadabletimes.com/roadables-integ_fusion.html, 2003 (2 pages).

Taylor, "Aerocar III", http://www.airventuremuseum.org/collection/aircraft/Taylor%20Aerocar.asp, 1970 (1 page).

The Roadable Corvair, hftp://www.roadabletimes.com/roadables-modular_coRvair.html, Aug. 2002 (3 pages).

The Trautman Road Air, http://www.roadabletimes.com/roadables-integ_trautman.html, Jun. 6, 2004 (2 pages).

McNally, Thomas C., "Transair Systems TAS-102 Flying Motorcycle", http://www.roadabletimes.com/roadables-modular_transair.html, 1930s (1 page).

(56) References Cited

OTHER PUBLICATIONS

Trek Aerospace, "PAV Dragonfly UMR" http://www.trekaero.com/Trek_VTOL_Dragonfly_Vehicles.htm, Apr. 5, 2005 (2 pages).

Waterman Aerobile, www.aerofiles.com/waterman-w5.jpg, 1957 (1 page).

Waterman's "Aerobile" & Hallock's "Road Wing", http://www.roadabletimes.com/roadables-integ_watr_halok.html, 1935 (5 pages).

Burt Rutan "Rutan Voyager" http://en.wikipedia.org/wiki/Rutan_Voyager, Jun. 22, 1984 (1 page).

Snead, William, "Design #6", http://www.roadabletimes.com/roadables-integ_sneadmodel.html, 2005 (1 page).

Krassin, Yuri, The High Performance "Autocraft 011", http://www.roadabletimes.com/roadables-integ_krassin.html, 1988 (7 pages).

Rutan Voyager, http://en.wikipedia.org/wiki/Rutan_Voyager, Jun. 22, 1984 (4 pages).

Begak, Aleksander "Begalet—Evolution/Aerocar STL/DTL" Scarab Aviation Labs, http://www.youtube.com/watch?v=ycoiQM3xv_c, 2006 (2 pages).

Avrocar, VZ-9 AV, http://en.wikipedia.org/wiki/Avro_Canada_VZ-9_Avrocar, 1959 (2 pages).

Col. K.P. Rice, "Volante", http://www.volanteaircraft.com/, 2003 (2 pages).

Vuia, Dr. Traian, "Vuia I", http://ro.wikipedia.org/wiki/Traian_Vuia, 1903 (2 pages).

Smolinski, Henry, "Aircar" & "Mizar", http://en.wikipedia.org/wiki/AVE_Mizar, 197011973, (2 pages).

"The Consolidated Vultee Model 111", http://www.roadabletimes.com/roadables-modular_consvult.html (1 page), 1940.

Chinese Fourth Office Action, Chinese Application No. 200880130928.4, May 29, 2015, 8 pages.

* cited by examiner

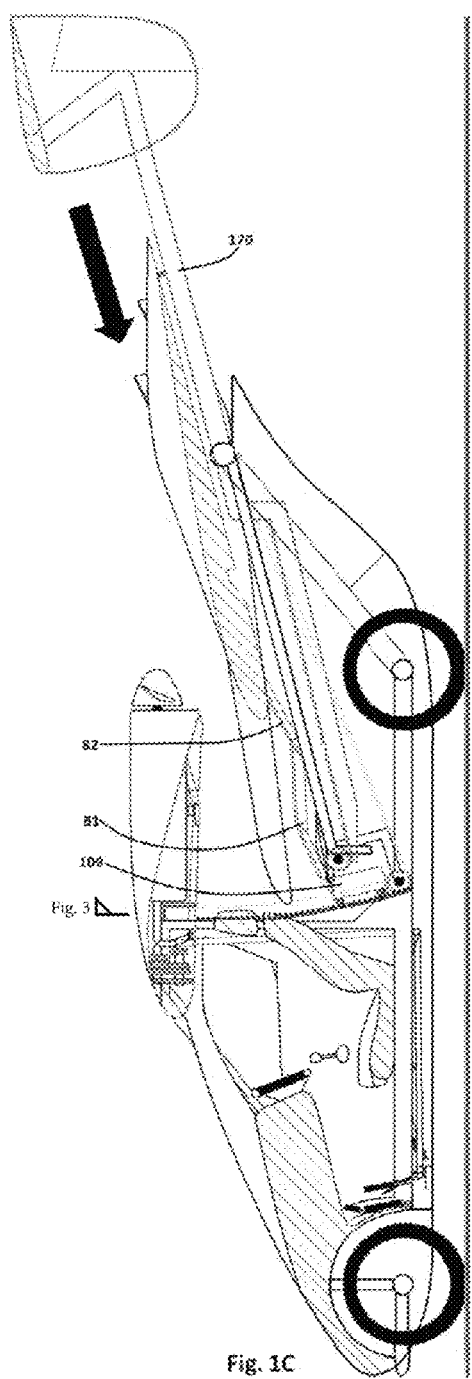
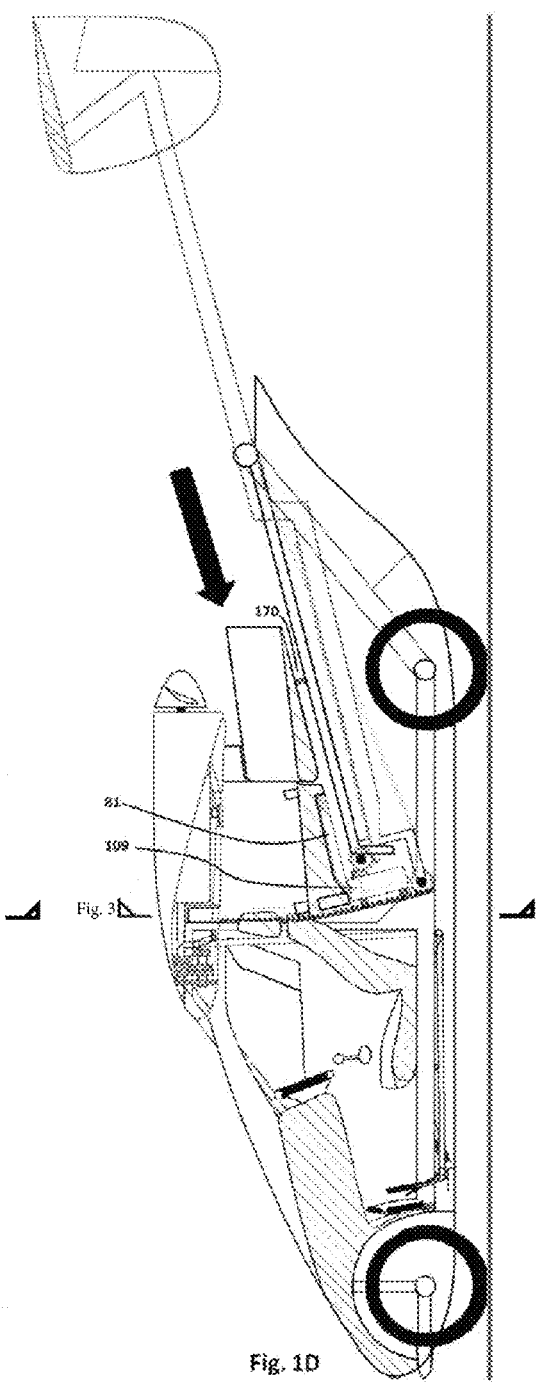
Fig. 1C
Fig. 1D

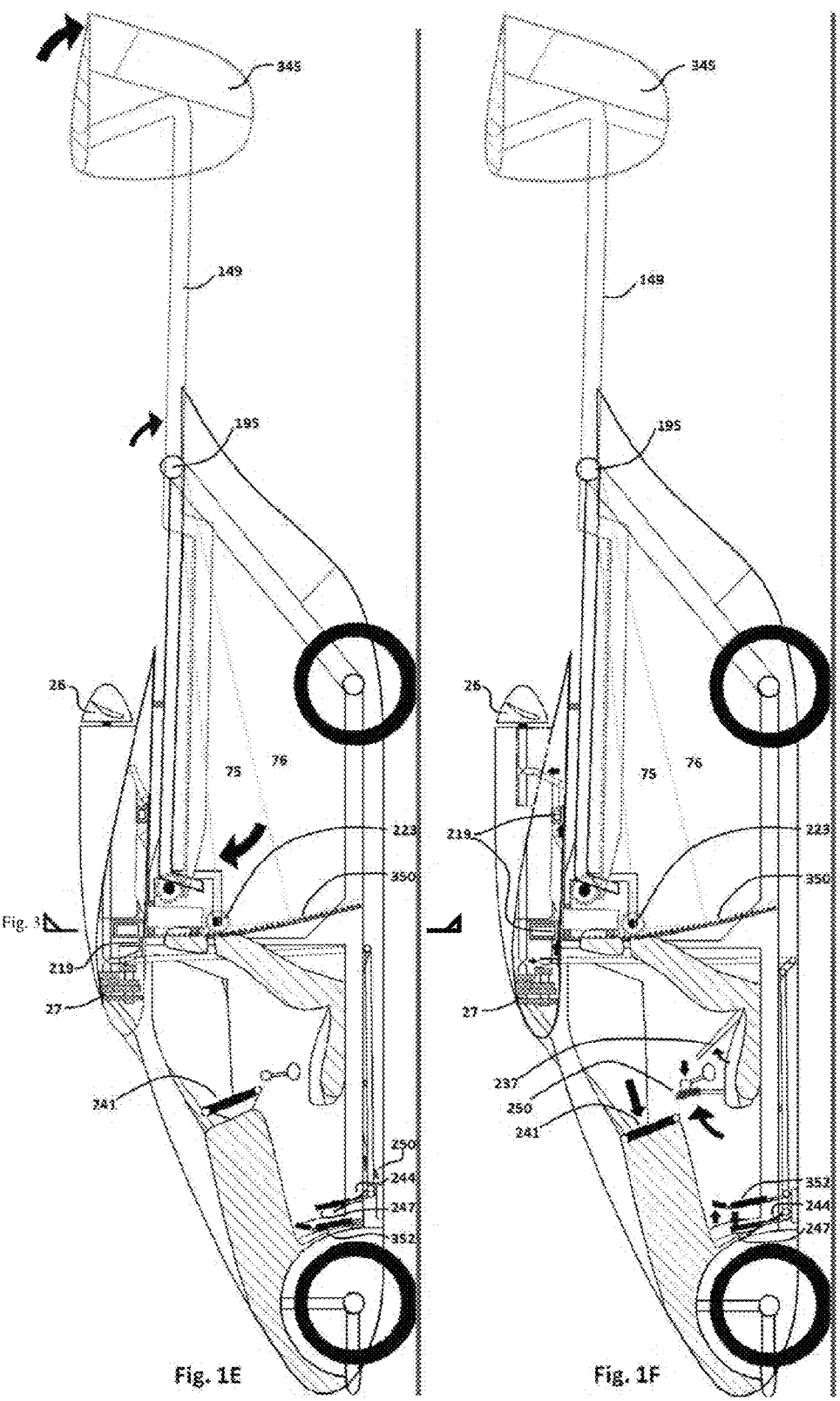

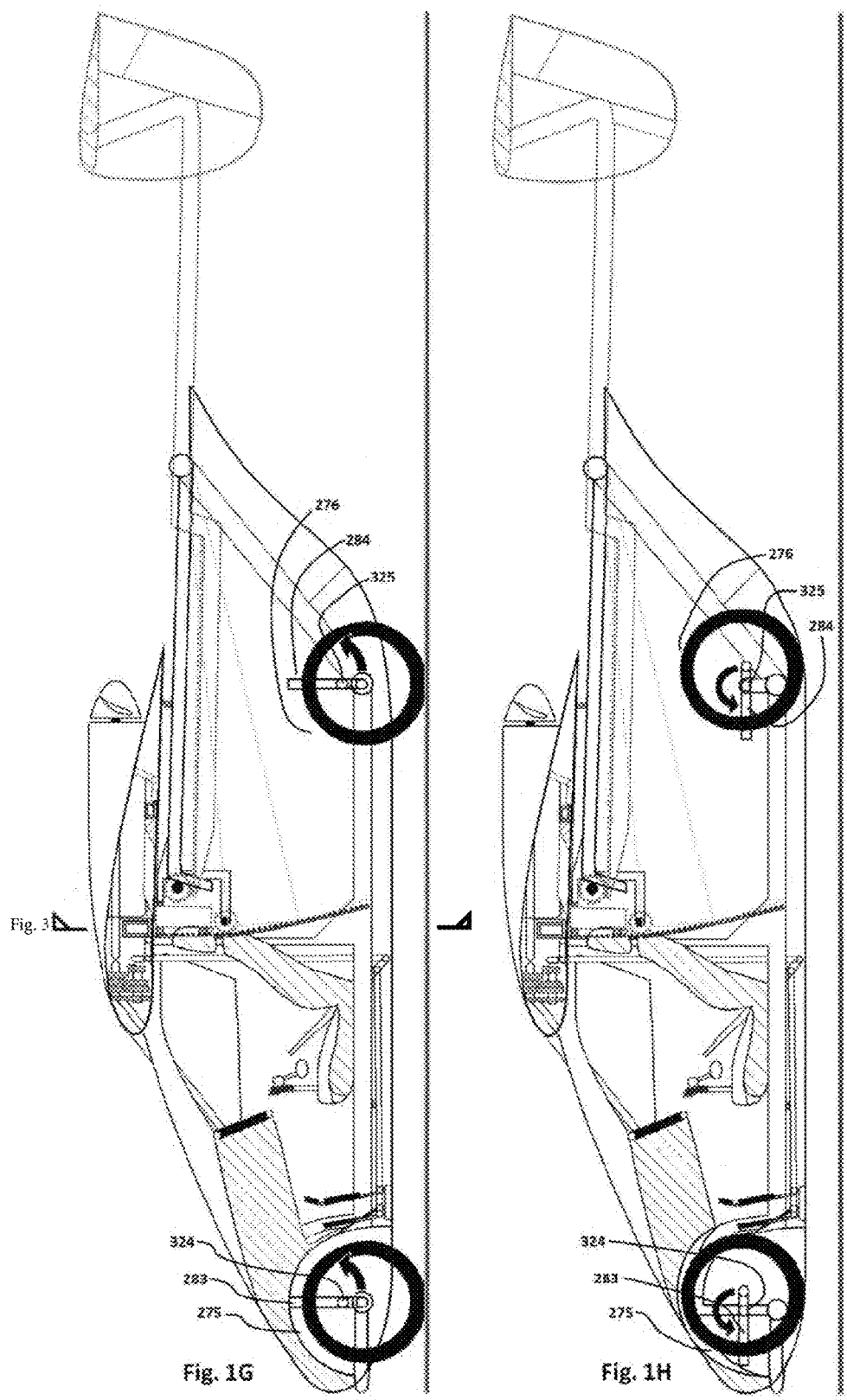

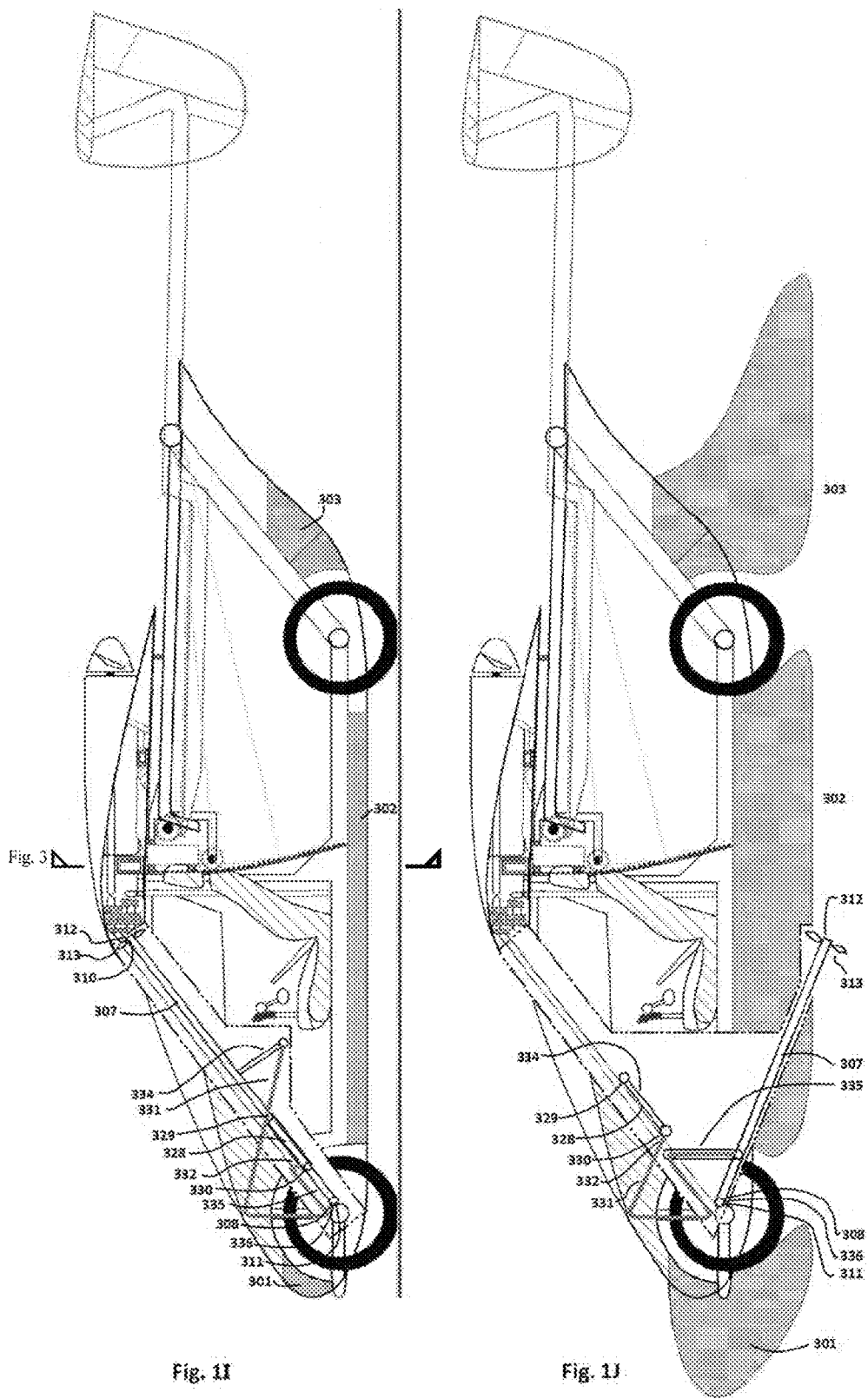

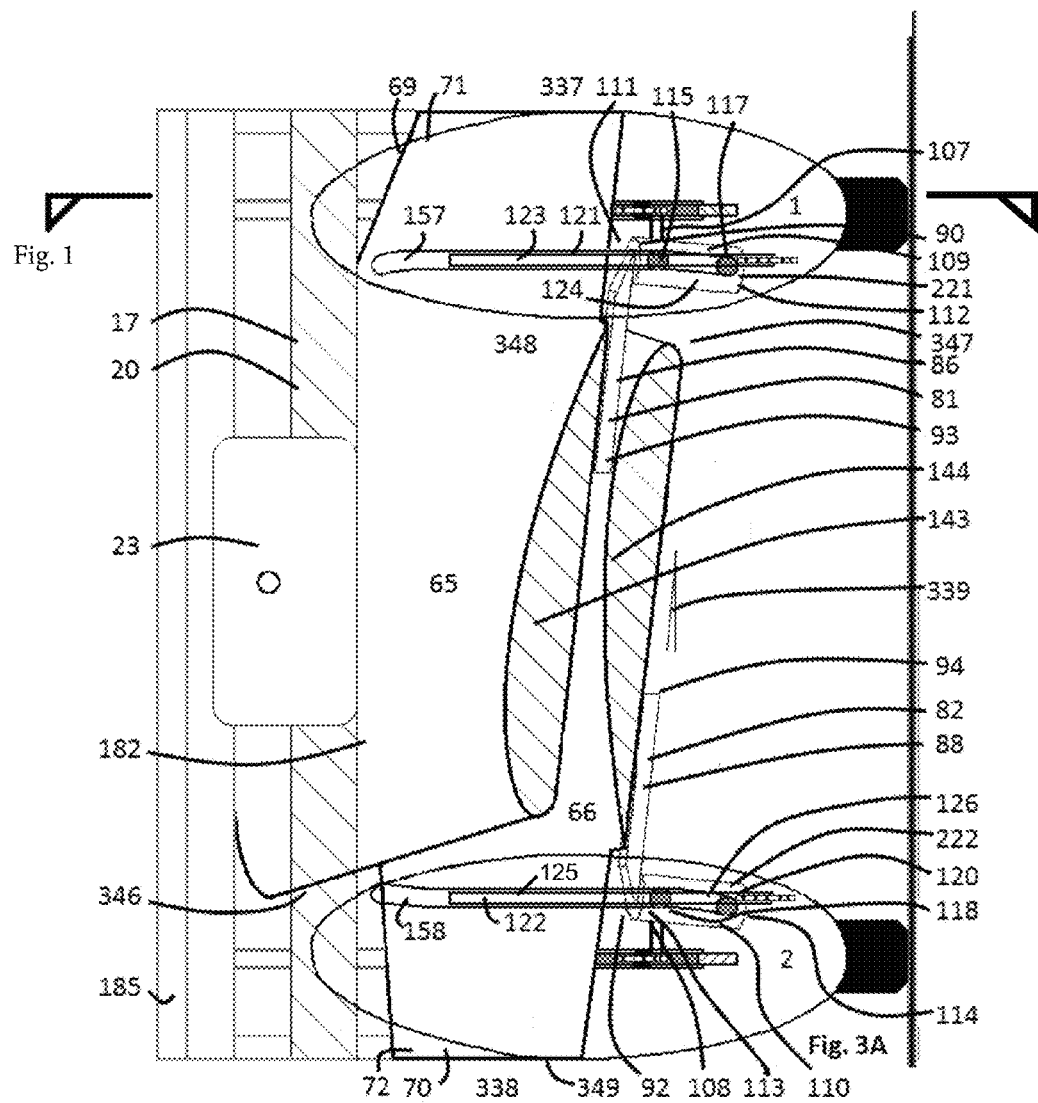

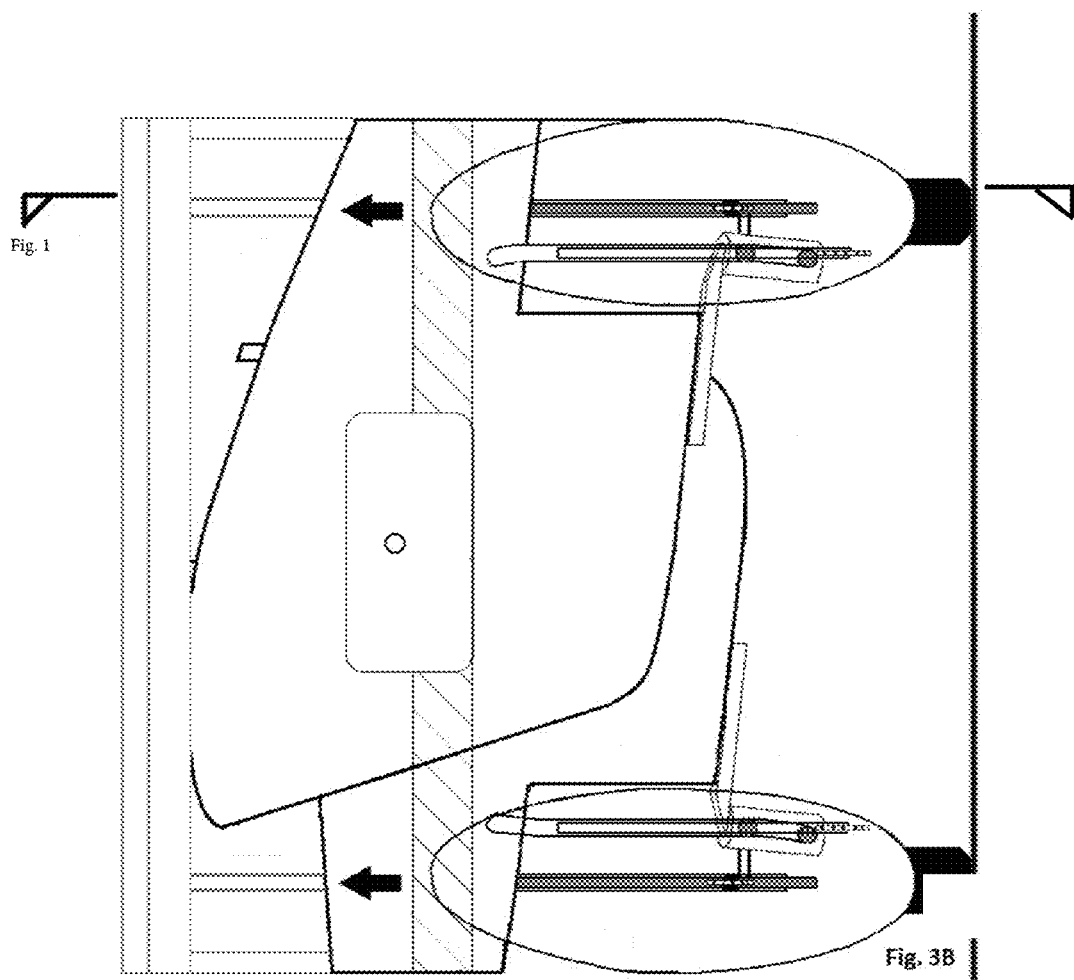

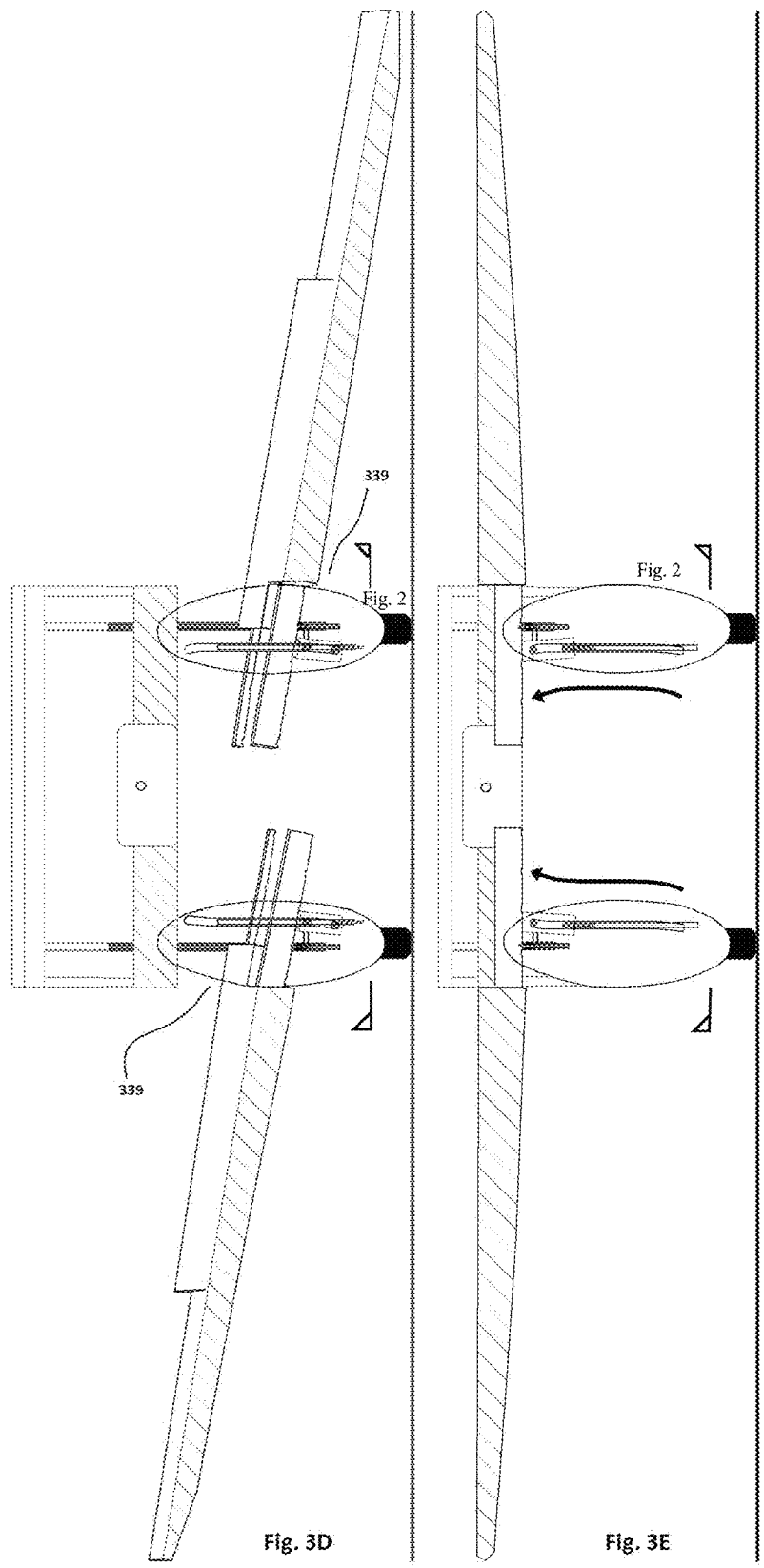

COMBINED AIR, WATER AND ROAD VEHICLE

This invention integrates the features and functions of an automobile, winged light aircraft and motorboat into one vehicle. Its transformation from one configuration to another is automated. It has twin fuselages, a swing-wing mechanism and hybrid controls.

BACKGROUND OF THE INVENTION

Whereas almost all winged aircraft and most seaplanes have wheels and steering for taxiing on land, it is primarily their wingspan which makes them illegal or impractical for road transport. To be "roadable" the maximum allowed width varies between 2.44 m (8 ft.) and 2.55 m. In exceptions it ranges up to 2.60 m (8.5 ft.). Furthermore, cars are generally heavier, less streamlined and have a less critical centre of gravity than aircraft. Because of these major (and other minor) factors, a practical combined land/air vehicle ("flying car") for everyday use has remained an unsolved technical problem for over 100 years.

Some of the biggest names in the automobile industry have designed "flying cars": Ford "Sky Flivver" (1926) and Chrysler "VZ-6CH" (1957) at www.roadabletimes.com, Toyota #JP2005125976, Kawasaki #JP63130413, BMW #DE10215176 & #DE10159082 and Daimler-Benz AG (PARAT-Studie 1990—Personal Advanced Road Air Transportation). The PARAT study was produced in cooperation with Dornier. Other aviation companies to have made attempts were Boeing at www.roadabletimes.com, Messerschmitt MBB (Kyrill von Gersdorf: "Ludwig Bölkow and sein Werk-Ottobrunner Innovationen" Bernhard & Graefe Verlag 1987), McDonnell Douglas U.S. Pat. No. 5,915,649, Lockheed U.S. Pat. No. 2,762,584, North American, Avro VZ-9AV, Northrop, and Antonov (below). Other art has been the result of University projects, MIT #WO2007-114877. Governments are actively pursuing development. The Advanced General Aviation Transports Experiments (AGATE) was formed by the US Congress in 1992. It includes NASA and the FAA. Under its auspices, the Virginia Space Grant Consortium runs a design competition as do CAFE and NASA at www.cafefoundation.org/v2/pav_home.php for a PAV (Personal Aerial Vehicle). Other National Research Institutes are pursuing similar goals; #JP2004122945, #NL 256074 as are various military organisations U.S. Pat. No. 6,457,670. The commercial applications of such a vehicle in recreation, business travel, emergency service, commuting and tourism and the effect of its widespread use on infrastructure, logistics and mass transit over greater distances, especially over water, are self-evident.

Carrying the mass of at least one person into the air requires a certain amount of lift. This can be provided by a combination of engine power and wing area. But even a one-person solution is hard to fit into a vehicle only 2.55 m wide. For this reason, almost half the known art dispenses with conventional wings and merely employs jets, fans or rotors, making it expensive, loud and therefore largely impractical. The construction of roadable aircraft with integrated wings is far more difficult. It's more than just miniaturising or building to a smaller/narrower scale—since a human can't be "scaled down". It's an art in and of itself, requiring many compromises and combining many fields of knowledge.

Existing roadable aircraft art is divided into three broad categories;

1). "non-fixed-wing" solutions (employing rotors, jets and fans for lift),

2). "modular" solutions (whereby the wings, empennage and propeller comprise a separate unit which is attached to the road vehicle) and 3). "integrated" solutions (whereby wings and airscrew are integrated into and carried with the vehicle at all times). Integrated solutions are in turn divided into seven subcategories,
   a). bi-/multiplanes,
   b). parachute wings,
   c). lighter than air,
   d). high aspect-ratio wings,
   e). telescopic wings,
   f). folding wings and
   g). swinging wings.

Occasionally, two or more of these elements are combined into one solution. The invention disclosed here is an integrated, swing-wing solution.

SPECIFIC BACKGROUND DOCUMENTS

This background discussion separately addresses the invention's primary elements which are;

1). a parallel, twin-fuselage flying car configuration,

2). its operability on water with a separate, automatically deployable marine propeller, 3). a wingtips-forward, skew-stored and via parallel, overlapping planes skew-extending, self-righting, multi-rail and multi-pivot, swing-wing mechanism with externally, counter-rotating, flush storing struts where the wings' spar-roots are neither hinged nor pivoted and 4). multiconfigurational, hybrid, automatically stowing/deploying steering.

Roadable width and hybrid controls are features found in all flying cars. A wing storage mechanism is found in almost all "non-rotor", integrated, roadable aircraft. For this reason, an attempt has been made to list all such known art below. [Note 1: A "motorcycle" is legally defined as having less than four wheels. Since three-wheeled arrangements are common among roadable aircraft, this background discussion does not indulge that differentiation. Note 2: In the following, "=" denotes "twin boom", "≈" denotes "operability on water" and "*" denotes "state of the art".]

Most two-blade helicopters, hovering platforms and gyrocraft have roadable width but don't need wheels or a road (unless land travel—i.e. due to bad weather—is desired). Nevertheless, over 200 declared rotor/fan/jet-driven roadable aircraft exist, some including seaborne operation. The first was possibly 1901 (before the Wright brothers) by Brodbeck U.S. Pat. No. 682,970. The first undisputed, powered-rotor roadable was 1921 by Pescara #GB 159309. The first roadable Gyroplane was 1932 by Pitcairn U.S. Pat. No. 1,884,847. The state of the art is arguably Yoeli U.S. Pat. No. 7,275,712*, Moller U.S. Pat. No. 5,115,996*, Fabre #FR28885322*, Dragonfly* at www.trekaero.com and Skyrider* at www.macroindustries.com and for autogyros Bakker PALV U.S. 2008-067284* and Carter PAV* at www.cartercopter.com. No known roadable rotorcraft art employs twin cabins/fuselages. Rotorcraft's dissimilarity to the instant art obviates any need for deeper background.

Modular Art: Automobiles can be carried on board aircraft; And aircraft can be towed behind automobiles; (e.g. Stits U.S. Pat. No. 3,439,890 patented a swing-wing aircraft 1971 with a maximum width of 8 ft. for the purpose of making it towable.) However, neither qualifies as a modular roadable aircraft. A true "modular roadable" consists of a car which tows all flight appendices with it. "Quasi-modular roadables" use the same cabin for both modes but store the flight appendices at an airport. Both types are listed here: Bigot #FR380815 patented the first modular flying cycle 1907 followed 1912 by Wilson U.S. Pat. No. 1,033,646. Lamothe #FR639833 patented the first modular flying car 1928 followed 1931 by Tampier #FR708075, 1937 by Marchaudon #FR820336=, and 1940 by Johnson U.S. Pat. No. 2,215,003. The earlier, unpatented art of Gwinn 1937 (Gwinn Aircar at www.aerofiles.com/gwinn-x.jpg) along with Fulton U.S. Pat. No. 2,430,869 and U.S. Pat. No. 2,532,159 and Taylor 1956 U.S. Pat. No. 2,767,939 received official type approval from the CAA (now FAA). Among others, Klug 1996 #DE19512828 and #DE19808862≈ and Rice*=2003 (Volante at www.volanteaircraft.com) have received experimental operational approval. Other modular art is Aerocar 111 at www.spilot.de, Antonov=A-40 KT Kr'lya Tank at www.unrealaircraft.com/roadable/antonov_kt.php, Arbuse U.S. Pat. No. 3,645,474=, Gee-Bee Ascender at Modern Mechanix & Inventions Magazine, May 1933 and at www.roadabletimes.com, Arpas #DE2547435, Baynes #GB578043, Beals U.S. Pat. No. 2,241,577=, Boggs U.S. Pat. No. 2,464,462=, Berton #FR2692204 & #FR2622846=, Burns U.S. Pat. No. D149,404, Butts U.S. Pat. No. 4,537,373, Christie at www.roadabletimes.com, Curtiss at www.aerofiles.com/curt-auto02.jpg, Finley #GB2236642, Fish U.S. Pat. No. 2,494,547=, Fletcher #GB559819=, Frakes U.S. Pat. No. 2,373,467=, Franz U.S. Pat. No. 1,789,623, Fred U.S. Pat. No. 2,675,976, Fourniere #FR904021, Fourniere #FR977644=, Hall U.S. Pat. No. 2,562,492, U.S. Pat. No. 2,562,491, U.S. Pat. No. 2,562,490 and U.S. Pat. No. 2,619,301, Hannon #GB2364982, Hanssen #GB605755 and U.S. Pat. No. 2,624,530, Hanssen #DE760791=, Helmke U.S. Pat. No. 3,017,137, Hendrik U.S. Pat. No. 2,624,530=, Holliday U.S. Pat. No. 2,156,288, Huang U.S. Pat. No. 6,138,943, Ishaba #JP2004-026034, Klug #DE201109872U, #DE29816078U, #DE19840847 & #DE19737616, Lepere at 'The Aeroplane' Dec. 3, 1930, Louis-Guerin #FR1328507=, Maleysson #FR2774355, Malewicki U.S. Pat. No. 4,068,810, Malik #GB2306426≈, Mitzar at www.fordpinto.com/mitzar1.htm, Morel #FR2155811=, Motte #FR994341, Mueller DE892868=, Nicolaides U.S. Pat. No. 4,375,280, Nye U.S. Pat. No. 2,593,785=, Parodi #DE2439009≈, Patel #CA2051379, Perotta #EP0839712, Price U.S. Pat. No. 3,610,660, Read U.S. Pat. No. 2,410,234=, Rogers U.S. Pat. No. 1,730,627, Roussel #FR1039983, Schey #FR1485308=, Schreffler U.S. Pat. No. 2,770,427=≈, Siesel U.S. Pat. No. 2,557,894, Silver U.S. Pat. No. 1,568,095, Skyline #DE29506498U, Sweeney Aerocar2000 at www.aerocar.com, Transairsystems Flying Motorcycle at www.flyingmotorcyclecompany.com, Troalen #FR912297, Turner U.S. Pat. No. 2,553,952, Ufer #DE19951850*=, Vranek=at www.roadabletimes.com, Watermann Aerobile at www.aerofiles.com/waterman-w5.jpg, Wenhua #CN1067622, Williamson at EAA Sport Aviation, June 2001 and U.S. Pat. No. 4,358,072, Wolff U.S. 2006-733155 and Zielinski #DE1925520.

The first bi-plane Cycle was 1910 by Wilson #FR411086 and the first biplane flying car was 1912 by Salgat #FR447110. Other bi-/multi-plane art is by Alpert U.S. Pat. No. 3,931,942, Bailey U.S. Pat. No. D 155,569, Baptiste U.S. Pat. No. 1,780,298,≈, Bauer #FR444116, Fabre #FR2848147=, Gill 220207 U.S. Pat. No. 1,405,407, Gretler #CH106915=, "CA-NE"* by Fletcher published at www.roadabletimes.com, Hanke #FR694848, Illgen U.S. Pat. No. 1,445,953, Johnson #FR570924, Kikukawa #JP2003327198 & #JP2006-213225, Leistner #DE2438526*, Lewis #GB125695, Mooneyham "Fledgling" at a-jmooneyham.com, Moore U.S. Pat. No. 1,674,338, Righi #DE1016567=, Schröder U.S. Pat. No. 1,151,297, Simonini≈ at www.roadabletimes.com, Tampier #FR512703 & GB151635, Wolcott U.S. Pat. No. 3,451,645, Xu #WO2008-063707 and Yang #WO0130596.

Parachute-wing roadables are by Begak*≈ at www.aerolab.ru, Bragg U.S. Pat. No. 6,877,690, Caruso U.S. 2005-247819≈, David U.S. Pat. No. 5,078,335, Fan #CN1256227≈, Flyke & Xcitor at www.fresh-breeze.de, Fuller Dymaxion at http://shl.stanford.edu/Bucky/dymaxion/4Dtransport.jpg, Howard U.S. 2007-023566, Jang #KR2002-007697, Paracycle at www.paracycle.com, Poling U.S. Pat. No. 4,657,207, Pooringu #JP61064505, Preston U.S. Pat. No. 7,066,426 and U.S. Pat. No. 7,300,019, Wang #CN2617682Y, Ye #CN2646049Y and Yehui #CN1137982.

Lighter than air flying cars were proposed 1911 by Schleicher U.S. Pat. No. 0,998,553 and 1917 by Jelalian U.S. Pat. No. 1,247,960.

High aspect-ratio art is normal for supersonic aircraft. Arguably the first application to a flying car using a propeller for both ground and air movement was 1914 by Pauley #GB191412043≈. Various high aspect ratio flying car art is by Akademie der Wissenschaften #GB1312296≈, Coates U.S. Pat. No. 3,026,066, Yearic "Cycleplane" at www.cycleplane.com, Dobson U.S. Pat. No. 3,292,721, Einarsson U.S. Pat. No. 3,090,581, Fabre #FR2868991, Feng 050831 #CN1660669≈, Horton U.S. Pat. No. 2,734,701, Le Bel U.S. Pat. No. 2,989,269 and U.S. Pat. No. D188,359, Martin U.S. Pat. No. 3,029,042≈, Novinger U.S. Pat. No. 2,713,465, Pages 510621 #FR983334, Pan #CN1672994, Porter/Kissel at http://freeenergy.ca/news/118/ARTICLE/1334/2007-04-09.html, Rado U.S. Pat. No. 7,063,291≈, Rethorst U.S. Pat. No. 2,681,773, Sawyer U.S. Pat. No. 3,317,161, Stevenson 020901 CA2338852≈, Szakacs U.S. Pat. No. D331,893, Takeda #JP4050098, Trautman at www.roadabletimes.com and prototype at "Fantasy of Flight Museum", Wernicke U.S. Pat. No. 5,417,386*, U.S. Pat. No. 5,435,502* and U.S. Pat. No. D370,435* and Zhu #CN1693102≈.

The first telescopic-wing roadable aircraft were 1930 by Jezek U.S. Pat. No. 1,756,463 and 1935 by Nystrom #GB422188. Art by Ayoola U.S. Pat. No. 4,579,297, Bel Geddes at www.roadabletimes.com, Burri #FR921308, Calkins U.S. Pat. No. 3,065,938, Consolidated Vultee at www.unrealaircraft.com/roadable/cv_111.php, Gero U.S. Pat. No. 2,609,167, Hall U.S. Pat. No. 2,562,490, Hegger #AT367306T, Kekus #DE29720537U, Leistner #DE2357628, "Pegasus" of Virginia Tech and Loughborough University at www.aoe.vt.edu/design/pegasus, Raehmer #DE19907791, Righi #DE1016568, Sakamoto #JP11198621≈, Sarh U.S. Pat. No. 4,881,700 and U.S. Pat. No. 4,986,493, Smith U.S. Pat. No. 3,379,395, Strong U.S. Pat. No. 2,923,494 and Wang #CN2640919Y followed.

Folding wings are normal on aircraft carriers. Collapsible wings are normal for hang gliders. The technology was employed 1909 in a flying car by Boyer #FR412339 and 1912 by Barcz #GB191125040. It was adapted 1910 to an "aerial machine adapted to travel also on land" by Clements #GB191127811. Arguably the first flying car using a collapsible wing was by Vuia 1906 (published in "Roadable Aircraft—From Wheels to Wings", Professor Palmer Stiles, Florida Institute of Technology, Custom Creativity, Inc. Melbourne, Florida USA, 1994). Art with longitudinally folding wings is by Bianchi #FR657742 & #BE352605, Dillingham U.S. Pat. No. 1,545,553, Fiedler #BE964939, Greil #DE10159082, Krams #DE10215176, Magin #DE3247168≈, Purcell U.S. Pat. No. 3,614,032, Miller U.S. Pat. No. 5,050,817, Magallon #FR2687616, Pham U.S. Pat. No. 6,974,105, Bragg U.S. Pat. No. 6,086,014≈, Rienks

DE3430412 Rinaldi #FR2806351, Westerweller #DE9208000U and Zieger U.S. Pat. No. 6,073,882*. Art with laterally folding wings is by Bryan= at www.roadabletimes.com, Budanov #RU2231477 and #RU2228283, Bullard U.S. Pat. No. 4,881,701, Chambon #FR2582284≈ and #FR2577198, Dietrich #WO2007-114877* and at www.tranfugia.com, Einstein U.S. Pat. No. 4,627,585=, Fabre #FR2896728=, Fitzpatrick U.S. Pat. No. 4,913,375≈, Geoffroi #FR2591559≈, Gromovitskij #RU2046063, Haynes U.S. Pat. No. 6,619,584*, Jackson J10 at www.roadabletimes.com, Julian #FR1503815, LaBiche #US2003094536, Lee #KR2003-0083449, Mills U.S. Pat. No. 3,065,927, Milner U.S. Pat. No. D545,925 at www.milneraircar.com, Morgan U.S. Pat. No. 3,684,216=, Occhini #WO9304919=, Poulet #FR939720, Pruszenski U.S. Pat. No. 4,899,954≈, Rethorst U.S. Pat. No. 2,811,323, U.S. Pat. No. 3,083,936 and U.S. Pat. No. RE25,368, Scherz U.S. Pat. No. 3,371,886, Schilder #NL8402565≈, Sieksmeier #DE202006017959≈, St. Celestine #GB121393, Stiles "Carnard" #SAE932601, Strongmobile at www.roadabletimes.com, Tubbe U.S. Pat. No. 1,731,757≈ and Wooley U.S. Pat. No. 5,201,478, Gridlock Commuter & TailFan at www.space.com.

Swinging wings enable speeds varying from short landing range to supersonic. They are also used for storage in confined spaces on aircraft carriers, in hangars and—as in this case—within the lane of a road. Known swing-wing, roadable aircraft store the wings either above, below or on the side of the vehicle. [Note 3: "⇑" denotes wing-tips stored pointing forwards.] The first swing-wing roadable aircraft with wing storage above the vehicle "with means for furling the planes . . . in order to facilitate transport on land when the machine is folded" was 1911 by Thompson #GB1910019485. The state of the art is arguably Aubert #DE10346189*=, Einstein U.S. Pat. No. 6,786,450* and Gregory "Solstice"* at www.roadabletomes.com. Other art is by Aernova #AT166746B⇑=, Bland U.S. Pat. No. 2,940,688=, Bourhis #FR569104≈, Carpenter U.S. Pat. No. 2,692,095, Chiquet U.S. Pat. No. 4,022,403, Freyberg #FR594602≈, Griffith U.S. Pat. No. 2,628,792≈, Herrick U.S. Pat. No. 2,699,299= and U.S. Pat. No. 2,879,013=, Husain #GB2134865, Kirillov #WO9961267, Krassin "011SATS" ⇑ at www.roadabletimes.com, Martin #CA648182, Nelsch U.S. Pat. No. 1,816,653, O'Brian #GB191220093, Pescara U.S. Pat. No. 1,485,704, Pham U.S. Pat. No. 5,836,541 and U.S. Pat. No. 5,984,228, Reinke #DE452791, St. Celestine #GB121393, Smith U.S. Pat. No. 2,539,489, Snead Design#6 at roadabletimes.com, Sprat U.S. Pat. No. 2,128,060 (p. 1. col. 2, line 6), U.S. Pat. No. 2,623,712 and at www.georgespratt.org, Vieriu U.S. Pat. No. 1,998,148, Walden U.S. Pat. No. 1,458,787, Whitehead #GB2259286, Wooley U.S. Pat. No. 6,224,012, Wu #CN1887609, Xu #CN1955022, Yang #CN1948034 and Zuck U.S. Pat. No. 3,056,564.

The first swing-wing roadable aircraft with wing storage on the side of the vehicle was 1908 by Schmid #FR394779 followed 1918 by Longobardi≈ at www.roadabletimes.com. Other art is by Allenbach #CH692977≈, Aylor U.S. Pat. No. 2,893,661=, Berton #FR2603232, Cheng #CN1377790=≈, Clark #FR988619, Cotton #GB143591, Crow U.S. Pat. No. 6,131,848*, Crnogorac #DE10221304⇑, Delmotte #FR2426584≈, Dodd U.S. Pat. No. 3,012,737⇑=, Fred U.S. Pat. No. 209,659,911⇑, Geisse U.S. Pat. No. 2,434,068=, Gero U.S. Pat. No. 2,609,167, Glinnikov #WO0123197≈, Groeger U.S. Pat. No. 4,165,846, Hallock "Roadwing" at www.roadabletimes.com, Halsmer U.S. Pat. No. 3,134,560=, Henry U.S. Pat. No. D205,328=, Ishijima #JP2004-082992⇑, Lanoy #FR986352, Marinelli U.S. Pat. No. D182,071⇑=, Miller U.S. Pat. No. D257,629 and U.S. Pat. No. 4,269,374=, Miller U.S. Pat. No. D207,929 and U.S. Pat. No. D217,402, Mills U.S. Pat. No. 2,707,084, Nystrom #GB422188, Ogden #GB958427≈, Palermo U.S. Pat. No. 2,938,681, Pellarini U.S. Pat. No. 2,674,422, Pham U.S. Pat. No. 6,129,306, Poetes #DE1260987, Skaggs U.S. Pat. No. D1,923,37=, Spitzer U.S. Pat. No. 6,082,665*⇑=, Stockwell Corvair at roadabletimes.com, Thompson U.S. Pat. No. 2,402,468, Tsuda #JP61057457 and Wagner U.S. Pat. No. 2,103,881. Rethorst's art USRR25368 stores a swing-wing inside the fuselage.

The first swing-wing roadable aircraft with wings stored underneath was 1944 by Griffith U.S. Pat. No. 2,350,608≈. Other art is by Chevrollier #FR60005E, Creatix at www.schreiblogade.de/2006/07/alfa, De Jean U.S. Pat. No. 2,812,911, Perl U.S. Pat. No. 2,573,271⇑, Nichols* at www.roadabletimes.com, Strong U.S. Pat. No. 3,612,440 and Talon #FR964155.

Additional, undefinable roadable aircraft art is by Adem #CA2572448, Dimitrov #BG98694, Dufwa #GB190916367, Jia #CN2692028Y, Ki #KR100222085B, Mo #CN48036, Rith #FR587913, Smith #CA492189, Swiderski #CA566301, Tigue #CA795663, Xiong #CN2413938Y and #CN85202242U.

In summary, of the more than 500 known flying cars, 320 have non-rotary wings. Of these, 26 are primarily bi-/multiplanes, 36 have laterally folding wings, 20 have longitudinally folding wings, 86 are modular, 17 have a parachute wing, 21 have a telescopic wing and 84 have a swing wing. 35 are operable on water (≈). 44 have twin booms (=), 21 of which are modular, 5 with folding wings and 3 a bi-plane. Of the swing-wings, 8 store the wings below, 41 on the side and 35 above the vehicle. Of the swing-wing vehicles with wing storage above, 5 employ twin booms (=) and one stores the wing-tips forward (⇑). Of those storing them below, 1 stores the wing-tips forward (⇑). Of the swing-wing vehicles with side wing-storage, 10 employ twin booms (=) and 6 store the wing-tips forward (⇑).

44 roadable aircraft employ twin booms but none employ two fuselages. Booms, as opposed to fuselages, are merely thin, pipelike beams. (The distinction between "twin cabin", "twin boom" and "twin fuselage" is appreciated when viewing Northrop U.S. Pat. No. 1,929,255, which is a twin cabin, twin boom but not a twin fuselage aircraft.)

Twin fuselages improve the state of the art in 9 ways: 1. in both boats and aircraft, twin hulls generally have better performance than single hull arrangements. Sailing speed records are held by catamarans. Catamaran ferries are faster and more economical than single-hulled vessels. The first aircraft to circumnavigate the globe without refuelling (Voyager, Rutan) had a twin boom (with central cabin and motor). In cases where single-hulled, non-roadable aircraft have been reworked into twin fuselage versions (e.g. the North American P-51 Mustang and its twin version F-82 and the Heinkel He-111 and its twin He-111Z), the twin configuration had largely better performance than its single-fuselaged counterpart. 2., a configuration with in-line wheels on both sides of an aircraft, both fore and aft (i.e. a minimum of four wheels) is far better for ground manoeuvring, landing and overall stability because, due to their light weight, aircraft are more susceptible to wind gusts and also because they, albeit briefly, operate at higher speeds on land than most other types of vehicle. The reason why such configurations aren't widespread lies in aviation's evolutionary history: The first fixed-wing aircraft had only two wheels and a rear skid for grass landing. As aircraft became faster, a small, rear-mounted tailwheel replaced the skid. When it was realized that a nosewheel arrangement provided superior handling, a large front wheel became necessary. Apparently, the extra profile drag created by a large third wheel was accepted unquestioningly although it would have been better to place not one but two nose wheels in line with and in front of the existing main wheels (to reduce drag and increase stability). The problem was; there was no cross-bar or wing under which to mount two forward wheels on the standard, monoplane, single-hulled aircraft of the time. And extra struts and spats would have incurred more drag than the large, central wheel . . . 3. A twin-hull obviates the need for wheel struts and spats because the wheels can be housed directly in each hull. This principle is even more relevant when applied to float planes, the pontoons of which create massive drag. This issue is addressed by the non-roadable, twin fuselage, float-/sea-planes of Martin U.S. Pat. No. 2,656,136, Wukovitz U.S. Pat. No. 5,242,132, Ratliff U.S. Pat. No. 5,415,365, Monjouste U.S. Pat. No. 1,778,906, Kelly U.S. Pat. No. D138,102 and was articulated 2003 by Meekins' U.S. Pat. No. 6,592,073 (which is a taildragger on land). 4. Twin fuselages provide a wide wing-storage platform. 5. Twin fuselages act as bridging elements, allowing the length of the outer spars to be shorter, thereby improving strength/safety and lowering weight. 6. Twin fuselages reduce profile drag by placing the occupants and the large road wheels in line with each other (relative to the direction of forward motion). 7. Twin fuselages are the only configuration allowing superimposed wings to be stored diagonally (front low, rear high) thereby increasing their overall length (Pythagorus' theory) while still maintaining compact car length. 8. Twin fuselages completely shield the centrally located airscrew from pedestrian contact. 9. Twin fuselages avoid unsightly storage of the wings above, below or on the side of the vehicle. The only appreciable disadvantage of twin fuselages is that the occupants don't sit directly next to each other.

2). Of the almost 100 published roadable aircraft operable on water, 35 have non-rotor wings. In the majority of this art, operability on water is not illustrated or explained but merely declared as a theoretical possibility. Where illustrated, most art employs single hulls. Only one uses three hulls in the form of longitudinal pontoon floats (Fitzpatrick U.S. Pat. No. 4,913,375). Allenbach #CH692977, Freyberg #FR594602, Klug #DE19808862 and Krassin at www.roadabletimes.com each employ two longitudinal floats. In all of these, the floats are modular attachments. None has integrated or automatically deploying floats which are stowed to reduce drag. Only Krassin retracts the wings during water operations. None has an extra, stowed, marine propeller or automatic deployment thereof. This invention improves the state of roadable art by providing these features.

3). Swing-wing mechanisms are numerous. Whereas aircraft which change wing-sweep during flight require strong transit mechanisms, those using a sweep mechanism for storage purposes only, merely require strong locking mechanisms. Among these are hangared or carrier aircraft, roadable aircraft and towed/trailered aircraft.

The wings of most trailered aircraft don't swing or fold but are modular, being detached after flight and placed beside the fuselage longitudinally for towing. Trailered aircraft thus enjoy the dual advantages of; a). their spar-roots can be inserted into sturdy cavities, thereby increasing strength, and b). they dispense with the weight of a swing/fold mechanism. Conceptually, the instant art is like a towed aircraft where the bodies of the towing vehicle and the aircraft have been combined and spar-insertion into a cavity is automated.

Despite a search considerably more intense than for roadable aircraft, no known art was sourced which combines the following characteristics into one mechanism: Swing-wing art in which the wings are stored completely superimposed, the wingtips are stored pointing forward, the wings are first drawn backwards before being rotated outwards, the cambered section is stored on the opposite side to its deployment, the skew-stored wings deploy by rotating through parallel, skewed planes and have a self-righting mechanism, the spar-roots are not hinged/pivoted, external arms/struts are attached further out along the wings, the external struts sink in flush with the wing's surface, rails and pivots are employed on both wings and fuselage(s). Only the first four of these characteristics are found in Perl U.S. Pat. No. 2,573,271.

The lack of such art is likely due to the contradictory nature of combining a swing-wing with a twin fuselage. Swing-wings are used to narrow width whereas twin fuselages are generally used as bridging elements to increase width.

A property of swing-wing storage mechanisms generally peculiar to those roadables which store their wings longitudinally either above or below the fuselage is that, when stored, the wings don't just partly overlap but are actually superimposed or "placed one on top of the other". The reason for this is to take advantage of the vehicle's full width to achieve the widest possible wing chord and wing area. In such cases, in addition to the swing-out/back mechanism, a raise/lower mechanism is necessary. In known art, the upper wing lowers only after swinging out and is raised again before swinging in. Furthermore, where just one central pivot is used, spar stubs which extend inward beyond the pivot (as in the instant art) cannot be employed because they'd block each other. This only becomes possible where separate pivots are placed widely apart, i.e., on separate fuselages.

The instant invention therefore improves the state of the art for superimposed-storage wings in roadable aircraft by enabling wing-spars to be inserted into sturdy cavities and by providing a smooth deployment mechanism via skewed, parallel planes of rotation.

4). The instant art has a mechanism for alternating flying and driving controls based on two principles: a). There should be no potential for confusing the controls. (For this reason, a steering wheel is used for driving but a yolk is not used for flying. This is because the turning motion of a car's steering wheel is for yaw, whereas the same turning motion of an aircraft's yolk creates roll. Similar factors would apply to an accelerator or brake pedal used for driving doubling as rudders used for aircraft yaw. If the same pedals were used in both configurations (but with different functions), depressing the right pedal would either turn or accelerate the vehicle, whereas pressing the left pedal would either turn the vehicle the other way or stop it. The resulting potential for confusion would increase the risk of accident. If all 4 pedals were mounted next to each other, confusion would also exist and space issues would emerge). b). Accidental use of controls should be impossible when they are not in use. (For this reason, in the instant art, the steering wheel retracts into the dash board, the joystick lowers into the floor and all pedals push up against the front cabin wall where they cannot be depressed when not in use.)

In addition to a yolk for aerial manoeuvring, large airliners sometimes employ small, horizontally mounted steering wheels for ground manoeuvring (rather than relying on wheel-linked rudder pedals). This is due to differing turning angle requirements at vastly higher or lower speeds. Occasionally, fixed-wing aircraft use brake levers instead of or in addition to the standard toe or heel brakes mounted on or below rudder pedals. Otherwise, hybrid fly/drive steering mechanisms are found almost exclusively in roadable aircraft.

Most known roadable aircraft art does not describe or even mention steering controls. Where it is mentioned, in most cases each mode exists alongside the other and does not change position or function. (For example, LaBiche U.S. 2003-094536 has 4 foot pedals, a steering wheel and a side-mounted joystick. Wolley U.S. Pat. No. 5,201,478 uses five pedals, (l. to r.): rudder, clutch, brake, gas, rudder, a steering wheel (road) and a joystick (air).

Known novel hybrid steering art for roadable aircraft is: Hallock's "Roadwing" at www.roadabletimes.com, Arbuse U.S. Pat. No. 3,645,474, Pham U.S. Pat. No. 6,129,306 FIG. 8, "Magic Dragon" at www.strongware.com/dragon (redeveloped as U.S. Pat. No. 2,923,494), Photos of Wernicke's prototype (U.S. Pat. No. 5,435,502), Scherz U.S. Pat. No. 3,371,866, Finley #GB2239642, Wolff US2006-733195, Sweeney at www.aerocar.com, Groeger in U.S. Pat. No. 4,165,846, Crow U.S. Pat. No. 6,131,848, Virginia Tech "Pegasus" (final paper), Spitzer U.S. Pat. No. 6,082,665 FIGS. 19 and 21, Sarh #4881700 FIGS. 21, 22 and 24 as well as U.S. Pat. No. 4,986,493 and Williamson U.S. Pat. No. 4,358,072 FIG. 5.

Hallock's "Roadwing" (at www.roadabletimes.com) is a "flying wing", i.e. without empennage or rudders. Based on examination of cockpit photos, its yolk apparently controls roll as well as yaw both on the ground and in the air via a coordinated rudder/aileron linkage. In Arbuse U.S. Pat. No. 3,645,474, non-used elements (rudders, joystick) are manually removed. Pham, U.S. Pat. No. 6,129,306, FIG. 8, simply puts driving controls at the left seat and flying controls at the right seat. Pham's rudders are aerodynamic only, necessitating reaching across to the steering wheel during takeoff and landing rolls. Joystick and throttle are on the mid console. "Magic Dragon" at www.strongware.com/dragon (redeveloped U.S. Pat. No. 2,923,494) has a semi-stowable steering wheel, a centrally mounted "T" stick, a throttle on the left door, an accelerator pedal, foot brake and stowable rudder pedals. The procedure for stowing the steering wheel and rudder pedals is neither visible nor explained.

Photos of Wernicke's prototype (U.S. Pat. No. 5,435,502) show rudder pedals behind and to the left and right of a brake pedal along with a yolk for both roll in the air and yaw on the ground.

In Scherz U.S. Pat. No. 3,371,866, the left and right rudder pedals control left and right yaw and left and right braking respectively whilst in aircraft configuration. However in car configuration, the left pedal serves as a clutch and the right one as a brake for all four wheels. For pitch control, Finley #GB2239642 uses "a lever similar to a car gear selector lever . . . Roll control is by a car type steering wheel."

Wolff U.S. 2006-733195 in his motorcycle/hang-glider "uses the single handlebar of the motorcycle for control of pitch, roll, and yaw while airborne, as well as for steering when on the ground."

Sweeney at www.aerocar.com uses an overhead mounted, downwardly extending joystick for pitch and roll. A steering wheel controls both terrestrial and aerial yaw. The gas pedal controls propeller and wheel power with a back-up, roof-mounted gas lever.

Groeger in U.S. Pat. No. 4,165,846 specifies: "steering of the vehicle by the joystick . . . remains identical on land, in water and in the air" without articulating how.

In Crow U.S. Pat. No. 6,131,848, lateral joystick movement controls terrestrial and aerial yaw while longitudinal movement controls pitch. Three pedals control clutch, brake and accelerator. Controls for roll are retracted when wings are not deployed. This function is not explained. In "Pegasus" by Virginia Tech, its final paper articulates "a sidestick mounted in the door panel . . . used to control pitch and roll during flight and also utilized for steering while on the road". It describes "a three pedal system with only two pedals being operational in either mode. In flight the Pegasus uses standard rudder pedals . . . Between the rudder pedals lies a standard automobile brake pedal . . . the toe brakes at the top of the pedals are hinged as in standard aircraft. In road mode the aircraft toe brake pedal on the accelerator becomes inoperable". "Pedals are used for rudder control with the right rudder also doubling as the accelerator in car mode." The controls "can be converted from one mode to the other at the press of a well shielded button".

Spitzer's inventive solution involves a steering wheel mounted at the end of a joystick. In his descriptions and his FIGS. 19 and 21 in U.S. Pat. No. 6,082,665, he combines a pivotally mounted yolk for aircraft pitch and roll with a steering wheel for automobile yaw along with a mechanism to switch from one to the other via which the rudders, elevators and ailerons are locked when not in use. Pivotally mounted rudder pedals control yaw in flight.

In Sarh #4881700, FIGS. 21, 22 and 24, a control wheel operates elevators when moved fore/aft. When turned left/right, its initial range fully moves the ailerons while only partially turning the front wheels. When turned further, it turns the front wheels to full range. In car mode, a locking device restrains elevator and aileron movement. There are 4 pedals; from left to right: left rudder/toe brake (to the left of the control wheel), (and to the right of the control wheel . . . ) right rudder/toe brake, brakes for all wheels, accelerator pedal. In U.S. Pat. No. 4,986,493, (Sarh), the brake pedal is retracted upwards during flight. Also in this later art, the rudder pedals ($1^{st}$ & $2^{nd}$ from left) are immobilised for driving.

Williamson's U.S. Pat. No. 4,358,072 modular roadable aircraft consists of a "nose platform" and a "land vehicle". In his FIG. 5, he shows how the cockpit and a "control stalk" (containing the lines to the control surfaces) are joined together and explains the ensuing procedure for hooking up the controls. The steering wheel sinks forward into the dashboard while the gas and brake pedals fold up into the underside of the dash board. Rudder pedals are then folded up through the floor to where the auto pedals had previously been. The flying yolk is stored vertically in the forward, central console. For flight it is first swung up/back, then rotated left around a single joint.

The invention disclosed here improves the state of the art by automatically redeploying from independent standard car controls (steering-wheel, brake pedal and gas pedal) to independent standard aircraft controls (joystick, rudders with toe-brakes and throttle) where none of the sticks, wheels, pedals or levers have a dual function and all of the controls of one configuration are stowed and inoperable when the other is deployed.

The state of the art is further improved by the combination of five functions: 1. conversion of the controls; 2. conversion of the power linkage from wheels to airscrew; 3. wing-locking; 4. mirror deployment and 5. conversion of lighting wiring, into one lever. Further improvement derives from combining automatic gear transmission, wing extension, wing retraction, propeller pitch and aircraft throttle into another separate lever.

[The controls of rotorcraft are in many aspects fundamentally different to those of fixed-wing aircraft and are not discussed here.] [The linkage between steerage and control surfaces is interrupted in modular, folding- and swing-wing aircraft; however, since no claims are made in this area, it is neither discussed nor illustrated here.]

Technical Problems To Be Solved

The technical problems to be solved are; to provide an integrated road/air/water vehicle which I). conforms to the dimensional and other legal requirements for all three vehicle types and is II). safe, III). efficient, IV). practical and V). aesthetic.

I). The primary purpose in regard to dimensional and other legal requirements is to provide a flying vehicle with integrated wings which, when converted to automobile configuration, is no wider than 2.55 m, no longer than 20.75 m and no higher than 4.00 m.

II). The purpose in regard to safety is to provide a). a strong but light frame, b). a strong wing spar locking mechanism, c). shielding of occupants via bumper bar and crunch zone from front-end road collisions, d). shielding of pedestrians/swimmers from the airscrew on all sides in all configurations, e). a low stall speed, f). gentle stalling characteristics, g). minimised risk of mechanical failure by having a minimum number of moving parts, h). separation of aircraft and automobile steering to eliminate risk of confusion of controls, i). centralisation of all heavy items (motor, occupants, etc.) to minimise risks associated with disbalance, j). large, side-entry doors for quick and easy emergency exit, k). inoperability of all items (even unintentionally) when they are not in use, l). multiple inflatable bladder-chambers such that landing on water remains possible despite deflation of any one chamber, m). shielding of the marine propeller from swimmers frontally and laterally and n). mounting of the marine propeller such that it poses no danger to airworthiness if accidentally extended in flight.

III). The purpose in regard to efficiency is to a). i). minimise wind resistance by 1). streamlining the fuselages, glider-like, 2). almost entirely enclosing the four large wheels within the fuselage and 3). retracting the wheel tips, ii). centralise heavy items to reduce trim requirements, iii). use only one motor for all modes of transportation to reduce weight, thereby increasing speed and lowering fuel consumption, b). simplify the structure with a small number of moving parts and centralise the main components to lower production and repair costs, c). optimise boat performance and stability by having two hulls and d). optimise marine propeller power delivery by placing the marine propeller near the centre of gravity.

IV). Practicality: The purpose in regard to practicality is to a). have just one vehicle for flying, driving and boating, b). have the vehicle conform to parking spot and garage size limitations as they apply to automobiles, c). enable comfortable road operation by having four independently suspended, standard-sized car wheels, d). provide scope of use beyond individual, short haul or recreational transport by providing seats for two occupants, e). reduce the noise footprint on the ground by locating the motor between the fuselages and above the aircraft, f). allow convenient, automated conversion between the various configurations g). provide a single lever for simultaneous steering conversion, transconfigurational power-transfer, mirror deployment, wing-locking and conversion of lighting wiring h). allow convenient engine management by employing one single lever combining control of automatic transmission, throttle, propeller pitch and wing-extension, i). provide seating comfort by including standard-size head and legroom together with bulges on the sides of each fuselage at elbow height for lateral space, j). provide ease of access by having standard size car doors at standard car height, k). provide familiarity through standard layouts and apportionments (i.e. high-winged, non-tail-dragger aircraft; four-wheel, steering-wheeled car, etc.) and l). provide increased cross-wing landing capabilities by having the wingtips well above the ground.

V). The purpose in regard to aesthetics is to make the invention aesthetically appealing in all its configurations and harmonious inasmuch as it resembles neither a "flying car" nor a "taxiing plane" (nor for that matter a "road-bound boat", a "floating plane", a "floating car" or an "airborne boat").

No prior art combines even half of these features into one vehicle.

SUMMARY

Building an aircraft with a swing-stored wing is not the same as building one with powered wheels and a maximum stored width of 2.55 m but still able to carry a human, i.e. a "roadable aircraft". Roadability is an art. It's not merely miniaturising since a human can't be "scaled down". Roadability is the underlying characteristic applying to all claims herein. Within this overall context, the following discussion of prior art addresses the invention's 1). configuration 2). operability on water, 3). swing-wing mechanism and 4). hybrid controls.

1). No prior art teaches a twin-fuselaged, roadable aircraft. This is because the concept of twin fuselages for a roadable aircraft is counter-intuitive. Firstly, a twin fuselage creates extra drag which can be minimised if there is only one cabin. Secondly, the most critical, defining aspect of a roadable aircraft is reduced width. To accommodate more than one occupant, the seemingly logical preferred solution would therefore be tandem seating followed by side-by-side seating but certainly not an extra cabin/fuselage. Thirdly, in non-roadable aircraft, twin fuselages are generally employed to increase overall width by providing bridging-stages to strengthen the wing span. In a roadable aircraft, the defining feature of which is how narrow it is, it would seem illogical at first impression to employ a structural element normally used to widen the wingspan.

Twenty-three non-modular, roadable aircraft have twin booms. However, booms are merely pipelike beams existing alongside and in addition to a central fuselage.

The only known—albeit non-roadable—invention to employ cocoon-like, modular cabin elements in the context of a mass aerial transport system where multiple fuselages are themed is Couse U.S. Pat. No. 2,368,288. None of Couse's airframes are roadable which along with its overall characterisation, modularity and other factors significantly differentiate it from the instant art.

A modular roadable with fuselage-mutation is by Arpas #DE2547435. In that art, the front cabins are slid apart to expose the airscrew behind, whereupon the modular wings are attached. The resulting vehicle has two forward, cabined bodies with a central, rear fuselage containing the motor. This configuration along with its modularity are significantly different to the instant art.

A twin fuselage applied to a roadable aircraft is the novel, innovative step.

2). No prior art teaches a twin fuselage, roadable aircraft operable on water. Allenbach #CH692977, Freyberg #FR594602, Klug #DE19808862 and Krassin at www.road-abletimes.com teach modular, longitudinal parallel twin floats where power is via airscrew (and in Krassin additionally via orientation of the wings vertically to become sails). Among others, Kiffner #DE361942 teaches a marine propeller for non-roadable seaplanes. That art dates from 1922. The combination with a winged, roadable aircraft is the innovation.

The innovative and inventive steps therefore, are the combination of a winged, roadable aircraft operable on water with a). permanently installed (integrated), b). stowed (to reduce drag), c). automatically deployed, d). catamaran-like twin pontoons mounted within the underside of twin fuselages, e). where, for water operations, the vehicle is propelled by a waterborne rather than an airborne propeller which is f). stowable and g). automatically submersible into the water, h). at a point near the vehicle's centre of gravity and i). where the floats comprise inflatable bladders.

The unity of invention derives from the impossibility of deploying either the floats or the marine propeller in the manner described in any other context than a twin fuselage.

3). No prior art teaches all of the following characteristics in one invention: Swing-wing art in which the wings are a). stored completely superimposed (one on top of the other, "pancake-like"), b). the wingtips are stored pointing forward, c). the wings are first drawn backwards before being rotated outwards, d). the cambered section is stored on the opposite side to its deployment, e). the skew-stored wings deploy by rotating through parallel, skewed planes and have a self-righting mechanism, f). the spar-roots are not hinged/pivoted, g). external arms/struts are attached further out along the wings, h). the external struts sink in flush with the wing's surface, i). rails with pivots on trolleys are employed on both the wings and the fuselage(s), j). the wings are stored between two fuselages.

The lack of such art is likely due to the counter-intuitiveness of combining a swing-wing with a twin fuselage. Swing-wings are used to narrow width whereas twin fuselages are generally used as bridging elements to increase width.

Perl U.S. Pat. No. 2,573,271 is a swing-wing roadable aircraft which stores the wings centrally with their tips forward. Wing deployment is effected by first drawing the wings backwards, then rotating the tips outwards. These elements are similar to those of the instant art. Perl's art differs however from the instant art in many points: Firstly, as in the instant art, Perl stores the wings flat, one above the other ("superimposed") with the wings' respective cambers stored on the opposite side to their deployed position so that the cambers must swing past each other to deploy. However, this necessitates either a). skewing of the wings to get the cambers past each other to the other side where they are deployed, therefore requiring; raising one wing-tip higher and lowering the other one. This is physically impossible if the wings are stored near ground level as in Perl's art. Perl offers no solution to this dilemma. The vehicle would have to be driven onto a pedestal to be able to extend the wings in a skewed manner and to avoid one wing-tip from scraping along the ground and snagging; or the other solution would be b). having the upper wing somehow lowered after swinging out and somehow raised before swinging back. Alas, neither the description nor the claims portion of Perl's patent explains how the wings come to be at the same level once they have extended past each other. Perl writes extensively about superimposition, rotation and lateral deployment but apparently didn't solve this aspect (which the inventor of the instant art required two years to do). A second difference is that Perl stores the wings horizontally in a sheath below the vehicle whereas the instant art shields them during road transport behind the canard-mounted elevator and stores them at an angle rising from the front to the rear of the vehicle, Thirdly, this storage is between two fuselages, whereas Perl has only one cabin/fuselage. A fourth difference is that Perl's struts are internal (i.e., they don't protrude past the outer skin). A fifth difference is that Perl uses a fixed wing pivot located at the centre of lift, whereas the instant art uses a rail-borne pivot on the trailing edge where the spar root is not pivoted in any way. [Although known to roadable aircraft art, the concept of non-hinged spar-roots is also counter-intuitive, the first instinct being to want to secure the spar.] A sixth difference is that the strut pivot is at a fixed point on the wing, whereas in the instant art it moves along a rail.

A seventh difference is that the strut roots share a common mounting and actuator whereas the instant art foresees two (one on each fuselage). Many other minor differences distinguish the art of Perl from the instant art.

The innovative, inventive steps in regard to the instant swing-wing art therefore are: a). The instant art is the only swing-wing applied to a twin fuselage, roadable aircraft, where b). the wings are stored between the two fuselages. c). The instant art is also unique in having two counter-rotating pivot points attached to the wing, each of which moves along a separate rail. One is attached to the wing-root and travels along a rail on the fuselage between the rear of the aircraft and the middle of the aircraft. The other is attached to the strut insert and travels along a rail between the root of the wing to the middle of the wing. d). Furthermore, it is the only swing-wing art to combine the following characteristics into one invention: Swing-wings i). stored completely superimposed, ii). wingtips pointing forward, iii). spar-roots not hinged/pivoted, iv). with external arms/struts, v). where the wings cambers lie opposite to their deployment side, and they are vi). stored at a skewed angle where vii). the wings are first drawn backwards before rotating outwards, viii). then rotate through parallel, skewed planes, ix). then are leveled via a self-righting mechanism, x). whereupon the external struts sink in flush with the wing's surface.

The unity of invention derives from enabling 1). a wing with a chord not exceeding roadable width to be stored perpendicular to its deployed position longitudinally 2). between the twin fuselages of a roadable aircraft. It also derives from 3). the need for the swivelling struts used to effect the wings' rotation to be supported by a firm base which cannot be located centrally but must be located to the left and right of the wings' stored position on the separate fuselages. The invention would not work on a single fuselage not only because the wings are stored between two fuselages and not only because the strut's origins would lack a support base (as explained above) but also because 4). the spar-roots protruding from the wings' root need the space between the fuselages to accomplish their rotation past each other.

4). No prior art teaches a joystick stored flush to the cockpit floor. No prior art teaches pairs of pedals which slide alternately fore and aft. No prior art combines the five functions: conversion of the controls; conversion of the power linkage from wheels to airscrew; wing-locking; mirror deployment and conversion of lighting wiring, in one lever. No prior art combines automatic gear transmission, wing extension, wing retraction, propeller pitch and aircraft throttle in one lever.

Sarh in U.S. Pat. No. 4,986,493 retracts the brake pedal upwards before flight. This is different to the instant art where the brake pedal is coupled with the accelerator pedal and both rotate past the rudder pedals (which are going the other way) to end up at the front wall of the cabin. Moreover, the brake pedal stays at the same level and doesn't move or retract upwards.

In Williamson U.S. Pat. No. 4,358,072, the steering wheel sinks forward into the dashboard while the gas and brake pedals fold up into the underside of the dash board. Rudder pedals are then folded up through the floor to where the auto pedals had previously been. Whereas the upward folding motion of all pedals is dissimilar to the fore/aft motion of the instant art, the steering wheel sinking into the dashboard is similar. It differs however in many aspects of context. Firstly, Williamson's art is modular. Stowage of the steering wheel in the dash board is accomplished manually during the multi-staged procedure of attaching the wings and power-plant and reconfiguring the vehicle for flight. Furthermore, the controls which replace the steering wheel are again manually deployed and consist of a foldable yoke. This is all very different to the instant art. In the invention disclosed here, the sinking of the steering wheel into the dashboard is automated and occurs momentarily upon pulling a lever. The same hand-lever redeploys the foot-pedals. In the same motion, the joystick appears. This is different to the manually initiated, multi-stage fold-out mechanism of Williamson's yoke.

The innovative, inventive steps in regard to the hybrid controls therefore are:

a). A method for automatically exchanging separate and independent car controls (consisting of steering wheel, brake pedal and gas pedal, all in standard positions) and standard aircraft controls (consisting of joystick, left rudder pedal with toe brake and right rudder pedal with toe brake, all in standard positions) where none of the sticks, wheels or pedals have a dual function, all of the controls of one configuration are stowed when the other is deployed and all of the controls not in use are inoperable, although they remain connected, whereby i). the joystick is stored in a rut in the floor from where it rotates upward to deploy, ii). the brake and gas pedals are coupled together and the two rudder pedals move simultaneously as if coupled such that movement of the one pedal-couple in one direction causes the other pedal-grouping to move in the opposite direction, and iii). the pedals all move laterally along the floor without changing height, and iv). both car pedals are located between the aircraft pedals, and v). the car pedals move along a curved rail so that, when deployed, the gas pedal assumes the position where the right rudder pedal had previously been and vice versa.

vi). all pedals, when not in use are moved up against the front cabin wall so that they can no longer be depressed when stepped upon.

b). Combination of the five functions: conversion of the controls; conversion of the power linkage from wheels to airscrew; wing-locking; mirror deployment and conversion of lighting wiring, into one lever;

c). Combination of the five functions: automatic gear transmission, wing extension, wing retraction, propeller pitch and aircraft throttle into one lever.

The unity of invention derives from the impossibility of applying these control devices to anything other than a winged, roadable aircraft.

DISCLOSURE OF THE INVENTION

In the preferred, non-restrictive embodiment, the invention comprises two parallel fuselages each with a front, side-door accessed cabin for one reclined person. The fuselages are joined midway at roof-level via a central main-wing containing a motor and at their lower front by a canard wing. The lower side of the central main-wing has two cavities on each side into which the fore and aft spar roots of each outer wing are inserted. At the rear of the motor is a pusher-propeller; at its front is a gearbox followed by a main drive shaft. The main drive shaft runs midway between the fuselages down to the canard where its power is delivered via a differential and perpendicular drive shafts to two steerable front wheels located within the fuselages to its left and right respectively. An elevator is attached to the canard wing's rear. The front wheel encasings serve as aerodynamic rudders. Rear wheels are located at the rear of each fuselage, behind each of which is another aerodynamic rudder.

The two outer wings are stored one above the other, tips forward, roots high, parallel to and between the fuselages. A main-spar stub and aft-spar stub stick out from the root of each wing. During storage, the upper rear fuselage's shell folds down into the lower rear fuselage exposing a shelf. The wider root-ends of the wings, each containing a trailing edge flap, are stored above this shelf. The wings' narrow tip-ends, each containing an aileron, are stored between the cabins toward the front portion of the vehicle. The leading edge of the left outer wing and its cambered ridge is stored on the vehicle's right side, and vice versa for the other outer wing.

Each outer wing is supported by an "L"-shaped swinging arm mounted in the same plane as each outer wing's underside. In storage, the upper "L"-leg points backwards and the lower "L"-leg points outwards. Below the tip of the lower "L"-leg is a swivelling support located behind the occupant's seat which extends downwards slightly off vertical. The tip of the upper "L"-leg is attached to a rotating, sinking joint affixed to a sliding trolley in a rail located in a rut running parallel to the span and along the centre of the underside of each outer wing, from its middle to its root.

A rearwardly extendable empennage beam lies within each fuselage. Its origin is under the occupant's feet. From there it runs upward, curving twice, then through and slightly beyond a hinge at the upper rear tip of the fuselage. Behind the hinge it is joined to the other empennage beam via a raised crossbar which is enclosed within a horizontal stabilizer. Behind the horizontal stabilizer is an actuator-operated auxiliary elevator. Below it on its left and right are vertical stabilizers, behind each of which are actuator-operated, auxiliary rudders.

The top of each empennage beam has a rail which has an extension connecting it forward to the swivelling support. The trailing edge root of each wing is attached via a rotating joint to a trolley within the empennage rail.

Outer wing extension begins when the empennage beams together with the outer wings are extended backwards until the outer wings' tips lie behind the cabins (phase one). The swivelling supports then rotate the "L"-shaped swinging arms outwards, the outer wings' roots slide simultaneously forward along the empennage rail while the outer wings' tips extend outward (in counter-rotation to the arms) until both outer wings lie across the front of the shelf perpendicular to the fuselages. Just prior to the end of this rotation, the swinging arms slide up into the rut on the outer wings' underside flush to the surrounding surface. The swinging arms now lie with the long leg of the "L" pointing outwards and the short leg forwards.

The front of the swivelling support has an upper rotating joint at shelf level and a lower rotating joint below, each attached to a trolley enclosed within an upward rail. The lower end of the upward rail curves below shelf level ca. nine degrees off vertical causing the supports, the arms above them and therefore also the outer wings to skew laterally. This skew enables the cambered bulges of the wings' leading edges (each of which is stored on the opposite side to where it is deployed for flight) along with their respective spar-stubs to pass each other during extension without interfering with the other outer wing, allowing the wings to rotate in parallel planes (phase two).

The swinging arm, outer wing and front empennage-beam-tip of each side are all attached to that side's swivelling support. When the support is raised along the lower reaches of the upward rail, the lower trolley is forced in line vertically below the upper trolley. This straightens each support, thereby levelling the arms and outer wings. Simultaneously, the rear empennage assembly, see-saws downwards over the hinges at the fuselage's rear tips. The final, upper reach of each upward rail curves again, this time by only approximately two degrees slightly away from vertical toward the centre of the vehicle. This slight curve gives the outer wings dihedral. As the supports reach the top of their respective upward rails, the spar-stubs insert into the openings below the central main-wing. There they are locked in place by pilot-operated locking pins (phase three).

All control surfaces are mechanically linked to the cockpit except for the actuator-operated auxiliary control surfaces on the empennage. The mechanical link between ailerons/flaps and cockpit is disrupted when the outer wings are retracted. Couplings located on each main-spar stub and main-spar cavity respectively, establish the link when the outer wings are extended and locked.

When the lever used to engage the locking pins is pulled, simultaneously the steering wheel, brake and gas pedals recede while the rudder pedals slide forward and the joystick folds upward from a rut in the floor. At the same time, the lever transfers power from the gearbox to the pusher-propeller, retracts a side- & rear-view mirror and switches the lighting from automobile to aircraft requirements. Another lever at elbow level regulates automatic transmission, wing extension/retraction, the propeller's angle of attack and thrust. A third lever controls the flaps. A fourth lever controls retraction/extension of the wheels and closing of their respective doors. A fifth lever controls inflation of the floats for landing on water. A sixth lever controls lowering and raising of the boat propeller.

Each wheel has a cushioned and sprung suspension beam which can be rotated backwards to retract the wheels up into the wheel-well, whereupon doors below close flush with the vehicle's underside.

Six bladders, three on the underside of each fuselage can be inflated to form a floating hull below each fuselage. A marine propeller is latched inside the lower central leading edge. It has a shaft running down to the differential where it is hinged. When the propeller is lowered into the water via a cable and guiding arm, the shaft engages in the differential, providing power for motorboat operation.

Nothing in this brief description of the preferred embodiment should be construed as limiting the scope of the application of the various parts of the invention in other ways or contexts.

BRIEF DESCRIPTION OF THE DRAWINGS

Characteristics of the invention described above will be clear from the following description of a preferential form of embodiment, given as a non-restrictive example, with reference to the attached drawings:

FIG. 1C is a partial cross-sectional right side view of a roadable aircraft midway through phase two of wing extension (wings crossing each other at forty-five degrees and skewed laterally).

FIG. 1D is a partial cross-sectional right side view of a roadable aircraft at completion of phase two of wing extension (wings skewed laterally and extended outward but not yet raised to insert into central wing).

FIG. 1E is a partial cross-sectional right side view of a roadable aircraft at completion of phase three of wing extension (wings leveled and raised into position).

FIG. 1F is a partial cross-sectional right side view of a roadable aircraft in aircraft configuration (wings locked in position, steering and transmission converted).

FIG. 1G is a partial cross-sectional Right side view of suspension, wheels extended.

FIG. 1H is a partial cross-sectional right side view of a roadable aircraft with suspension, wheels retracted.

FIG. 1R is a partial cross-sectional right side view of a roadable aircraft with floats deflated, boat propeller retracted.

FIG. 1J is a partial cross-sectional right side view of a roadable aircraft with floats inflated, boat propeller extended.

Figure 1A:
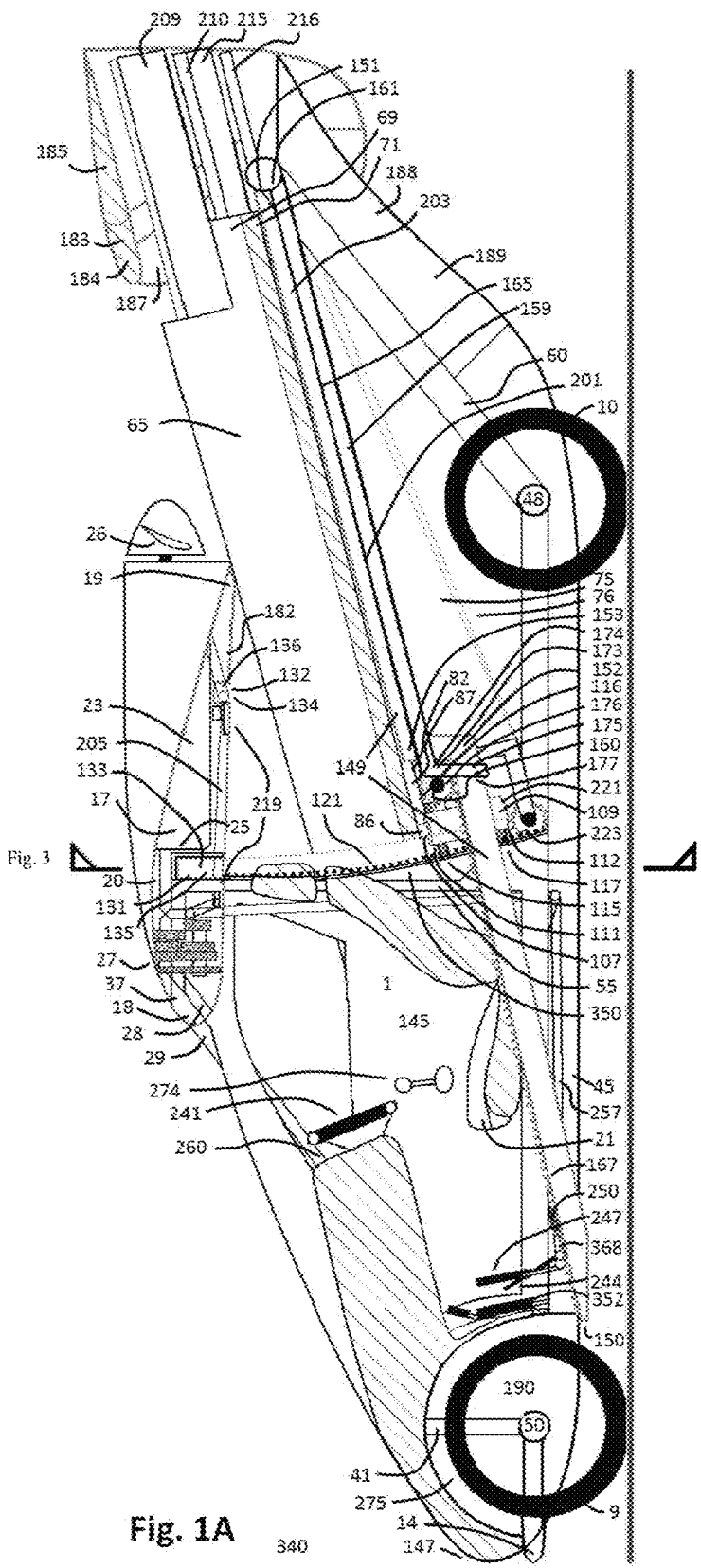
FIG. 1A is a partial cross-sectional right side view of a roadable aircraft in automobile configuration.

DETAILED DESCRIPTION (a Reference Key Denoting the Terms Used Herein is Found at the End of this Section)

With reference to the attached drawings, the invention disclosed here in its preferred embodiment as a non-restrictive example is a vehicle comprising two separate "bodies", "hulls" or fuselages 1,2. Each fuselage contains a cabin 145, 146 for one occupant (for a total of two occupants). Each cabin is accessible via a front-hinged door 3,4 located on the outer sides of the vehicle 337,338 (for a total of two doors).

The fuselages 1,2 are parallel to each other in line with the forward direction of movement 340. Underneath each fuselage 1,2 are two wheels (for a total of four wheels) 9,10,11,12. The wheels 9,10,11,12 are placed one behind the other along the underside of each fuselage. Only the lower part of each wheel emerges from the underside of the fuselage.

The fuselages 1,2 are connected to each other at two main points. At the lower front of the vehicle between the front wheels, they are joined by a canard plane 13 containing a cross-bar 16. The front of the canard 14 serves as a bumper bar. At the centre, the fuselages 1,2 are joined at roof-level by a central main-wing 17 containing a central main-spar 20. The central main-spar 20 is located directly behind the occupants' seats 21,22 just above head height. Accordingly, the leading edge of the central main-wing 18 extends forward past the occupants just above their head-level.

In the middle of the central main-wing 17 behind the central main-spar 20 is a motor 23 enclosed in a cowling. The motor's mounts 25 are attached to the central main-spar 20. At the back of the motor 23 is a pusher-propeller 26. At the front of the motor 23 is first an enclosed gearbox 27 then an enclosed main driveshaft 28 leading down at an angle to the canard 13. The main driveshaft 28 is supported by a central beam 29 which connects the central main-spar 20 and engine mounts 25 at the one end to the middle of the cross-bar 16 located inside the canard plane 13 between the front wheels at the other end. Inside the canard plane 13, the motor's power is transferred from the main driveshaft 28 to the front wheels 9,11 via a differential 30 with perpendicular drive shafts 31,32 emerging to its right and left. The differential 30 and perpendicular drive shafts 31,32 are supported by the cross-bar 16. An intake 37 for cooling and induction air is located above the leading edge of the central main-wing 18 in front of the motor 23.

The front wheels 9,11 are linked on their inner side to a vertical strut 41,42 around which they rotate. The top of this strut 41,42 is attached to the frame of the fuselage via a support 43,44 which curves over the back of the front wheel down to the vehicle's floor level at the front of each cabin 145,146. From there, a floor beam 45,46 runs along below the cabin's floor continuing along the fuselage 1,2 base to the inside axle 47,48 of the rear wheel 10,12. From a point near the approximate middle of the floor beams 45,46, a strut 55,56 goes up to support the central main-spar 20. Rear fuselage beams 60,62 originating at the inner side of the rear axle 47,48, runs upward to end at roof height behind each rear wheel 10,12 where they form the rear tip of each fuselage 63,64.

Figure 2A:
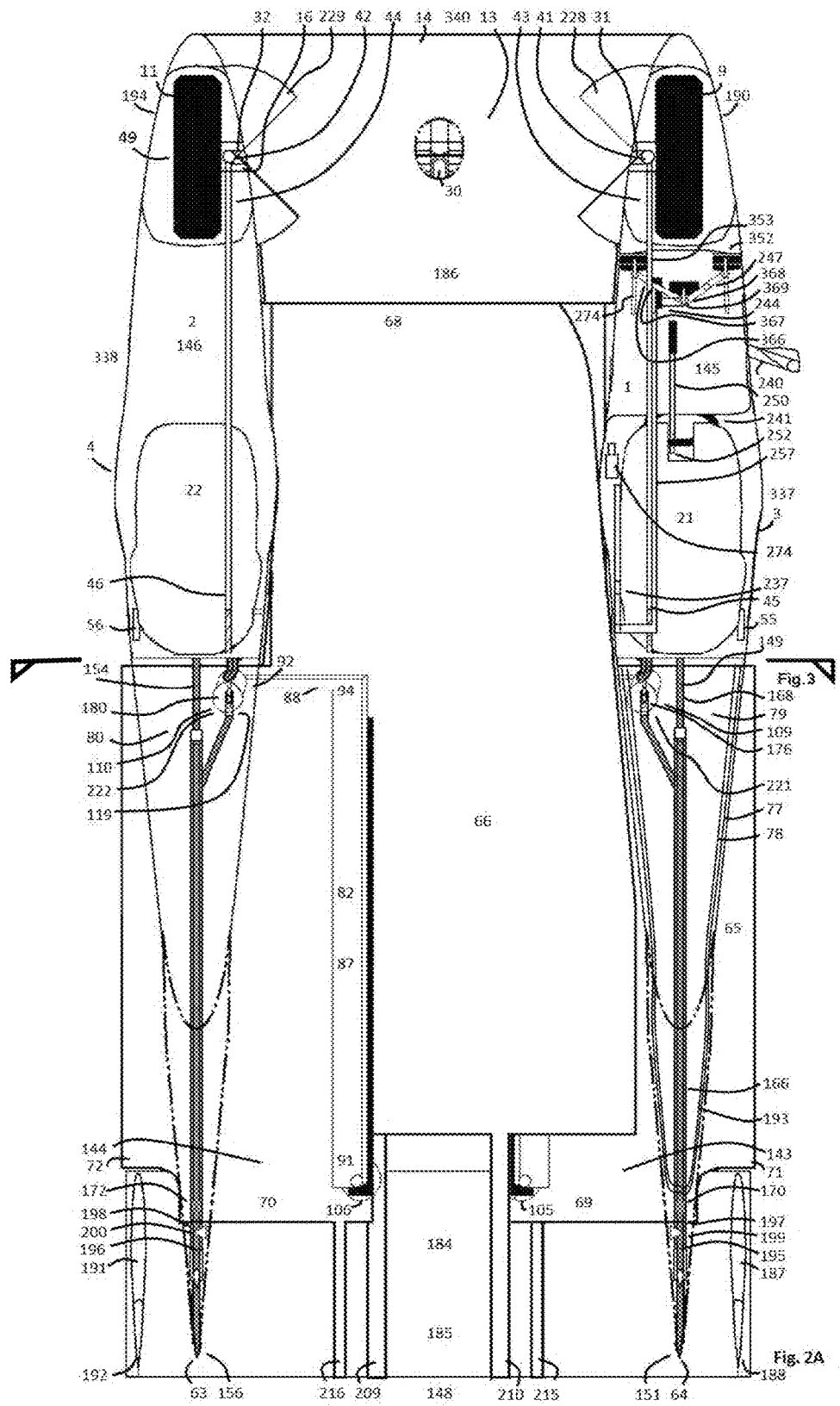
FIG. 2A is a partial cross-sectional bottom view of a roadable aircraft in automobile configuration.
Figure 3C:
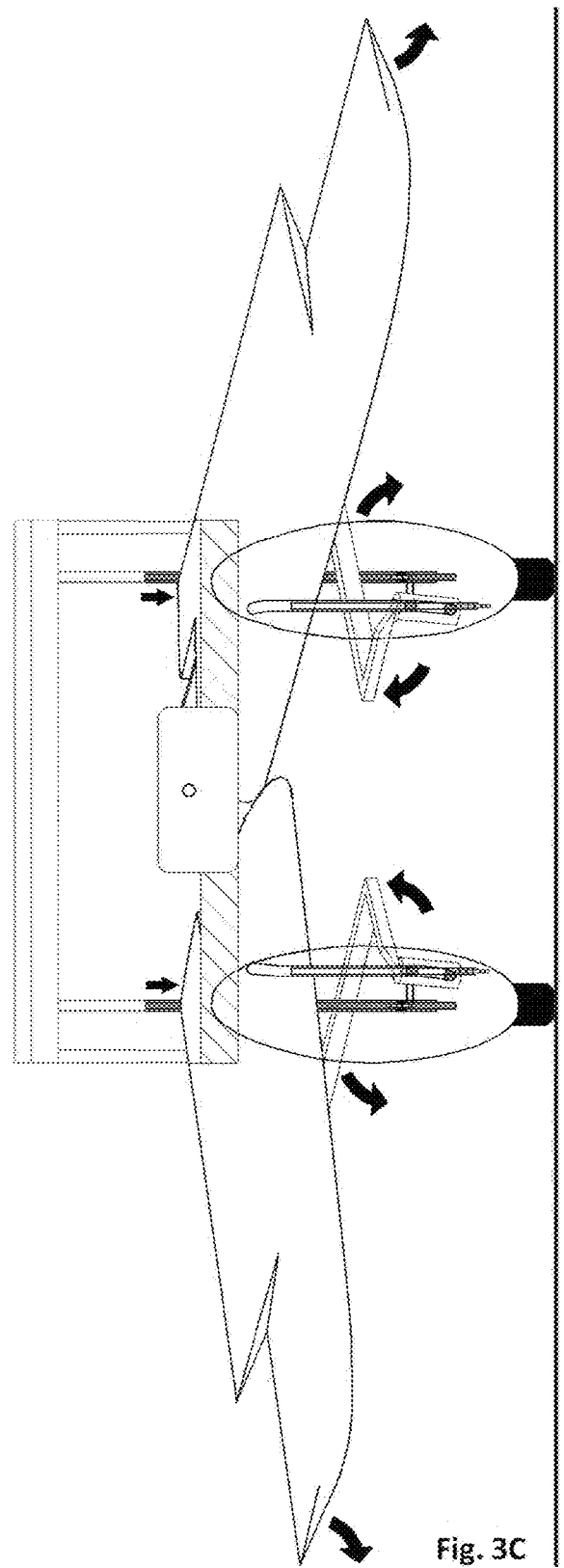
FIG. 3C is a partial cross-sectional front view of a roadable aircraft midway through phase two of wing extension (wings crossing each other at forty-five degrees and skewed laterally).
Figure 3F:
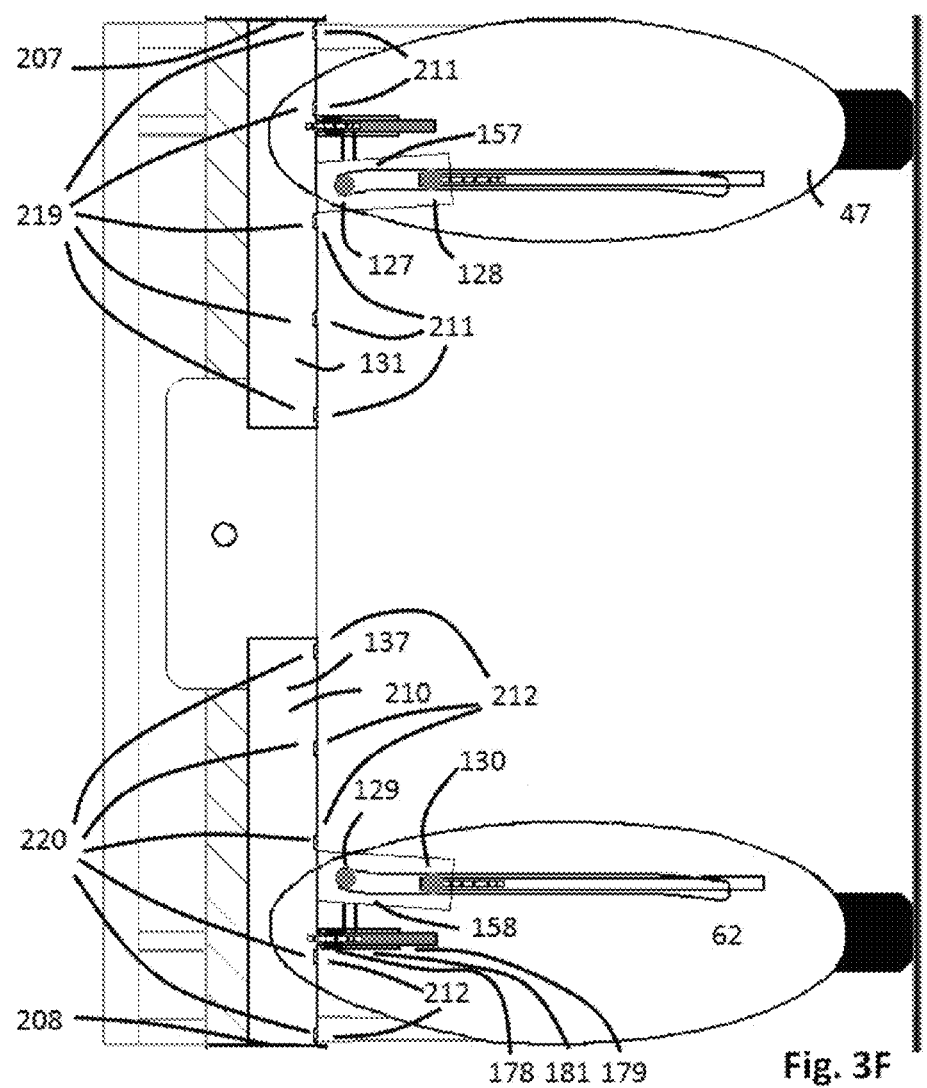
FIG. 3A is a partial cross-sectional front view of a roadable aircraft in automobile configuration.
FIG. 3B is a partial cross-sectional front view of a roadable aircraft at completion of phase one of wing extension (wings parallel to the fuselages and drawn backwards).
FIG. 3D is a partial cross-sectional front view of a roadable aircraft at completion of phase two of wing extension (wings skewed laterally and extended outward but not yet raised to insert into central wing).
FIG. 3E is a partial cross-sectional front view of a roadable aircraft at completion of phase three (wings leveled and raised into position) where the wings have already been locked in position and the steering and transmission converted).

Outer Wing storage (FIGS. 1A, 2A, 3A)

When in the automobile configuration, the outer wings 65,66 are stored on top of each other parallel to and between the fuselages 1,2. The tips 67,68 of the outer wings are stored low at the front of the vehicle near the canard plane 13. They point towards the front of the vehicle 147. The roots 69,70 of the outer wings are stored high at roof-level at the back of the vehicle 148. Main-spar and Secondary-spar stubs 209,210, 215,216 protrude from the root 69,70 of each outer wing 65,66.

Aside from mild tapering, the width of the outer wings 65,66 varies over two stages. The part of the outer wing 65,66 containing the tip 67,68 is significantly narrower than the part containing the root 69,70. This is because the part containing the tip 67,68 is stored between the fuselages 1,2 at the narrowest point where the vehicle's occupants sit to either side of it. However, directly behind the occupant's seats 21,22, the upper, rear shell 75,76,77,78 of each fuselage 1,2 folds down in two parts into the bottom part. This exposes two wide "shelves" 79,80 creating a space across the entire width of the rear of the vehicle. The wider part of the outer wings 65,66 containing the roots 69,70 is stored above these shelves 79,80.

The outer wings' 65,66 storage position places no limits on inclusion of aerodynamic features into the wing's shape such as varied angle of attack along the wing's length otherwise known as "wash-out" (for gentle stalling), dihedral (for stability) or winglets (for induced drag reduction). Tapering (for drag reduction) however, is limited by the confines of the wings' storage position between the fuselages 1,2.

Each outer wing 65,66 rests atop a "swinging arm" 81,82. There is one swinging arm 81,82 per fuselage 1,2. The left one 81 supports the left outer wing 65, the right one 82 supports the right outer wing 66. Each swinging arm 81,82 is "L"-shaped. Each "L"-shaped swinging arm 81,82 is mounted on its side in the same plane as the underside 83,84 of its respective outer wing 65,66. The tip of the long "leg" of the "L" 89,91 is attached via a rotating, sinking joint 105,106 to a trolley 103,104. The trolley 103,104 is enclosed within an underwing rail 97,98. The underwing rail 97,98 runs spanwise, i.e. longitudinally to the outer wing 65,66 along the bottom of a depression or "rut" 95,96 located centrally on the underside 83,84 of each outer wing 65,66. The underwing rail 97,98 leads from the wing's root 69,70 to it's mid-point.

When the outer wing 65,66 is stored, the tip 89,91 of the long "leg" 85,87 of the "L" 81,82 rests at the wing root 69,70 between the fuselages 1,2 high at the rear end 148 of the vehicle pointing backwards in the opposite direction to the vehicle's direction of movement 340. When the outer wing 65,66 is stored, the short leg 86,88 of the "L" 81,82 lies perpendicular to the outer wing 65,66 at its mid-point pointing outward toward the vehicle's side 337,338.

The tip 90,92 of the short "leg" 86,88 of the "L" 81,82 is attached via a rotating joint 107,108 to the upper tip 111,113 of a "swivelling support" 109,110 which comes up from below almost vertically to meet it. The swivelling support 109,110 is located directly behind the occupant's seat 21,22. Its upper tip 111,113 protrudes above the shelf 79,80. Below that, its front side is connected at two points via rotating joints 115,117,118,120 to trolleys 127,128,129,130 enclosed within an upward rail 121,122. The upper part 123,125 of the upward rail 121,122 above the shelf 79,80 runs vertically up toward the underside 182 of the central main-wing 17. Just before reaching the central main-wing, the rail curves inwards by approximately two degrees. This in turn causes the swivelling supports along with the arms and the roots of the wings they support to also tilt inwards, thereby giving the wings dihedral.

The lower part 124,126 of the upward rail 121,122 below the shelf 79,80 curves away from vertical at an angle of ca. nine degrees. This causes the outer wings 65,66 to be stored at differing angles to one another 339. The reason for skewing 339 the outer wings at differing angles is that the leading edge of the left outer wing 65 and its bulging cambered section 143 is stored on the vehicle's right side 338, whereas the leading edge and cambered bulge 144 of the right outer wing 66 is stored on the vehicle's left side 337. These bulging cambered sections 143,144 must therefore cross past each other during wing extension. The skew 339 of ca. nine degrees ensures the outer wings 65,66 cannot interfere with each other as they extend because their planes of extension, although parallel, are slightly skewed 339 in relation to each other. When the wings are later raised along the upward rail 121,122, the curve in the rail 124, 126 causes the supports, arms and wings to level themselves, eliminating the skew.

Extendable tail structure ("empennage") 345

The tail structure ("empennage") 345 consists of two "empennage beams" 149,154, one raised "tail crossbar" 183, two "rail-extension beams" 159,162 each with a "sub-support" 173,178, one "horizontal stabilizer" 184 with an attached "auxiliary elevator" 185 and two "vertical stabilizers" 187,191 with one "auxiliary rudder" 188,192 each.

When in the automobile configuration, each empennage beam 149,154 runs parallel to and rests almost entirely within each fuselage 1,2. The front tip 150,155 of each beam 149, 154 lies under each occupant's seat 21,22. The empennage beams' 149,154 rear tips 151,156 extend through and just past the hinge 195,196 at the rear tip 63,64 of each fuselage 1,2. Behind the hinges 195,196, the empennage beams' 149,154 rear tips 151,156 are joined via a raised tail-crossbar 183. The raised tail-crossbar 183 is housed within a horizontal stabilizer 184. Two vertical stabilizers 187,191 are located on either side of and below the horizontal stabilizer 184.

Starting under the occupants' seats 21,22, each empennage beam 149,154 extends at an incline toward the upper rear of each fuselage 63,64. The empennage beams 149,154 bend slightly upward 152,157 behind the occupants' seats 21,22 before straightening again 153,158 and continuing at the original incline up to and through the hinges 195,196.

Along the upper side of the rear part of each empennage beam 149,154 is a rear empennage rail 165,166. The trailing edge root 71 of the left outer wing 65 is attached via a moveable, rotating pivot joint 170 to a trolley 169 enclosed within the left rear empennage rail 165 atop the left empennage beam 149. The trailing edge root 72 of the right outer wing 66 is attached via a moveable, rotating pivot joint 172 to a trolley 171 enclosed within the right rear empennage rail 166 atop the right empennage beam 154. Via the trolleys 169,171, the outer wing trailing edge roots 71,72 can roll along their respective rear empennage rails 165,166 and rotate either way, i.e. from or toward the respective fuselage 1,2.

A hook 197,198 located on each outer wing's trailing edge root 71,72 latches into an indentation 199,200 on the rear end 151,156 of each empennage beam 149,154 whenever the outer wing 65,66 is parallel to the fuselage 1,2. As soon as the outer wing 65,66 is rotated away from parallel, the hook 197,198 is rotated out of the indentation 199,200 and releases the outer wing's trailing edge root 71,72 so that it can then move forward or backward along the rear empennage rail 165,166 freely.

A "rail-extension beam" 159,162 extends the length of the rear empennage rail 165,166 further forward. The rail-extension beam 159,162 has its origin directly behind the occupant's seat 21,22 at the height of the exposed shelf 79,80. It runs from there in a straight line at an upward incline to the hinge 195,196 at the upper rear tip 63,64 of the fuselage where it ends. It rises at the same incline as that of the empennage beams' 149,154 low segment at its origin 150, 155. After the empennage beam's 149,154 slight bend upwards 152 behind the occupant's seat 21,22, as it bends back 153 to run straight again, it becomes embedded in a sleeve 201 along the underside of the rail-extension-beam 159,162. Unlike the empennage beam 149,154, the rail-extension beam 159,162 does not run through the hinge 195, 196. Instead, it stops at, is affixed to and rotates with the hinge 195,196. Its front tip 160,163 (located behind the occupant) can move up and down (between the central main-wing 17 above and the shelf 79,80 below). The trolley 169,171 to which the outer wing's 65,66 trailing edge root 71,72 is attached, can roll from the rear empennage rail 165,166 onto the extension rail 203,204 located on the upper side of the rail extension beam 159,162. The two rails 203,204 converge at the hinges 195,196 and allow the trolleys 169,171 to run over the top of the hinges 195,196 in a straight line.

Below the forward tip 160,163 of the rail extension beam 159,162, its sub-support 173,178 points downwards. At its lower tip 175,179 is an opening 177,181 through which the empennage beam 149,154 runs. The empennage beam 149, 154 is therefore attached to the rail extension beam 159,162 and its sub-support 173,178 at three points (from low to high); firstly, at the opening on the lower tip of the sub-support 177,181; secondly, along the sleeve 201,202 on the lower side of the rail extension beam 159,162 and thirdly via the hinge 195,196 at the upper rear tip of the vehicle 63,64 (which is affixed to the rail extension beam 159,162).

The rail-extension beam 159,162 therefore cannot move at all when the front tip of the empennage beam 149,154 is lying underneath the occupant's seat 21,22. The rail-extension beam 159,162 can only rotate (upwards and downwards) when the front end 150,155 of the empennage beam 149,154 has been slid back to the lower tip 175,179 of the sub-support 173,178.

The forward tip 160,163 of the rail-extension beam 159, 162 is attached via a rotating joint 116,119 to the top, rear side of the swivelling support 109,110 (upon which the swinging arm 81,82 and outer wing 65,66 rest). At the same level on the top front side of the swivelling support 109,110, it is attached via a rotating joint 115,118 to a trolley 127,129 enclosed within a short, upward rail 121,122. This short upward rail 121,122 is located behind the occupant's seat 21,22. Above shelf level 79,80, the short upward rail runs vertically 123,125 to just below the wing where it veers inwards by approximately two degrees. It ends at the underside of the central main-wing 182. The part of the short rail below the shelf 124,126 turns at a skew angle 339 of ca. nine degrees away from vertical. The lower, front tip of the swivelling support 112,114 is attached via another rotating joint 117,120 to a second, lower trolley 128,130 enclosed within the short upward rail 121,122. Whenever the outer wings 65,66 are near shelf level 79,80, the lower tip of the swivelling support 112,114 is therefore skewed laterally at an angle of ca. nine degrees 339 away from vertical causing both the swinging arm 81,82 and the outer wing 65,66 resting on it to also skew laterally at the same angle 339. When the swivelling support 109,110 rises along the short upward rail 121,122, the lower trolley 128,130 moves into a position vertically in line with the upper joint/trolley 127,129, thereby causing the wings above to straighten laterally, eliminating the skew 339.

Wing Structure and Support

The central main-wing 17 contains four cavities; two port 131,137, two starboard 132,138. These cavities 131,137,132, 138 are open both on the underside of the central main-wing 182 and on its sides. The side of the openings are located within the wing's cross-section 205,206. The front cavities 131,132 are located close to the aerodynamic center of lift. The rear cavities 137,138 are located between the front ones 131,132 and the trailing edge 19. The lower openings 133,139 extend inwards from the side openings 136,141 along the underside of the central main-wing 182. They end before reaching the motor 23.

Each of the two outer wings 65,66 has both a main-spar 207,208 and a secondary spar 213,214. The main-spar 207, 208 lies along the outer wing's 65,66 approximate centre of lift near and along the leading edge of each wing 346,347. The secondary spar 213,214 runs parallel to the main-spar 207, 208 and is located between the main-spar 207,208 and the trailing edge root 69,70. Both spars 207,208,213,214 jut out past the root 69,70 of the outer wing 65,66 like "stubs" 209, 210,215,216. (It is these stubs 209,210,215,216 that are inserted into the cavities 131,132,137,138 of the central main wing 17 for flight.) The underside of each stub 209,210,215, 216 has small indentations 211,212,217,218. These indentations 211,212,217,218 prevent the spars 207,208,213,214 from slipping laterally once inserted and locked into the central main wing's 17 cavities 131,132,137,138.

For flight, the stubs 209,210,215,216 of the spars 207,208, 213,214 of the outer wings 65,66 are inserted into the cavities 131,132,137,138 in the central main wing 17. The spar stubs 209,210,215,216 are then locked into place using pilot-operated locking-pins 219,220. The locking pins 219,220 extend underneath and across the lower openings 133,139 of the cavities 131,132,137,138.

Outer Wing Extension

When the outer wings 65,66 are stored, the tip 89,91 of the long leg 85,87 of each "L"-shaped swinging arm 81,82 (that being the point where it is attached via joint 105,106, trolley 103,104 and rail 97,98 to the underside 83,84 of the outer wing 65,66) lies at the root 69,70 of the outer wing 65,66. The root 69,70 is located between the fuselages 1,2 high at the 148 rear of the vehicle. The long "leg" 85,87 of the "L"-shaped swinging-arm 81,82 lies parallel to the rail 97,98 which is embedded in the underside 83,84 of the outer wing 65,66. The "L's" short leg 86,88 lies perpendicular.

Figure 1B:
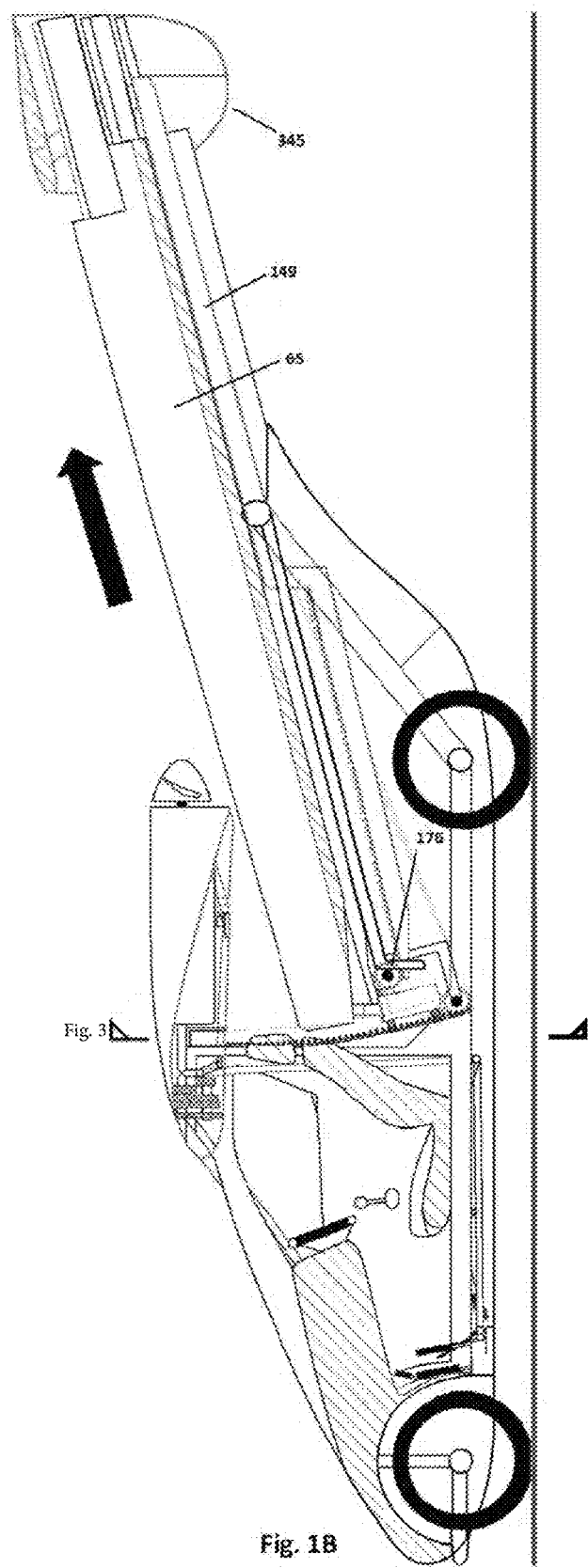
FIG. 1B is a partial cross-sectional right side view of a roadable aircraft at completion of phase one of wing extension (wings parallel to the fuselages and drawn backwards).
Figure 2B:
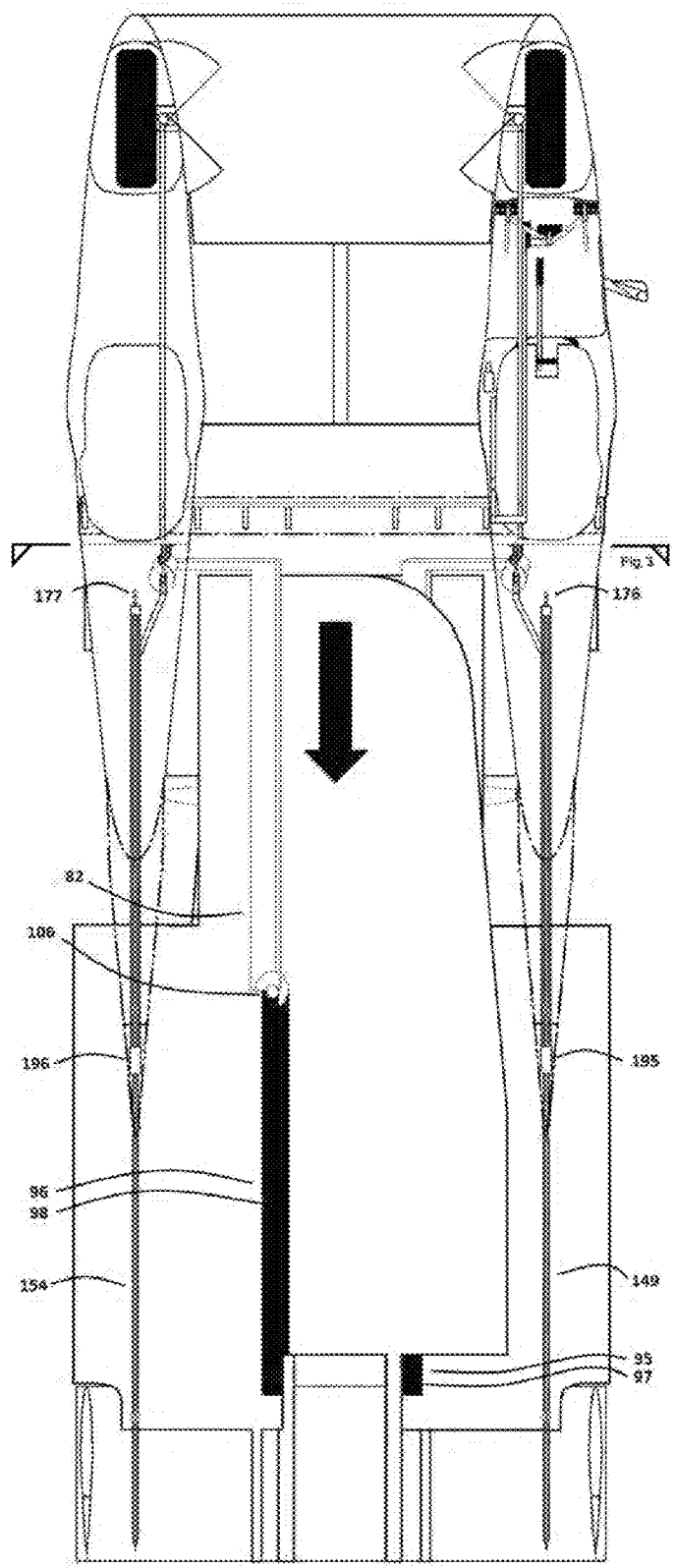
FIG. 2B is a partial cross-sectional bottom view of a roadable aircraft at completion of phase one of wing extension (wings parallel to the fuselages and drawn backwards).
Figure 2C:
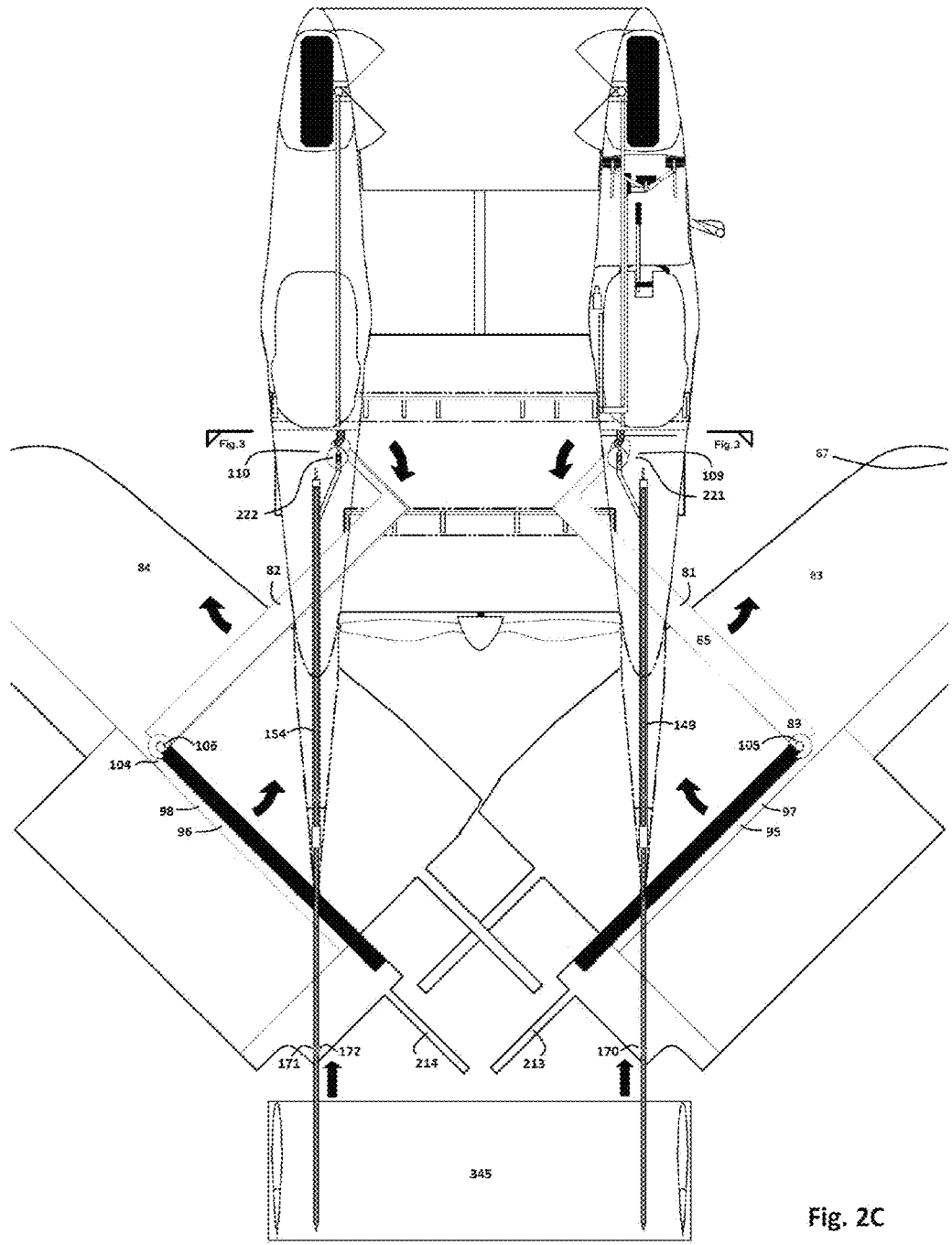
FIG. 2C is a partial cross-sectional bottom view of a roadable aircraft midway through phase two of wing extension (wings crossing each other at forty-five degrees and skewed laterally).
Figure 2D:
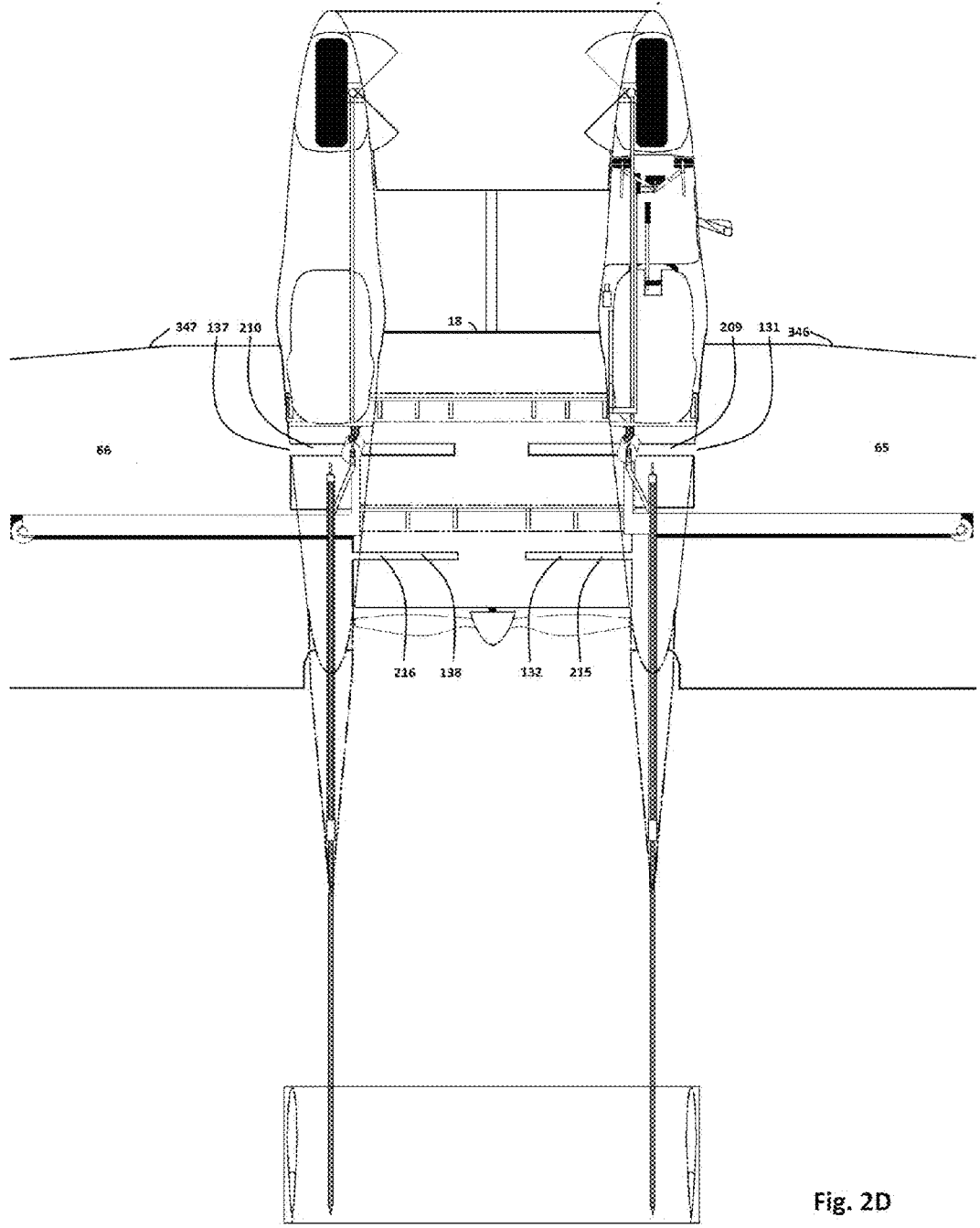
FIG. 2D is a partial cross-sectional bottom view of a roadable aircraft at completion of phase two of wing extension (wings skewed laterally and extended outward but not yet raised to insert into central wing).
Figure 2E:
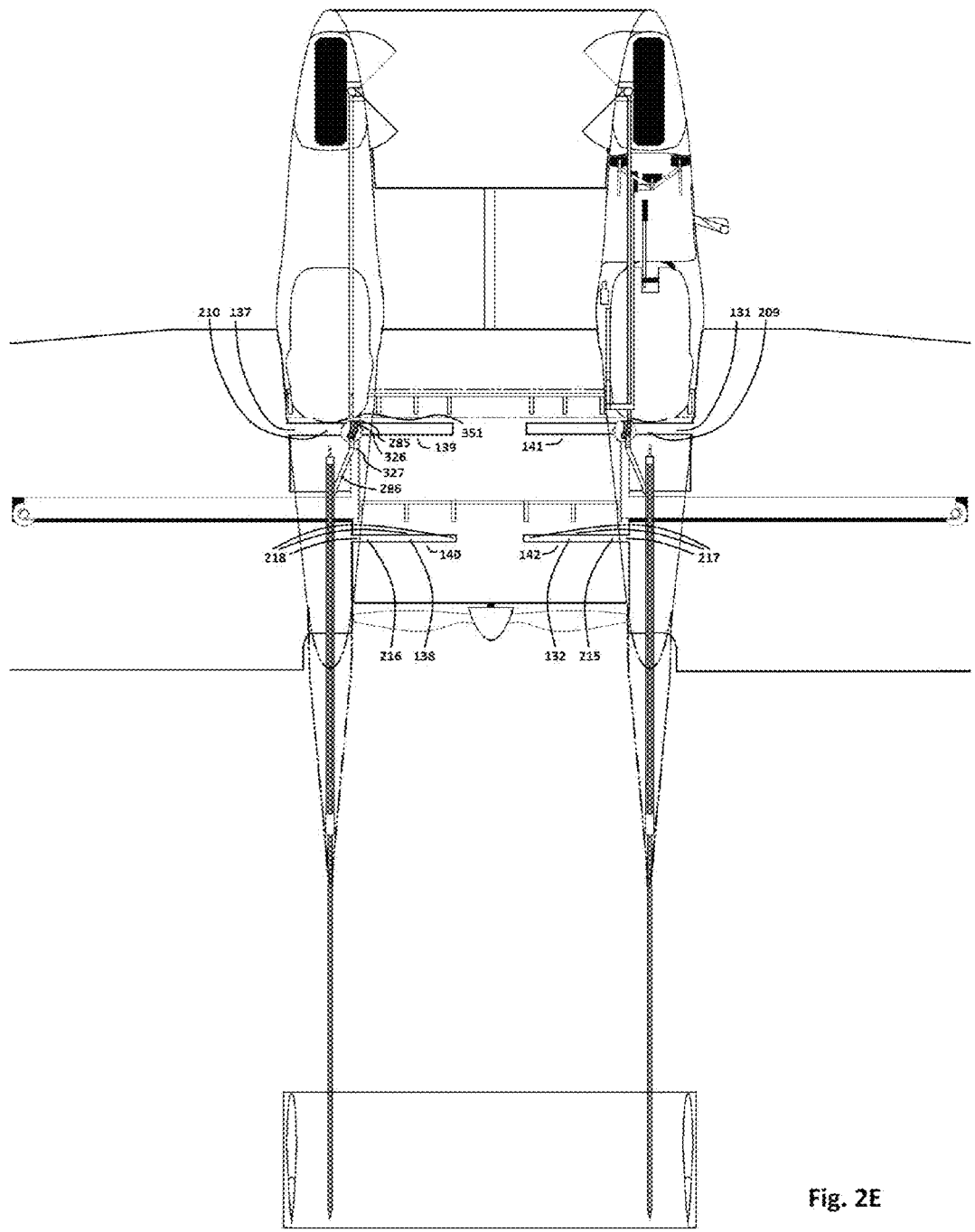
FIG. 2E is a partial cross-sectional bottom view of a roadable aircraft at completion of phase three of wing extension (wings leveled and raised into position).
Figure 2F:
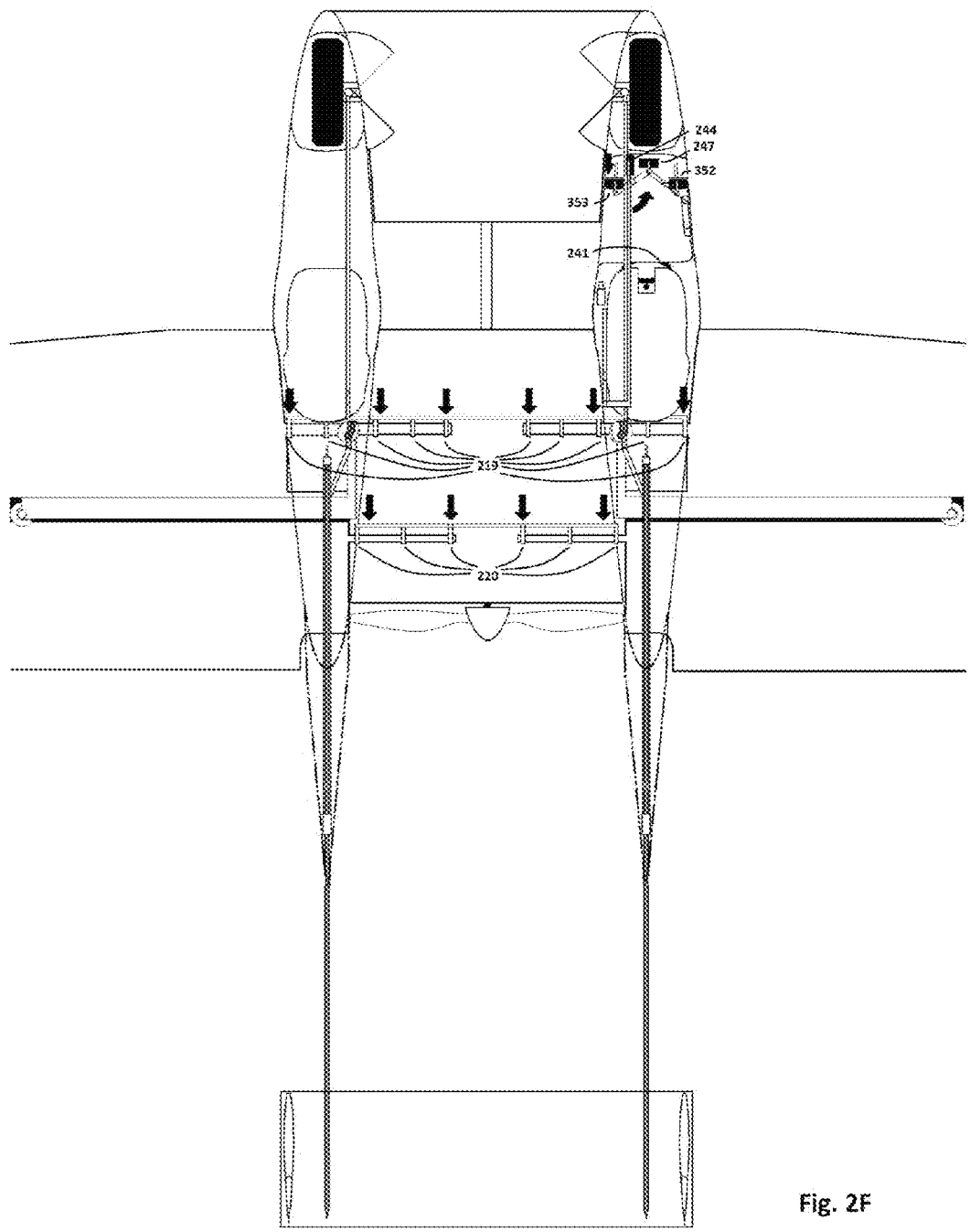
FIG. 2F is a partial cross-sectional bottom view of a roadable aircraft in aircraft configuration (wings locked in position, steering and transmission converted).

Phase 1 (of 3) of Wing Extension (FIGS. 1B, 2B, 3B)

On the upper side of the front end of the empennage beam 149,154 is a cograil 167,168. A motor-driven cogwheel 176, 180 is located at the opening 177,181 on the lower tip 175,179 of the sub-support 173,178 through which the empennage beam 149,154 runs. Outer wing extension is initiated when the cogwheel 176,180 drives the empennage beam 149,154 back through the opening 177,181 towards the upper rear of the vehicle 148. The movement ceases when the front tip 150,155 of the empennage beam 149,154 has reached the opening 177,181 and is well clear of the seat 21,22 and below the short upward rail 121,122.

During this motion, the outer wings 65,66 stay parallel to the fuselage 1,2 (and to each other 65,66). The outer wings 65,66 and entire empennage structure 345 merely move backwards and upwards toward and partly beyond the upper rear tips of the fuselages 63,64. During this movement, the wing roots' trailing edges 71,72 are hooked 197,198 onto an indentation 199,200 in the empennage beam 149,154. (If they weren't, the outer wings 65,66 would not slide backward and upward together with the empennage structure 345. Instead, the empennage structure 345 would just slide upward past them.)

Since the empennage beams 149,154 and the outer wings 65,66 are stored at an angle (tips 67,68 low, roots 69,70 high), the outer wings 65,66 and empennage structure 345 move upward as they move backwards. Together, their rear extremities rise to a level higher than the vehicle's roof level. At the end of this backward movement, approximately half the outer wings 65,66 and half the empennage structure 345 lie above the rear tips 63,64 of the fuselages 1,2.

When the backward movement has been completed, the front tips 67,68 of both outer wings 65,66 and empennage beams 149,154 lie behind and clear of the seats 21,22. Furthermore, the tip of the long leg 89,91 of the "L"-shaped swinging arm 81,82 hasn't moved at all so it now lies in the middle of the outer wing's underside 83,84 (meaning, it has slid along the underwing rail 97,98 as it and the outer wing 65,66 moved backwards and over it).

Phase 2 (of 3) of Wing Extension (FIGS. 1C, 1D, 2C, 2D, 3C, 3D)

When stored, each outer wing 65,66 is attached to the rest of the vehicle at two points;

the trailing edge root 71,72 is attached via a rotating pivot joint 170,172 to a trolley 171,173 in the rear empennage rail 165,166;

the tip of the long leg 89,91 of the "L"-shaped swinging arm 81,82 is attached via a rotating pivot joint 105,106 to a trolley 103,104 on an underwing rail 97,98 in the "rut" 95,96 along the center of the outer wing's underside 83,84.

It is the counter rotational interplay of these two moving, rotating attachments 170,171,172,173,103,104,105,106 along their respective rails 97,98,165,166 that causes each outer wing 65,66 to extend during the second phase from parallel to perpendicular.

Once the outer wings 65,66 and empennage structure 345 have moved fully backwards, a "swivel motor" 221,222 causes the swivelling support 109,110 to swivel. This initiates the second phase of outer wing 65,66 extension. The swivel motor 221,222 rotates the tip of the long leg 89,91 of the "L"-shaped swinging arm 81,82 outwards and away from the fuselages 1,2. As it does so, the sinking pivot joint 105,106 in the rut 95,96 on the outer wing's 65,66 underside 83,84 locks the trolley 103,104 in place preventing it from sliding back down along the underwing rail 97,98. The hook 197,198 then disengages allowing the outer wing's root 69,70 to roll forward along the empennage rail 165,166.

Since, upon completion of the first phase, the tip of the long leg 89,91 of the "L"-shaped swinging arm 81,82 now lies in the middle of the underside 83,84 of the outer wing 65,66, its outward rotation causes the outer wing's 65,66 mid-point to move outward and away from the fuselage 1,2 along with it. However, the outer wing's 65,66 trailing edge root 71,72 can't move outward because it's attached to the empennage beam 149,154. It can only slide forward along the rear empennage rail 165,166 atop the empennage beam 149,154 in line with the fuselage 1,2. The trailing edge root 71,72 comes to rest at a point behind the "knee" 93,94 of the "L"-shaped swinging arm above the fuselage 1,2 and not far behind the seat 21,22. As a result of the combined factors of, on the one hand, the outer wing-root 69,70 staying over the fuselage 1,2 and, on the other hand, the outer wing's 65,66 mid-point moving outwards, the outer wing's 66,67 tip extends even more rapidly from its starting point between the fuselages 1,2, just behind the seat 21,22 to a point farthest from the fuselage.

The "L"-shaped swinging arm 81,82 rotates outward through ninety degrees. At the end of its rotation, the long leg 85,87 of the "L"-shaped swinging arm 81,82 is perpendicular to the fuselages 1,2 (and the short leg 86,88 is parallel). At the same time, the entire outer wing 65,66 has also counter-rotated outward (in the opposite direction) through ninety degrees.

The outer wings 65,66 rotate in differing, parallel planes that are skewed 339 in relation to one other at an angle of approximately nine degrees. This enables them 65,66 and their spar stubs 209,210,213,214 to rotate past each other freely without friction or interference.

Therefore, when the outer wings 65,66 are extended outward, the tip of the left outer wing 67 moves downward closer to the ground while the tip of the right outer wing 68 moves upward well into the air. This is the position they are in when outward extension is complete. (This skewed 339 position is resolved in the third phase when the outer wings 65,66 are raised.)

Coinciding with the end of the outward extension of the outer wings 65,66, the "L"-shaped swinging arm 81,82 sinks flush into the rut 95,97 on the outer wing's underside 83,84. This is effected via the sinking pivot joint 105,106 (see FIGS. 4A and 4B).

Phase 3 (of 3) of Wing extension (FIGS. 1E, 3E)

Upon completion of phase two, the tips 67,68 of the outer wings 65,66 have extended outward so that the outer wings 65,66 are now perpendicular to the fuselages 1,2. The outer wings 65,66 now lie low across the shelf 79,80 behind the seats 21,22. The left wingtip 67 lies lower than the right wingtip 68, the angle of skew being ca. nine degrees 339. The main and secondary outer wing spar stubs 209,210,213,214 jut out from the roots of each outer wing 69,70 into the space between the fuselages 1,2. Additionally, the stubs 209,210, 213,214 now lie directly below their respective cavities 131, 132,137,138 located on the underside of the central main-wing 182 directly above them.

Phase three involves raising the outer wings 65,66 in such a way that they level out and their main and secondary spar stubs 209,210,213,214 insert from below into the cavities 131,132,137,138 on the underside of the central main-wing 182.

A motor-driven cogwheel 223,224 is located on the upper front rotating joint on the swivelling support. Its teeth extend forward to a cograil 350,351 enclosed within and along the short upward rail 121,122. Phase three begins when this motor-driven "short rail cogwheel" 223,224 rotates and runs upward along the cograil 350,351, thereby causing the swivelling support 109,110 along with both outer wings 65,66, both swinging arms 81,82 and the front half of the entire empennage structure 345 to move upward along the rail. The upward movement begins at the shelf 79,80 (below) and finishes at the underside of the central main-wing 182 (above). As this happens, the rear half of the empennage structure 345 which is located on the other side of and behind the hinge 195,196 is lowered in a see-saw like fashion.

As the lower trolley 128,130 attached to the joint 117,120 at the bottom tip 112,114 of the swivelling support 109,110 rises within the curved lower part 124,126 of the short upward rail 121,122, it is forced from its starting position (at an angle of ca. nine degrees off vertical 339) into a position vertically below the upper trolley 127,129. This is achieved by a curve (through nine degrees 339) in the lower section of rail 124, 126. This in turn forces the outer wings 65,66 (which rest perpendicular to the swivelling support 109,110) into the, level, horizontal position.

The streamlined shells of the upper, rear fuselages 75,76, 77,78 (which during outer wing storage are folded down into the lower rear fuselages), are attached to the lower side of each rail-extension-beam 159,162. When the rail-extension-beams 159,162 are raised, the upper fuselage shells 75,76,77, 78 emerge from below to form a streamlined rear fuselage at the point above where the shelf 79,80 had previously been.

When raised, the spar stubs 209,210,213,214 of the outer wings 65,66 are enclosed within the cavities 131,132,137,138 on the underside of the central main-wing 182. There they are locked by pilot-operated locking pins 219,220 which run across from one side of the lower cavity opening 133,139, 134,140 to the other (FIGS. 1F, 2F, 3F, 5B, 6B).

The mechanism for outer wing 65,66 transit needs no structural strength and is therefore made of light materials. Only the pins 219,220 used for locking the spar stubs 209,210,213, 214 into the central main-wing 17 have increased strength.

Control Surfaces

An aileron is located conventionally on each wing's 65,66 outer trailing edge 348,349 (for a total of two).

The vehicle uses automobile-sized wheels 9,10,11,12 and tires. The wheels 9,10,11,12 are therefore larger than those of most similarly-sized light aircraft. When the front wheels 9,10 are steered to the left and right, their size means they also have an aerodynamic yawing effect. This effect is enhanced by the front wheels 9,10 having spat-like encasements 190, 194. When the front wheels 9,10 are straight, their spats 190,194 are encased entirely within the fuselage 1,2. Only when the front wheels 9,10 turn do the front and rear ends of each spat 190,194 emerge from the left and right of each fuselage 1,2. Each spat 190,194 also has a horizontal part 228,229 located on the side of the spat 190,194 between the fuselages 1,2. The horizontal part 228,229 extends into the canard plane 13. As each wheel 9,10 turns, a part of it 228,229 (either front or back, depending on the direction of the turn) juts further into or pulls out of the canard plane 13.

Yaw is also achieved by rudders at the rear of each fuselage 189,193. Additional yaw effect is achieve by auxiliary rudders 188,192 located behind the vertical stabilizers 187,191.

A main elevator 186 is located behind the canard plane 13. An auxiliary elevator 185 is located behind the horizontal stabilizer 184.

Flaps are located on each outer wing's 65,66 inner trailing edge 348,349 (for a total of two flaps).

Controls and Steering (FIGS. 5A, 5B, 6A, 6B)

When the outer wings 65,66 have been extended outward and then raised into position, the driver/pilot pulls the "locking lever" 237, located to the lower right of the pilot's seat 21, to finalize the conversion from automobile configuration to aircraft configuration. In just one upward movement, this single "locking lever" 237 simultaneously engages the locking pins 219,220 which secure the outer wing spars into the central main-wing 17, transfers the motor's 23 power delivery from the pusher propeller 26 (behind) to the gearbox/main-driveshaft 27/28 (in front), stows the automobile controls 241,244,247, deploys the flight controls 250,352,353 retracts the side mirror 241 and overhead rear-view mirror 238 and activates the aircraft lights (not shown).

The vehicle has completely separate steering for the automobile and aircraft configurations. In the automobile configuration, it employs a steering wheel 241, an accelerator pedal 244 and a brake pedal 247. In the aircraft configuration, it employs a joystick 250 and rudder pedals 352,353 with toe brakes. The conversion is effected mechanically by the locking lever 237. When pulled upward, the locking lever causes the automobile controls 241,244,247 to recede away from the pilot toward the front of the cabin 145. The steering wheel 241 submerges itself forward into the dashboard/instrument panel 260. The accelerator 244 and brake 247 pedals move back up against the front cabin 145 wall. There they cannot be pressed down(even by accident). At the same time, the aircraft controls 250,352,353 "appear".

Roll & Pitch Control

Roll and pitch control is provided by a joystick 250. The joystick's base 252 is in the middle of the cabin floor directly in front of the pilot's seat 21. Its grip-handle and shaft are stored in a rut 251 almost flush with the cabin's floor. The rut extends from its base 252 forward along the mid-line of the cabin to a point just under the dash-board 260. When the vehicle is in the automobile configuration, the joystick 250 is hidden in the floor. It can't be moved (even by accident). The ailerons are thus locked in the neutral, "no roll" position and the elevators in the "pitch forward" position (thereby posing no aerodynamic interference during road travel).

When the locking lever 237 is pulled upward, the joystick 250 folds up out of the floor through an angle of ninety degrees. At the end of its traverse, its grip-handle lies at waste-height directly in front of the pilot.

The joystick 250 is linked mechanically (not shown) to the canard-mounted main elevator 186. A fly-by-wire actuator links it to the auxiliary elevator 185 located on the horizontal stabilizer 184. Pushing the joystick 250 forward causes the main- and auxiliary elevators 185,186 to pitch the aircraft forward. Pulling the joystick 250 backward causes them to pitch the aircraft backward.

Yaw Control

As long as the rudder pedals 252,253 are stored up against the cabin's front wall, they cannot be pressed (even by accident). The rudder pedals 252,253 are linked to the front wheels 9,10 and the fuselage's rear rudders 189,193 via a mechanical linkage (not shown). A fly-by-wire actuator links them to the auxiliary rudders 188,192.

When the locking lever 237 is pulled, the rudder pedals 252,253 are slid via a control linkage 257 along a configuration swap rail 273 forward to positions at foot level on the front left and right walls of the cabin respectively. (As they come forward, they pass the brake and gas pedals 244,247 going in the opposite direction which are receding back between them along a separate, curved rail 369 simultaneously.

Figures 6A, 6B:
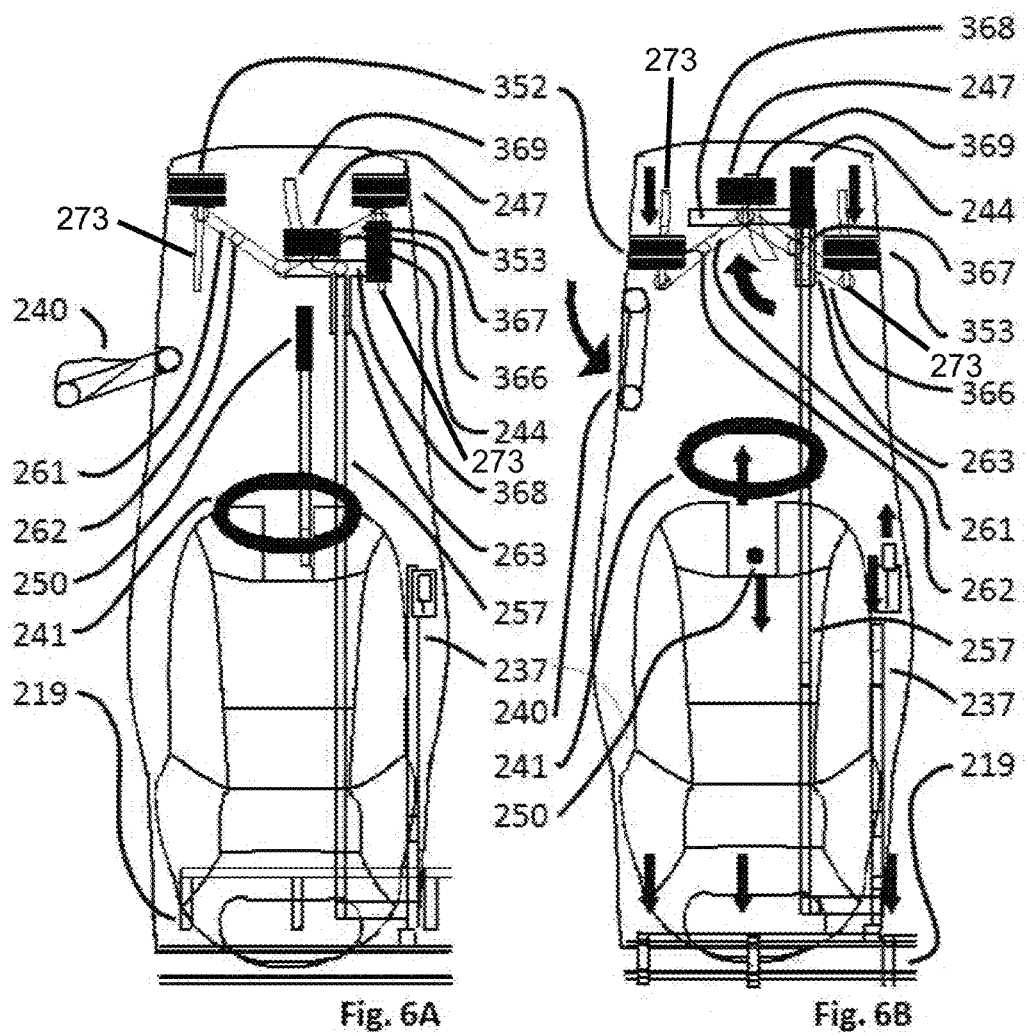
FIG. 6A is a partial cross-sectional top view of a cockpit of a roadable aircraft in car configuration with side mirror extended, aircraft controls stowed, car controls deployed and conversion lever down.
FIG. 6B is a partial cross-sectional top view of a cockpit of a roadable aircraft in aircraft configuration with side mirror retracted, aircraft controls deployed, car controls stowed and conversion lever pulled up.

Gas and Brakes (FIGS. 6A, 6B)

The brake and gas pedals 244,247 are mounted on a common gas/brake base 368 which sits atop and runs along a curved gas/brake rail 369 below it. The gas/brake base 368 has three attachments: Its right, forward tip is attached to the left end of the right pedal-alternation-rotation-bar 366 which rotates around a right pedal-alternation-rotation-pivot 367 and has the right rudder pedal 353 at its other end. The gas/brake base's 368 left forward tip is attached to the right end of the left pedal-alternation-rotation-bar 261 which rotates around a right pedal-alternation-rotation-pivot 262 and has the left rudder pedal 352 at its other end. At its rear right, the gas/brake base is attached to a sleeve bracket 263 which attaches it to the control linkage 257 which is in turn operated by the locking lever 237. When the locking lever 237 is pulled upward, the control linkage 257 slides forward along the cabin floor. This pushes the sleeve bracket 263 along with the gas/brake base 368 forward. This motion causes both the left and the right pedal-alternation-rotation bars 366,261 to rotate around their pivots 367,262 thereby forcing the right and left rudders 353, 352 to slide rearwards toward the pilot. The gas/brake bar (along with the attached gas and brake pedals 244,247 above it) moves from a position at foot-level on the lower front right side of the cabin forward and inwards along the curve of the gas/brake rail 369 to a position up against the middle of the front cabin wall. (The curve of the rail 369 gets them out of the way of the right rudder pedal 253 which is coming forward to assume the same position at foot-level on the right side of the cabin.) When stored up against the cabin's front wall, the gas and brake pedals 244, 247 cannot be pressed down, even by accident. The same applies to the rudder pedals when they are stored.

Figure 4A:
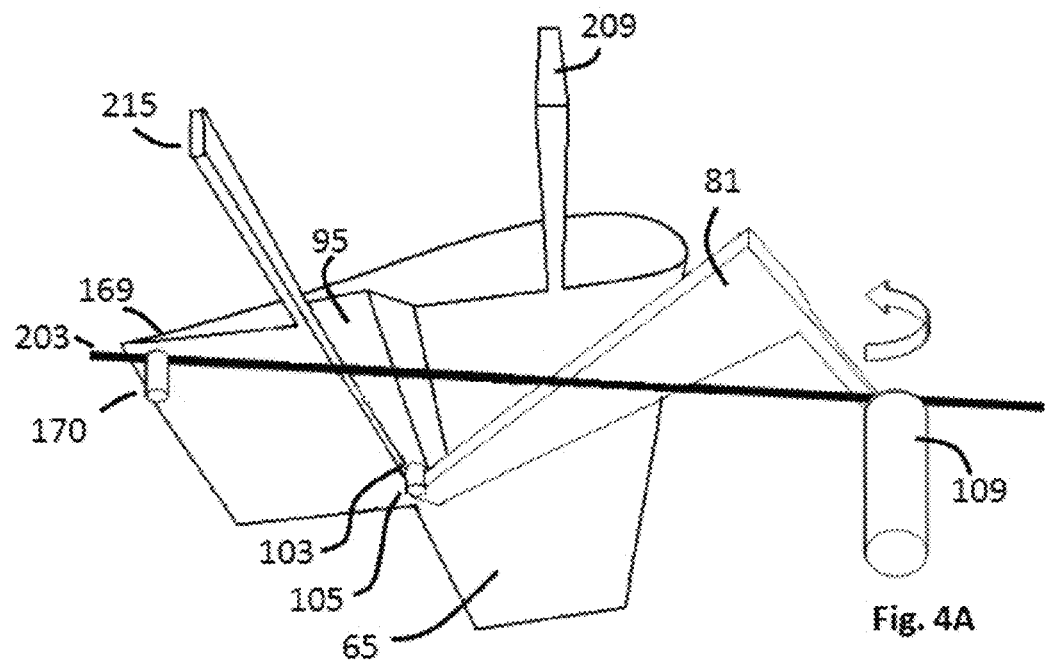
FIG. 4A is a partial isometric view of a rut on wing underside and swinging arm's movement across it of a roadable aircraft.
Figure 4B:
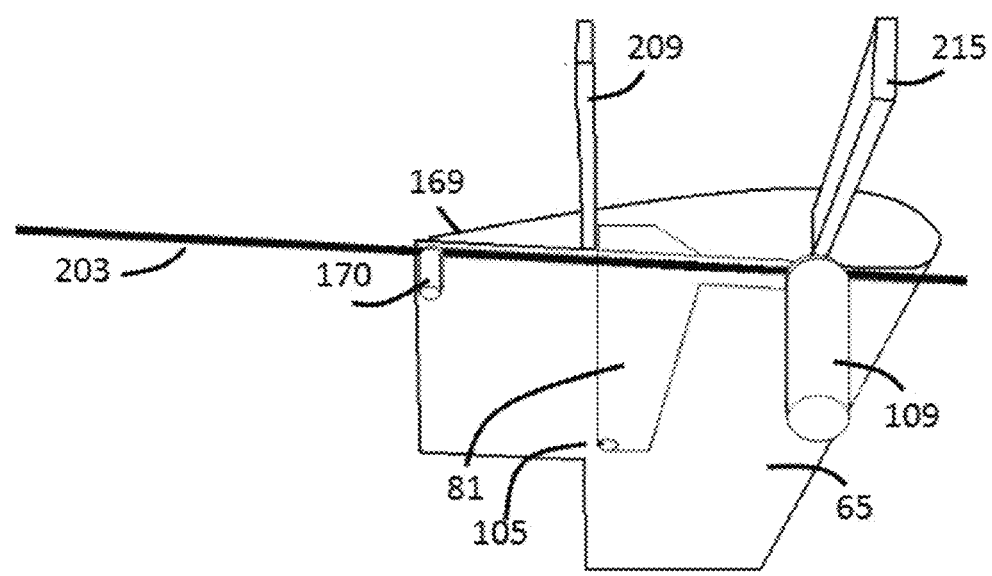
FIG. 4B is a partial isometric view of a rut on wing underside and swinging arm's and sinking pivot joint's immersion flush therein of a roadable aircraft.
Figure 5A:
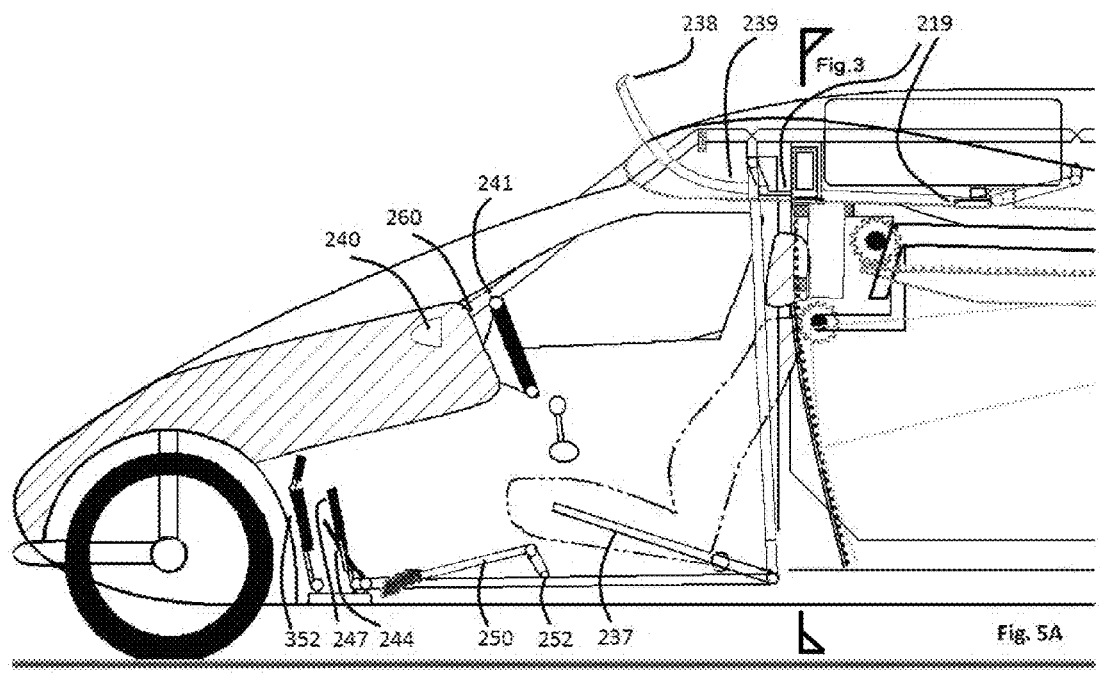
FIG. 5A is a partial cross-sectional side view of a cockpit of a roadable aircraft in car configuration with overhead rear view and side view mirrors extended, power linked to wheels, aircraft controls stowed, car controls deployed and conversion lever down.
Figure 5B:
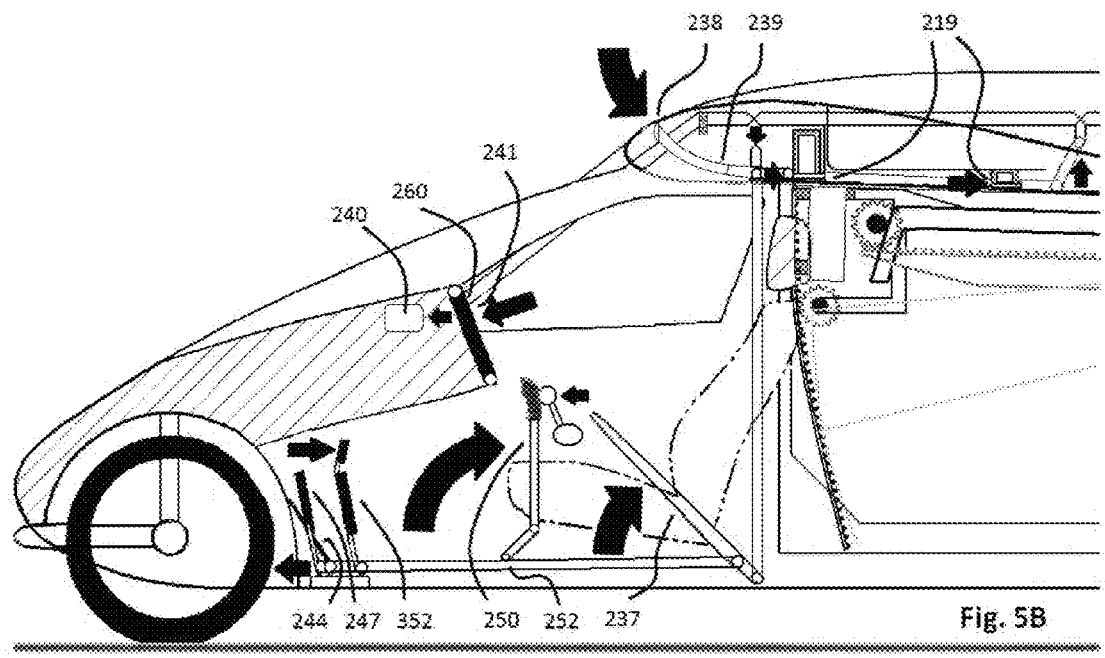
FIG. 5B is a partial cross-sectional side view of a cockpit of a roadable aircraft in aircraft configuration, mirrors retracted, power linked to airscrew, aircraft controls deployed, car controls stowed and conversion lever pulled up.

Mirrors (FIGS. 4A, 4B)

An overhead rear-view mirror 238 is located on an extendable arm 239 inside the central main-wing's leading edge (which is transparent at that point) 18 above the pilot's seat 21. It extends for road travel and retracts for air travel. When retracted, the rear surface of the rear-view mirror 238 lies flush with the curve of the wing's leading edge 18. Its extension is operated by the same "locking lever" 237 which locks/unlocks the outer wings 65,66, transfers power between pusher-propeller 26 and gearbox/main driveshaft 27,28 and converts the steering controls and lighting. A side mirror 240 extends outward from just behind the dash-board 260 to the left side of the vehicle 337. Its extension is electrically operated.

Figure 7:
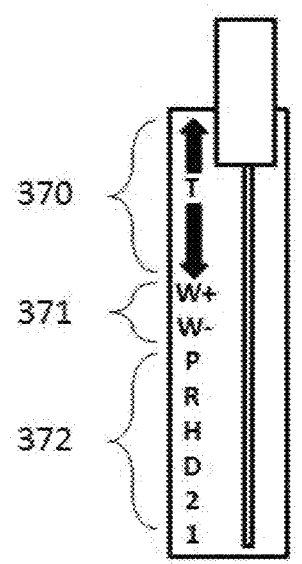
FIG. 7 is a schematic view of a lever controlling transmission, wing extension/contraction, propeller thrust and pitch of a roadable aircraft.
Figure 8:
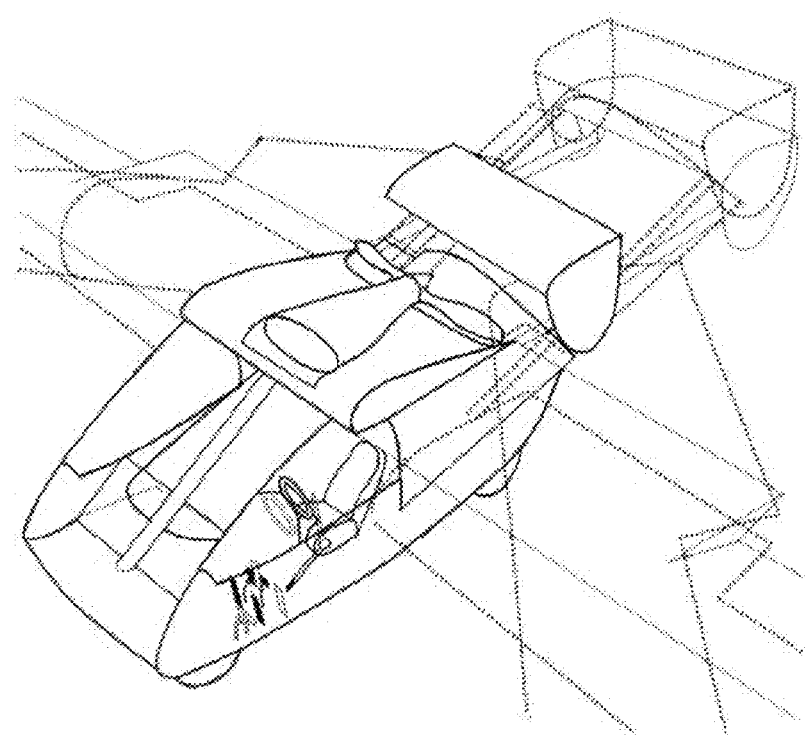
FIG. 8 is a partial perspective three dimensional view showing all wing extension phases and control conversion of a roadable aircraft.

Transmission, Wing Deployment and Thrust Control (FIG. 7)

Transmission in the automobile mode along with propeller pitch, thrust-amount in the aircraft mode and wing deployment is all controlled by one "GWT-lever" [Gear-Wing-Throttle] 274 located at arm-height on the right wall of the cockpit 145.

The rear/lower range 370 of the GWT-lever 274 controls the automatic automobile transmission. The lowest setting is 1st gear followed by 2nd gear, drive, neutral, reverse and park. The settings are indicated in a standard manner. The middle range 371 of the GWT-lever 274 has two settings which control wing movement. "W-" indicates outer wing contraction. On this setting, the outer wings 65,66 fold into their stored position for automobile mode. "W +" indicates outer wing extension. On this setting, the outer wings 65,66 extend and deploy into their spread position for aircraft mode. Neither of the "W" settings 371 can be activated if the locking pins 219,220 are in place, i.e. the outer wings must be unlocked. The motor 23 is disengaged (idles) whenever either "W" setting is set (i.e., neither the pusher-propeller 26 behind it nor the gear-box 27 in front of it are geared to the motor 23 as long as either "W" position 371 is set.)

The forward/upper part range 372 of the GWT-lever 274 has only one setting, "T". "T" indicates "throttle". Unlike the other settings which ratchet into only one notch, the "T" setting has a wide range of motion, forward and backward. Full forward indicates full thrust. Full backward indicates idle. The "T" setting can only be used when the outer wing spar-stubs 209/210 are locked in place with the locking pins 219,220 engaged and the flight controls 250,252,253 have been deployed. Constant speed propeller control (if used) is integrated automatically into the throttle part of the GWT-lever 274.

Suspension & Wheel Retraction (FIGS. 1G, 1H)

For ground movement, space is needed above the wheels (wheel well) 275,276,277,278 for the vehicle's suspension to be able to absorb surface bumps. This space is not needed in flight. Therefore, after the vehicle becomes airborne, the wheels 9,10,11,12 are moved upward into the wheel well 275,276,277,278.

Each of the four wheel's axles 47,48,49,50 is attached to a suspension beam 283,284, which in turn is attached via a rotating joint 324,325,326,327 to the frame 41,42,45,46. The lower part of the beam 283,284, has a spring; its upper part has a shock absorber. To retract the wheels 9,10,11,12, a wheel retraction lever attached via a linkage (not shown) to the suspension beam 283,284, causes the suspension beam 283, 284 to rotate backward around the joint 324,325,326,327. As this happens, the drive shafts 31,32 disengage from the differential 30.

Operation as Floatplane (FIGS. 11, 1J)

A total of six folded, inflatable bladders, 301,302,303 (three shown) each with an overflow and release valve, are located above doors (not shown) in the forward, lower and rear part each fuselage. Pneumatic hoses link them to a tank of compressed air (not shown) which, when opened by a float-inflation-lever in the cockpit, inflates them. Deflation is caused by manually releasing the valves then folding and stowing the bladders 301,302,303.

An auxiliary drive shaft 307 mounted below the central main-driveshaft 28 runs upward from the differential 30 to below the central main-wing's leading edge 18. At the top end of the shaft 312 is a two-bladed marine propeller 313 which is held in place horizontally via a self-locking latch 310. The bottom end of the auxiliary drive shaft 311 is affixed to the lower underside of the main-driveshaft's 28 encasing via a rotating joint 308 located on a sheathlike bracket 335 which encases the lower part of the drive shaft 311. Only the bottom tip of the auxiliary drive shaft 311 protrudes from the front end of the sheath. This tip has a drive wedge 336 which engages in the differential 30 when the top (marine-propeller) end 312 of the auxiliary shaft 307 is lowered to below the underside of the inflated bladders 301,302,303 (i.e. below water-level).

The auxiliary drive 307 shaft has a guiding arm 328. The purpose of the guiding arm 328 is to keep the auxiliary drive shaft 307 in the middle of the fuselages 1,2 when the marine-propeller 313 is extended downwards and receives power. At its upper end, the guiding arm is attached to a moveable joint 329 on the lower encasing of the main-driveshaft 28. At its lower end it is attached to a joint 330 on the sheathlike-bracket 335 around the base 311 of the auxiliary drive shaft 307. This joint 330 is attached to a cable 331. The cable 331 runs up to a pulley 332 on the lower main-driveshaft's encasing directly above it. From there, the cable 331 runs along and within the main-driveshaft's encasing 333 to a lever in the cockpit 334. When the latch 310 is released and the lever in the cockpit is loosened allowing the cable 331 to extend downwards, the guiding arm 328 and upper tip of the auxiliary drive shaft 312 both move downwards, thereby lowering the marine-propeller 313. When the cable 331 is raised, they both move upward until the marine-propeller 313 latches in place.

As long as the vehicle is operated as an automobile or an aircraft, the auxiliary drive shaft 307 can be neither engaged nor extended and the marine-propeller 313 remains stored in front of the gearbox 27 in the central main-wing's lower leading edge 18. Once the vehicle has landed on water and before the outer wings 65,66 are retracted and stowed, the marine-propeller 313 is unlatched and lowered into the water. Only then are the outer wings 65,66 retracted to allow operation of the vehicle as a twin-hulled powerboat.

Nothing in this detailed description of the preferred embodiment should be construed as limiting the scope of the application of the various parts of the invention in other embodiments, ways or contexts. Most particularly, the embodiment described here uses the maximum allowable roadable width of 2.55 m, whereas other embodiments with a shorter chord would narrow the overall width and alter the aspect ratio.

| Reference Key | |
|---|---|
| Left (port) fuselage | 1 |
| Right (starboard) fuselage | 2 |
| Left door | 3 |
| Right door | 4 |
| Left (port) front wheel | 9 |
| Left (port) rear wheel | 10 |
| Right (starboard) front wheel | 11 |
| Right (starboard) rear wheel | 12 |
| Canard wing/plane | 13 |
| Canard wing/plane leading edge | 14 |
| Canard cross-bar | 16 |
| Central main-wing | 17 |
| Central main-wing leading edge | 18 |
| Central main-wing trailing edge | 19 |
| Central main-spar | 20 |
| Pilot's seat (in left fuselage) | 21 |
| Passenger's seat (in right fuselage) | 22 |
| Motor | 23 |
| Engine mounts | 25 |
| Pusher-propeller | 26 |
| Gearbox | 27 |
| Main driveshaft | 28 |
| Central beam | 29 |
| Differential | 30 |
| Left drive shaft | 31 |
| Right drive shaft | 32 |
| Upper air intake | 37 |
| Left vertical strut | 41 |
| Right vertical strut | 42 |
| Left curved support | 43 |
| Right curved support | 44 |
| Left floor beam | 45 |
| Right floor beam | 46 |
| Rear right axle | 47 |
| Rear left axle | 48 |
| Front right axle | 49 |
| Front left axle | 50 |
| Left Vertical Central main-spar strut | 55 |
| Right Vertical Central main-spar strut | 56 |
| Left rear fuselage beam | 60 |
| Right rear fuselage beam | 62 |
| Left rear fuselage tip | 63 |
| Right rear fuselage tip | 64 |
| Left outer wing | 65 |
| Right outer wing | 66 |
| Left outer wing tip | 67 |
| Right outer wing tip | 68 |
| Left outer wing root | 69 |
| Right outer wing root | 70 |
| Left outer wing trailing edge root | 71 |
| Right outer wing trailing edge root | 72 |
| Left, outer fold-down rear fuselage shell | 75 |
| Left, inner fold-down rear fuselage shell | 76 |
| Right, outer fold-down rear fuselage shell | 77 |
| Right, inner fold-down rear fuselage shell | 78 |
| Left shelf | 79 |
| Right shelf | 80 |
| Left swinging arm ("L"-shaped) | 81 |
| Right swinging arm ("L"-shaped) | 82 |
| Left outer wing underside | 83 |
| Right outer wing underside | 84 |
| Left "L" long leg | 85 |
| Left "L" short leg | 86 |
| Right "L" long leg | 87 |
| Right "L" short leg | 88 |
| Left "L" long leg tip | 89 |
| Left "L" short leg tip | 90 |
| Right "L" long leg tip | 91 |
| Right "L" short leg tip | 92 |
| Left knee of "L"-shaped swinging arm | 93 |
| Right knee of "L"-shaped swinging arm | 94 |

-continued

Reference Key

| | |
|---|---|
| Left underwing rut | 95 |
| Right underwing rut | 96 |
| Left underwing rail | 97 |
| Right underwing rail | 98 |
| Left underwing trolley | 103 |
| Right underwing trolley | 104 |
| Left underwing rotating, sinking joint | 105 |
| Right underwing rotating, sinking joint | 106 |
| Left short leg tip rotating joint | 107 |
| Right short leg tip rotating joint | 108 |
| Left swivelling support | 109 |
| Right swivelling support | 110 |
| Left swivelling support upper tip | 111 |
| Left swivelling support lower tip | 112 |
| Right swivelling support upper tip | 113 |
| Right swivelling support lower tip | 114 |
| Left swivelling support upper tip front rotating joint | 115 |
| Left swivelling support upper tip rear rotating joint | 116 |
| Left swivelling support lower tip front rotating joint | 117 |
| Right swivelling support upper tip front rotating joint | 118 |
| Right swivelling support upper tip rear rotating joint | 119 |
| Right swivelling support lower tip front rotating joint | 120 |
| Left upward rail | 121 |
| Right upward rail | 122 |
| Left upward rail vertical middle part | 123 |
| Left upward rail curved lower part | 124 |
| Right upward rail vertical middle part | 125 |
| Right upward rail curved lower part | 126 |
| Left upward rail upper trolley | 127 |
| Left upward rail lower trolley | 128 |
| Right upward rail upper trolley | 129 |
| Right upward rail lower trolley | 130 |
| Left front main-spar central main-wing cavity | 131 |
| Left rear secondary spar central main-wing cavity | 132 |
| Left front main-spar central main-wing cavity lower opening | 133 |
| Left rear secondary spar central main-wing cavity lower opening | 134 |
| Left front main-spar central main-wing cavity side opening | 135 |
| Left rear secondary spar central main-wing cavity side opening | 136 |
| Right front main-spar central main-wing cavity | 137 |
| Right rear secondary spar central main-wing cavity | 138 |
| Right front main-spar central main-wing cavity lower opening | 139 |
| Right rear secondary spar central main-wing cavity lower opening | 140 |
| Right front main-spar central main-wing cavity side opening | 141 |
| Right rear secondary spar central main-wing cavity side opening | 142 |
| Left outer wing camber | 143 |
| Right outer wing camber | 144 |
| Left (port) cabin (cockpit) | 145 |
| Right (starboard) cabin | 146 |
| Front end of vehicle | 147 |
| Rear end of vehicle | 148 |
| Left (port) empennage beam | 149 |
| Left (port) empennage beam front tip | 150 |
| Left (port) empennage beam rear tip | 151 |
| Left (port) empennage beam upward bend | 152 |
| Left (port) empennage beam straightening bend | 153 |
| Right (starboard)empennage beam | 154 |
| Right (starboard)empennage beam front tip | 155 |
| Right (starboard)empennage beam rear tip | 156 |
| Left upward rail, upper curved part | 157 |
| Right upward rail, upper curved part | 158 |
| Left (port) rail extension beam | 159 |
| Left (port) rail extension beam front tip | 160 |
| Left (port) rail extension beam rear tip | 161 |
| Right (starboard) rail extension beam | 162 |
| Right (starboard) rail extension beam front tip | 163 |
| Right (starboard) rail extension beam rear tip | 164 |
| Left rear empennage rail | 165 |
| Right rear empennage rail | 166 |
| Left front empennage cograil | 167 |
| Right front empennage cograil | 168 |
| Left root trailing edge trolley | 169 |
| Left root trailing edge rotating joint | 170 |
| Right root trailing edge trolley | 171 |
| Right root trailing edge rotating joint | 172 |
| Left sub-support | 173 |
| Left sub-support upper tip | 174 |
| Left sub-support lower tip | 175 |
| Left sub-support lower tip cogwheel | 176 |
| Left sub-support lower tip opening | 177 |
| Right sub-support | 178 |
| Right sub-support upper tip | 178 |
| Right sub-support lower tip | 179 |
| Right sub-support lower tip cogwheel | 180 |
| Right sub-support lower tip opening | 181 |
| Underside of central main-wing | 182 |
| Raised tail crossbar | 183 |
| Horizontal stabilizer | 184 |
| Auxiliary elevator | 185 |
| Main elevator (behind canard plane) | 186 |
| Left vertical stabilizer | 187 |
| Left auxiliary rudder | 188 |
| Left rear fuselage rudder | 189 |
| Left front wheel spat-encasing | 190 |
| Right vertical stabilizer | 191 |
| Right auxiliary rudder | 192 |
| Right rear fuselage rudder | 193 |
| Right front wheel spat-encasing | 194 |
| Left rear top hinge | 195 |
| Right rear top hinge | 196 |
| Left trailing edge root hook | 197 |
| Right trailing edge root hook | 198 |
| Left empennage beam indentation | 199 |
| Right empennage beam indentation | 200 |
| Sleeve under left rail extension beam | 201 |
| Left upper rail extension beam rail | 203 |
| Left central main-wing cross section | 205 |
| Left outer wing main spar | 207 |
| Right outer wing main spar | 208 |
| Left outer wing main spar stub | 209 |
| Right outer wing main spar stub | 210 |
| Indentations on lower side of left main spar stub | 211 |
| Indentations on lower side of right main spar stub | 212 |
| Left outer wing secondary spar | 213 |
| Right outer wing secondary spar | 214 |
| Left outer wing secondary spar stub | 215 |
| Right outer wing secondary spar stub | 216 |
| Indentations on lower side of left secondary spar stub | 217 |
| Indentations on lower side of right secondary spar stub | 218 |
| Left locking pins | 219 |
| Right locking pins | 220 |
| Left swivel motor | 221 |
| Right swivel motor | 222 |
| Motor-driven cogwheel on left upper swivelling support (Short rail cogwheel) | 223 |
| Motor-driven cogwheel on right upper swivelling support (Short rail cogwheel) | 224 |
| Left spat-encasing horizontal extension | 228 |
| Right spat-encasing horizontal extension | 229 |
| "Locking lever" for control/mirror deployment, pin-locking, light activation & cover retraction | 237 |
| Overhead Rear-view mirror | 238 |
| Overhead Rear-view mirror beam | 239 |
| Side mirror | 240 |
| Steering wheel | 241 |
| Accelerator pedal | 244 |
| Brake pedal | 247 |
| Joystick | 250 |
| Joystick base | 252 |
| Linkage from lever to controls | 257 |
| Dash board/instrument panel | 260 |
| Left pedal-alternation-rotation bar | 261 |
| Left pedal-alternation-rotation pivot | 262 |
| Control configuration-swap rail | 273 |
| Transmission, wing deployment, propeller angle & thrust lever ("Gear-Wing-Throttle"/"GWT" lever) | 274 |
| Left front wheel-well | 275 |
| Left rear wheel-well | 276 |
| Left front suspension beam | 283 |
| Left rear suspension beam | 284 |
| Right front suspension beam | 285 |
| Right rear suspension beam | 286 |
| Front left float bladder | 301 |
| mid-lower left float bladder | 302 |
| Rear left float bladder | 303 |

-continued

| Reference Key | |
|---|---|
| Auxiliary drive shaft | 307 |
| Auxiliary drive shaft joint | 308 |
| Auxiliary drive shaft self-locking marine-propeller latch | 310 |
| Bottom end of auxiliary drive shaft | 311 |
| Top end of auxiliary drive shaft | 312 |
| Two-blade marine propeller | 313 |
| Left, front joint between suspension beam and frame | 324 |
| Left, rear joint between suspension beam and frame | 325 |
| Right, front joint between suspension beam and frame | 326 |
| Right, rear joint between suspension beam and frame | 327 |
| Guide arm of auxiliary drive shaft | 328 |
| Upper guide arm joint | 329 |
| Lower guide arm joint | 330 |
| Auxiliary drive shaft cable | 331 |
| Auxiliary drive shaft cable pulley | 332 |
| Auxiliary drive shaft cable lever | 334 |
| Auxiliary drive shaft sheath (bracket) | 335 |
| Drive wedge on auxiliary drive shaft | 336 |
| Left side of vehicle | 337 |
| Right side of vehicle | 338 |
| Angle of skew | 339 |
| Forward direction of movement | 340 |
| Entire empennage structure | 345 |
| Left outer wing leading edge | 346 |
| Right outer wing leading edge | 347 |
| Left outer wing trailing edge | 348 |
| Right outer wing trailing edge | 349 |
| Left cograil within short upward rail | 350 |
| Right cograil within short upward rail | 351 |
| Left rudder pedal with toe brake | 352 |
| Right rudder pedal with toe brake | 353 |
| Right pedal alternation rotation bar | 366 |
| Right pedal alternation rotation pivot | 367 |
| Gas/brake base | 368 |
| Gas/brake rail | 369 |

The invention claimed is:

1. A roadable aircraft comprising:
two parallel fuselages connected by a connecting beam between the two fuselages,
wherein each fuselage comprising at least two road wheels mounted one behind the other longitudinally on their undersides of the fuselage; and
at least two wings coupled to the fuselages;
wherein the at least two wings coupled to the fuselage;
wherein the at least two wings are deployable between a longitudinal, stored position and a lateral, spread position; and,
wherein the at least teo wings are stored at least partially between the fuselage in the stored position.

2. The roadable aircraft of claim 1, comprising:
at least one motor located between the two fuselages; and
wherein the at least one motor powers at least two of the wheels, and
wherein the at least one motor is connected via a drive shaft, running parallel with and between the two fuselages, to lateral drive shafts which drive the wheels.

3. The roadable aircraft of claim 2, wherein the at least one motor also powers at least one airscrew via a direct drive or belt-drive; and
wherein the at least one airscrew comprises at least two blades.

4. The roadable aircraft of claim 1, comprising a cockpit in at least one of the two fuselages configured to receive a driver/pilot, and controls in the cockpit, the controls comprising a set of driving controls consisting of steering wheel, brake pedal and accelerator pedal and a set of flying controls comprising a joystick, and left and right rudder pedals, each with toe brakes;
wherein the set of controls not currently in use resides away from the driver/pilot in the direction of the front of the roadable aircraft out of reach and immobilized; and
wherein the set currently in use resides toward the driver/pilot in the direction of the aft of the roadable within reach and activated.

5. The roadable aircraft of claim 4, wherein the cockpit comprises a floor surface at a floor level, a front wall, a rear wall, and left and right outer cockpit walls, whereby the rudder pedals stow at floor level up against the front wall of the cockpit and deploy aft along longitudinally oriented rails located at floor level near the left and right outer cockpit walls respectively, configured to reach the position of a driver-pilot's left and right feet respectively; and
wherein, in juxtaposition thereto, the accelerator and brake pedals move as a block together between their deployed position, which is located on the right side of the cockpit at the position of the driver-pilot's right foot, on a rail curving convexly toward a mid-line of the fuselages and forward toward the front middle of the cockpit where they stow up against the front cabin wall.

6. The roadable aircraft of claim 5, whereby the brake and accelerator pedal are attached to a first end of at least one bar configured to rotate around floor-mounted pivots in the cockpit, where a second, opposite end of said at least one bar is attached to the rudder pedals.

7. The roadable aircraft of claim 4, whereby the joystick comprises a hinged base and is configured to fold forward over its hinged base into a rut in a floor of the cockpit when not in use.

8. The roadable aircraft of claim 1, comprising a control lever with three ranges:
the control of an automatic automobile transmission via notched settings in a lower range of the control lever;
the extension and retraction of aircraft wings via notched settings in a middle range of the control lever; and
at least the thrust of an aircraft's propeller and control of airscrew angle of attack via an upper, variable range of the control lever.

9. The roadable aircraft of claim 1, whereby during road transport all control surfaces of the at least two wings located on all planes between the fuselages are set in such a way that they deflect the relative wind so as to enhance the roadable aircraft's road grip.

10. The roadable aircraft of claim 1, further comprising:
a rearwardly extendable, longitudinal empennage beam movably coupled to each of the two fuselages,
wherein the at least two wings are rotatably coupled to the empennage beams with at least two pivot-joints,
wherein the at least two wings deploy from the stored position wholly or partially between said fuselages to the spread position via a longitudinal motion of the empennage beams and the at least two wings, followed by a lateral, swinging motion of the at least two wings about the pivot-joints.

11. The roadable aircraft of claim 10, further comprising:
an empennage assembly joining the empennage beams to each other;
wherein the empennage assembly comprises:
at least one plane, and
at least on control surface; and
wherein a root of each said wing is rotatably attached via the pivot-joints to a trolley running in a rail located longitudinally along the empennage beam which is on the respective side of the deployment for the wing.

12. The roadable aircraft of claim 11, whereby the longitudinal, backward movement of the empennage beams is effected at an inclined angle such that, when the backward movement has been completed, the wings after they have been laterally rotated for flight and the empennage assembly are respectively higher and lower in relation to an intermediate point of the empennage beams; and wherein the fuselage comprises an empennage support structure and a hinge rotatably coupled to an empennage support structure, the empennage support structure configured to support the empennage beams and rotate about the hinge to effect rotation of the empennage beams, and where the intermediate point of each of the empennage beams is located at or near the rear end of each fuselage such that the empennage beams and laterally extended wings may be rotated upward or downward around said intermediate points in a see-saw-type motion about the hinge, thereby enabling wing spar stubs to be rocked in a see-saw type motion into receiving cavities located either within the fuselages or within the connecting beam between the fuselages.

13. The roadable aircraft of claim 12, wherein the empennage support structure comprises a sub-support and a rail extension beam connected to the empennage beam, the rail extension beam configured to engage the hinge to allow rotation of the empennage beams.

14. The roadable aircraft of claim 11, where each empennage beam is enclosed within one of the two fuselages during storage.

15. The roadable aircraft of claim 10, comprising:
a first swinging arm, and
a second swing arm,
wherein the first and second swinging arms are for wing deployment,
wherein a first end of the first swinging arm is attached to one of the two fuselages by a first support pivot-joint and a second end of the first swinging arm is attached to a first wing pivot-joint on the underside of one wing of the at least two wings and wherein a root of the one wing is attached to and during deployment revolves around a first root pivot-joint running on a trolley in a rail which is mounted substantially longitudinally along the roadable aircraft or along one of the empennage beams; and
wherein a first end of the second swinging arm is attached to the other of the two fuselages by a second support pivot-joint and a second end of the second swinging arm is attached to a second wing pivot-joint on the underside of a second wing of the at least two wings, and wherein a root of the second wing is attached to and during deployment revolves around a second root pivot-joint running on a trolley in a rail which is mounted substantially longitudinally along the roadable aircraft or along one of the empennage beams; and
wherein the pivot-joints on the undersides of the first and second wings run on a trolley within a rail which lies substantially along the span of the respective wing undersides.

16. The roadable aircraft of claim 15, wherein the first and second swinging arms are sunk into and flush with the underside of the first and second wings of the at least two wings when the at least two wings are in the spread position.

17. The roadable aircraft of claim 15, in which the first and second support pivot-joints are mounted to the two fuselages at such an angles as to allow the first and second swinging arms together with the wings they support to rotate laterally in slightly skewed, parallel planes to one another without interfering with one another during wing deployment from the stored position to the spread position.

18. The roadable aircraft of claim 17, comprising trolleys running along two upward rails mounted to the two fuselages or the connecting beam, wherein the support pivot-joints are movably mounted on the trolley running along the upward rails, the support pivot-joints configured to move along the upward rails as the at least two wings transition between the stored position and the spread position;

whereby one end of each of the the upward rails is curved causing the support pivot-joint to skew when the support pivot-joints move along the curved portion of the upward rails, thereby causing the wings to be stored at a position which is not level allowing the wings to rotate past each other; and whereby movement of said trolleys along said upward rails out of its curved part into an adjacent straight part of the upward rails causes the support pivot-joints to align themselves vertically, one above the other, thereby substantially leveling the wings.

19. The roadable aircraft of claim 18, in which said substantially upward rails curve at the one end of the rail to which the trolley is rolled in order to position the wings for flight at such an angle as to give the wings dihedral.

20. The roadable aircraft of claim 1, wherein the connecting beam comprises a central main-wing connecting the fuselages at a roof level of the fuselages, and wherein, with the at least two wings in the spread position, one of the at least two wings is mounted to a first end of the central main-wing and another of the at least two wings is mounted to a second, opposite end of the central main-wing.

21. The roadable aircraft of claim 20, further comprising a canard wing extending between the two fuselages at a lower front portion of the two fuselages.

22. The roadable aircraft of claim 20, wherein the central main-wing comprises:
a first cavity about the first end of the central main-wing, and
a second cavity about the second, opposite end of the central main-wing;
wherein the first cavity is configured to receive a root of the one of the at least two wings in the spread position; and
wherein the second cavity is configured to receive a root of a second of the at least two wings in the spread position.

\* \* \* \* \*